United States Patent
Ohmuro et al.

Patent Number: 6,141,075
Date of Patent: *Oct. 31, 2000

[54] LIQUID CRYSTAL DISPLAY DEVICE OPERATING IN A VERTICALLY ALIGNED MODE

[75] Inventors: Katsufumi Ohmuro; Yoshio Koike; Takahiro Sasaki; Hideaki Tsuda; Hideo Chida, all of Kawasaki, Japan

[73] Assignee: Fujitsu Limited, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/804,798

[22] Filed: Feb. 24, 1997

[30] Foreign Application Priority Data

| Feb. 28, 1996 | [JP] | Japan | 8-041926 |
| Sep. 2, 1996 | [JP] | Japan | 8-232301 |
| Feb. 13, 1997 | [JP] | Japan | 9-029455 |

[51] Int. Cl.$^7$ .............. G02F 1/1337; G02F 1/1335; G02F 1/13
[52] U.S. Cl. .............. 349/130; 349/117; 349/118; 349/120; 349/178; 349/181
[58] Field of Search ........... 349/130, 178, 349/181, 117, 118, 120

[56] References Cited

U.S. PATENT DOCUMENTS

| 3,910,680 | 10/1975 | Kakeda | 349/177 |
| 4,398,803 | 8/1983 | Pohl et al. | 350/334 |
| 4,957,349 | 9/1990 | Clerc et al. | 349/178 |
| 5,602,662 | 2/1997 | Rosenblatt et al. | 349/130 |
| 5,621,558 | 4/1997 | Shimada et al. | 349/130 |

FOREIGN PATENT DOCUMENTS

| 0350382 | 1/1990 | European Pat. Off. |
| 0 538 796 | 4/1993 | European Pat. Off. |
| 2595156 | 9/1987 | France |
| 57-40229 | 3/1982 | Japan |
| 60-211421 | 10/1985 | Japan |
| 62-180326 | 8/1987 | Japan |
| 2-15239 | 1/1990 | Japan |
| 2-176625 | 7/1990 | Japan |
| 3-5721 | 1/1991 | Japan |
| 4-14329 | 3/1992 | Japan |
| 5-53134 | 3/1993 | Japan |
| 5-113561 | 5/1993 | Japan |
| 6-301036 | 10/1994 | Japan |
| 8-43825 | 2/1996 | Japan |
| 661361 | 7/1987 | Switzerland |
| WO9500879 | 1/1995 | WIPO |
| WO9610774 | 4/1996 | WIPO |

OTHER PUBLICATIONS

F. Clerc: "Electro–optical limits of the electrically controlled birefringence effect in nematic liquid crystals"; Display, vol. 2, No. 7, Oct. 1981, pp. 341–347; pp. 341–343; Fig. 5.

Hatoh, H. et al.; "Molecular tilt direction in a slightly tilted homeotropic aligned liquid crystal cell"; Applied Physics Letters, vol. 63, No. 26, Dec. 27, 1993; pp. 3577–3579.

*Primary Examiner*—William L. Sikes
*Assistant Examiner*—Julie Ngo
*Attorney, Agent, or Firm*—Greer, Burns & Crain, Ltd.

[57] ABSTRACT

A vertically-aligned liquid crystal display device includes a liquid crystal layer sandwiched between a pair of glass substrates, wherein a retardation of the liquid crystal layer is optimized in a range between 80 nm and 400 nm. Further, the use of retardation films adjacent to the liquid crystal layer and its optimization are also disclosed.

55 Claims, 81 Drawing Sheets

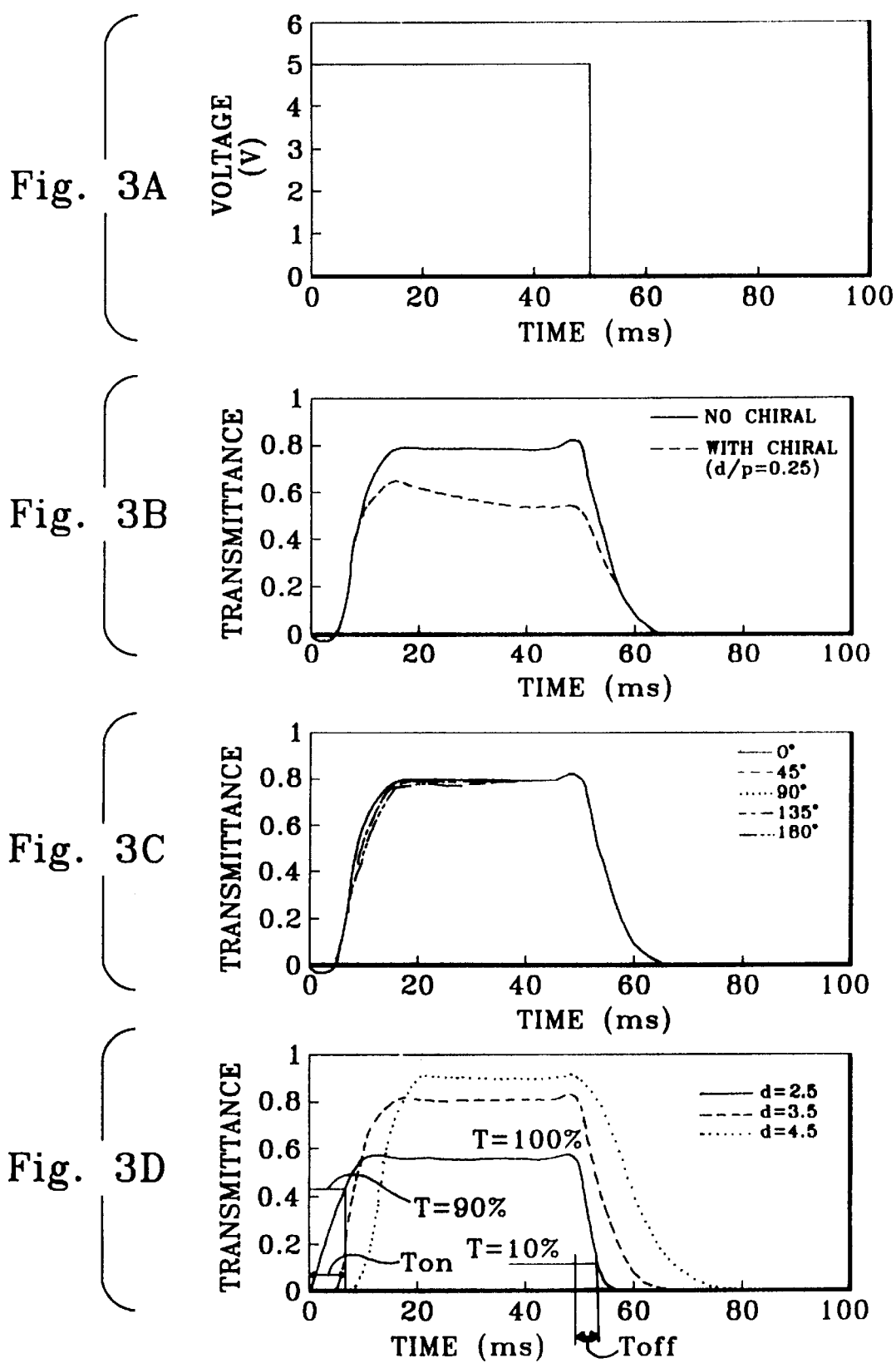

Fig. 4A
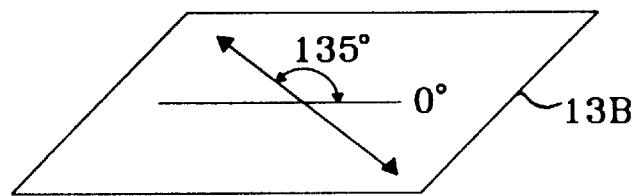
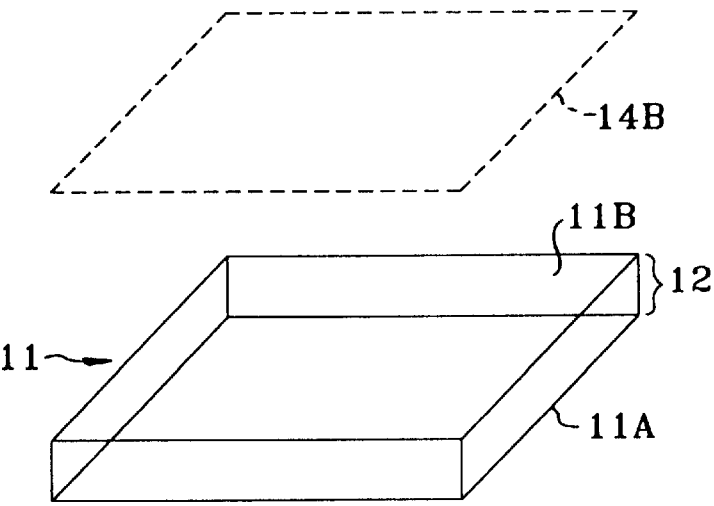
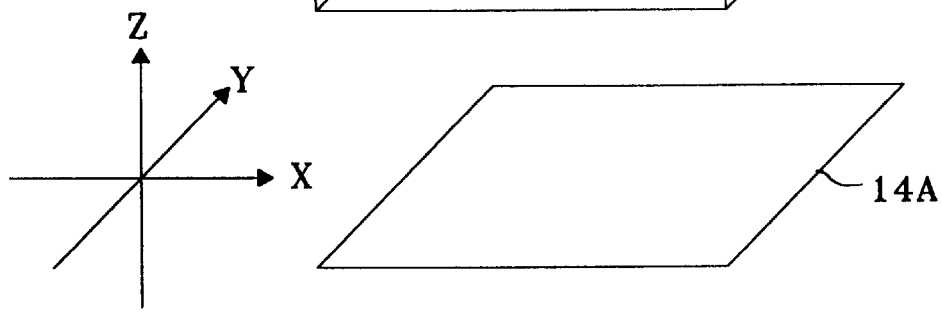
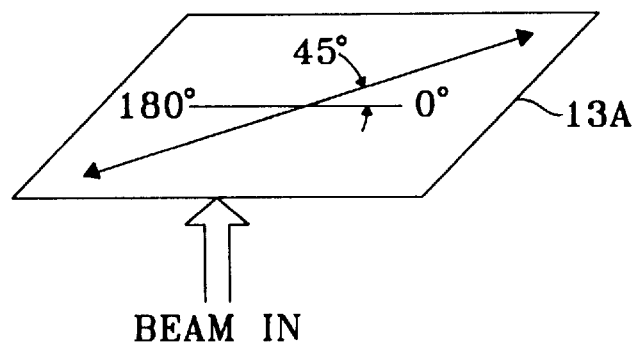

$\dfrac{R'}{\Delta nd}=0.82$

| Contrast Ratio |
|---|
| ———— 500.000 |
| ———— 200.000 |
| – – – – 100.000 |
| —·—·— 50.000 |
| —··—··— 10.000 | d=1μm
Δnd=82nm

| Contrast Ratio |
| --- |
| ——— 500.000 |
| ——— 200.000 |
| - - - - 100.000 |
| — · — 50.000 |
| — ·· — 10.000 | d=6μm
Δnd=492nm d=1μm d=3μm d=6μm d=3μm, 0° TWIST

| Contrast Ratio |
|---|
| ——— 500.000 |
| ——— 200.000 |
| ——— 100.000 |
| —·—·— 50.000 |
| ——— 10.000 |

Fig. 33
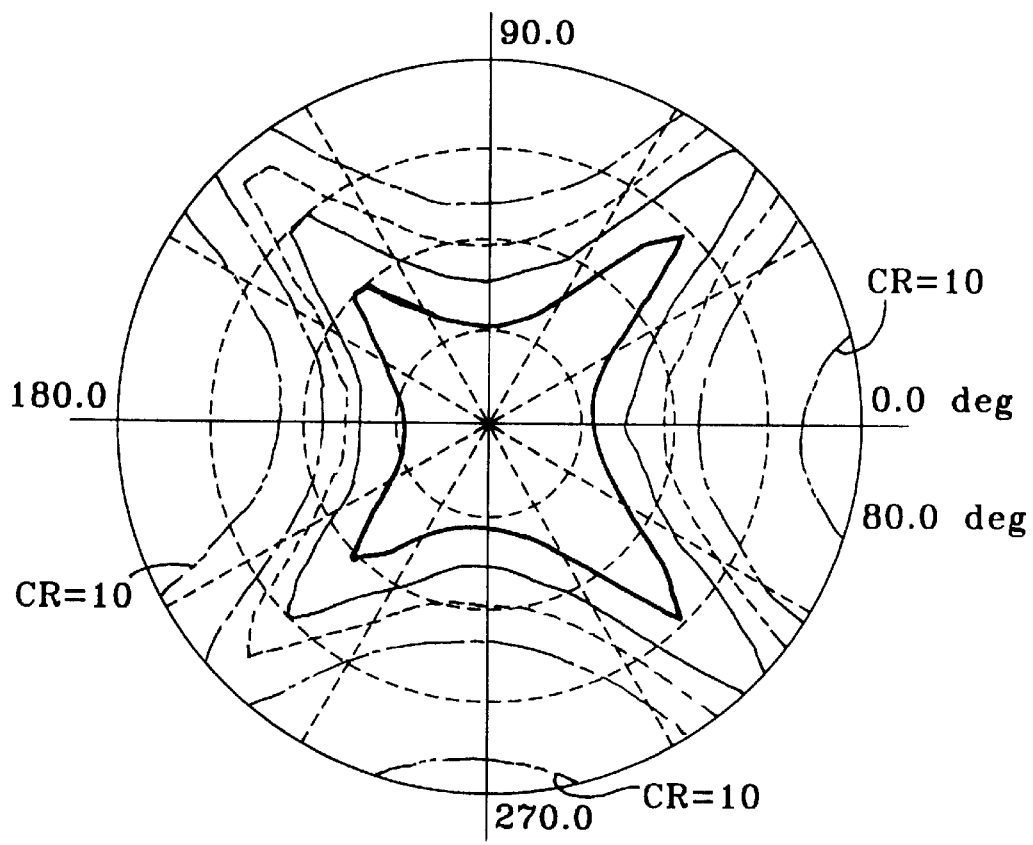
d=3μm, 90° TWIST
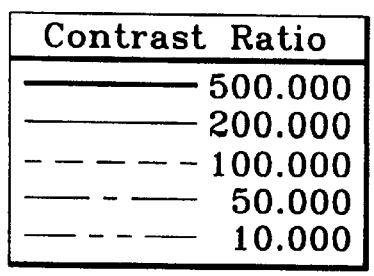

d=3μm, 180° TWIST

| Contrast Ratio | |
|---|---|
| ———— | 500.000 |
| ———— | 200.000 |
| – – – – | 100.000 |
| ——— — | 50.000 |
| — - — - | 10.000 |

Fig. 40
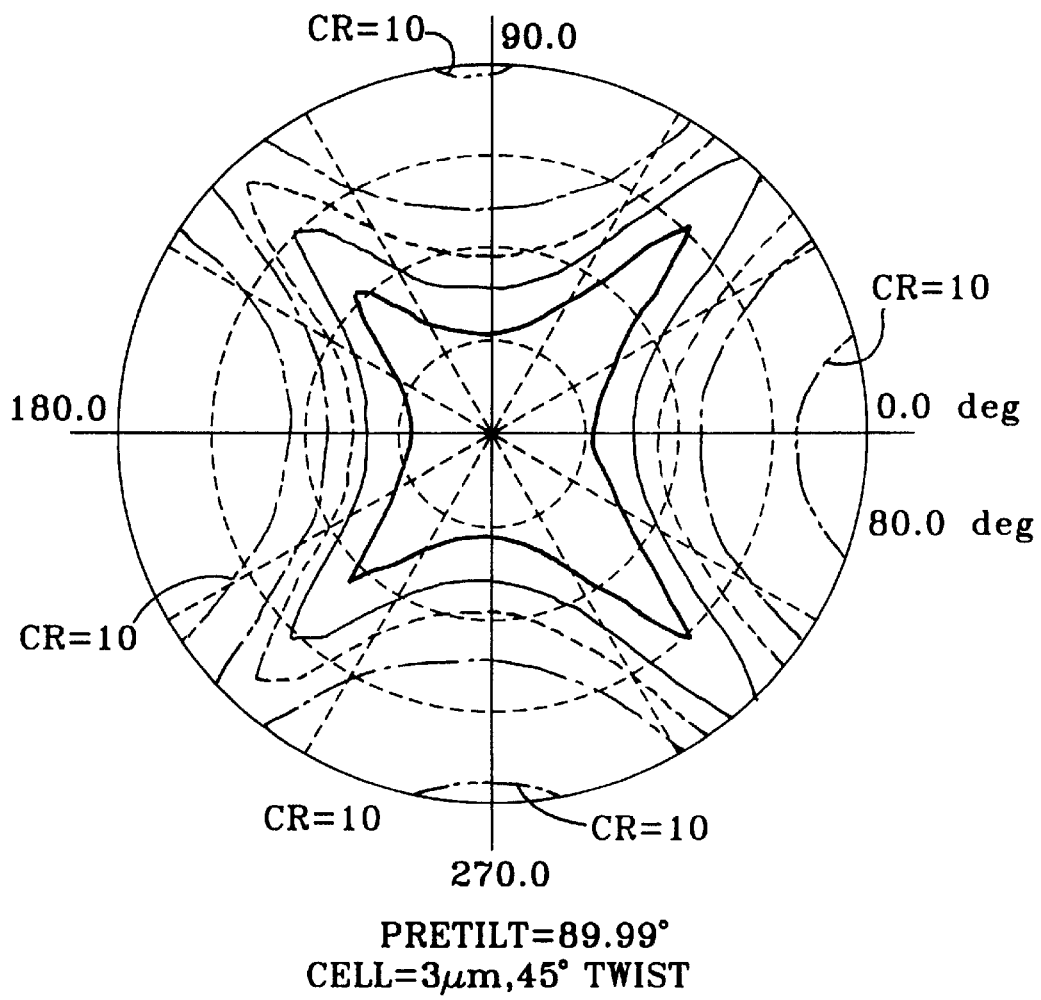
PRETILT=89.99°
CELL=3μm, 45° TWIST
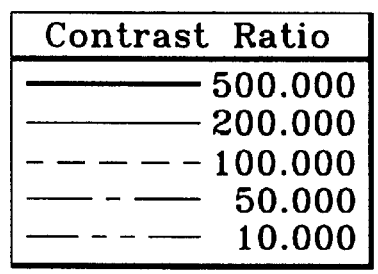

Fig. 44
(PRIOR ART)
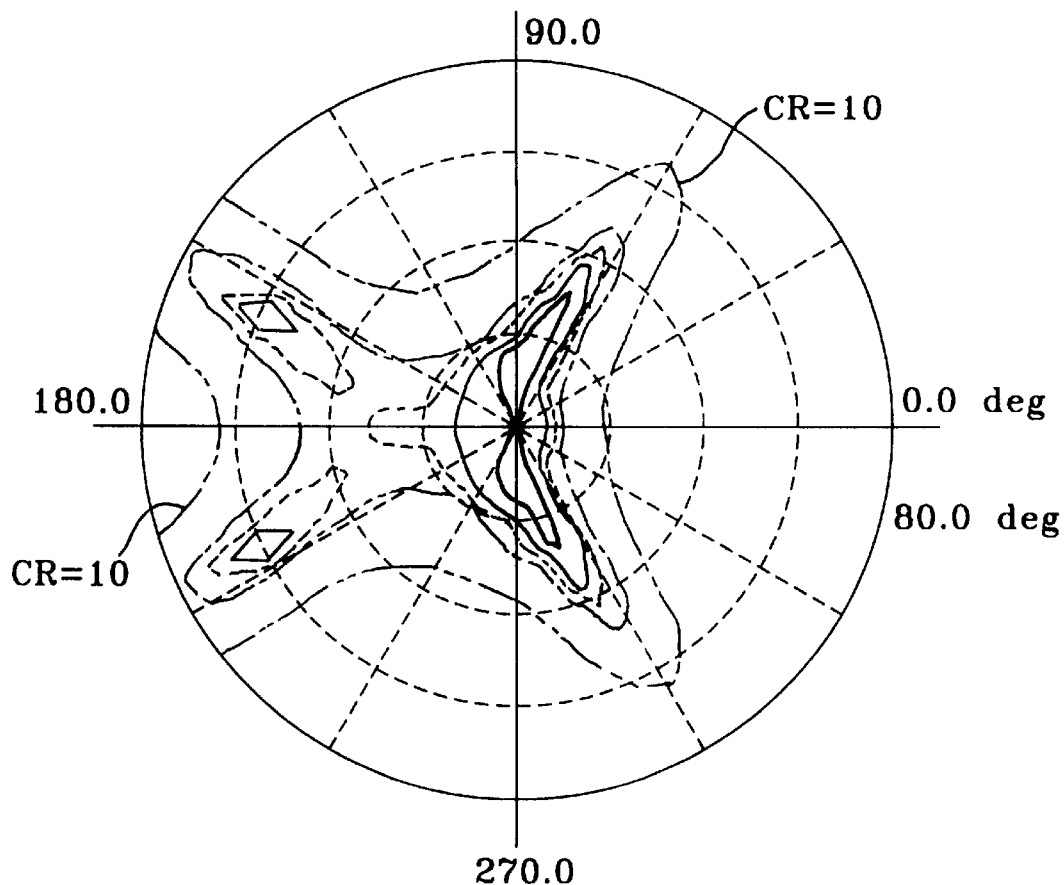
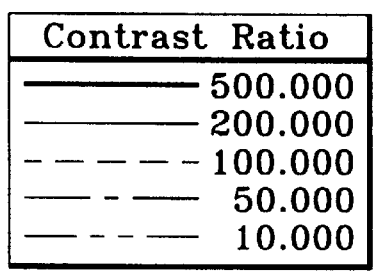

Fig. 47A
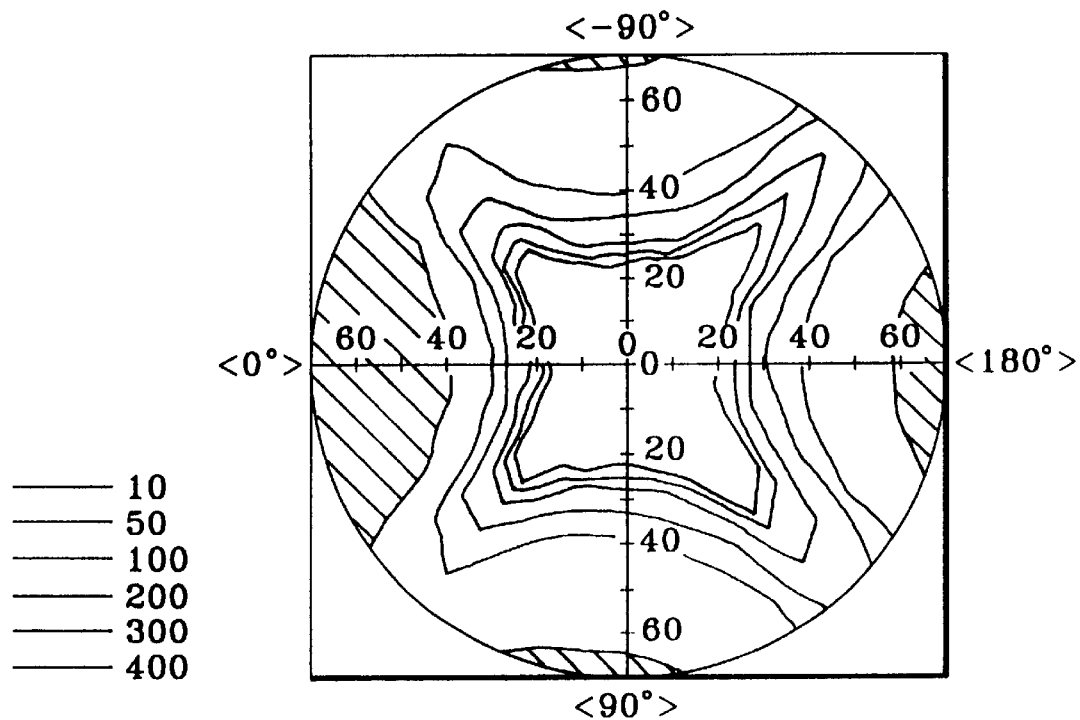
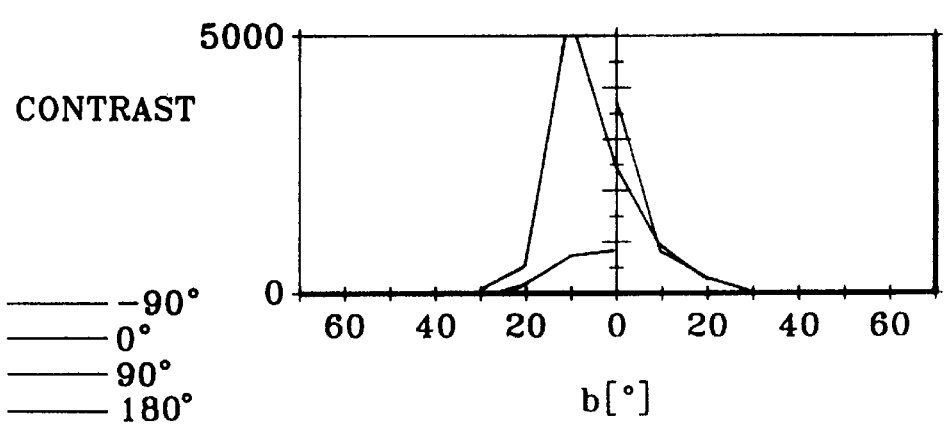
Fig. 47B

Fig. 51
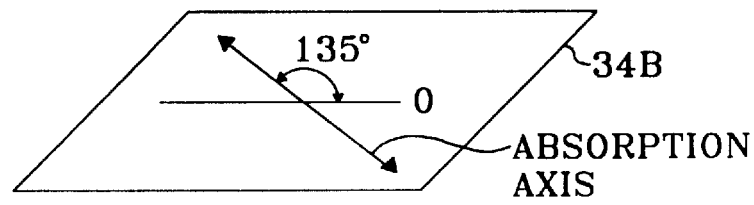
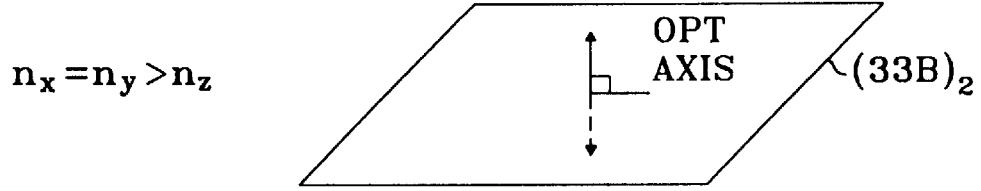
$n_x = n_y > n_z$
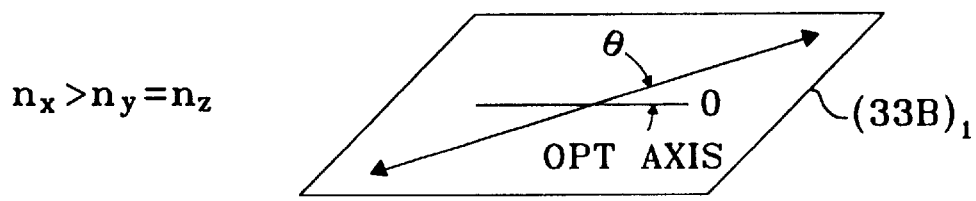
$n_x > n_y = n_z$
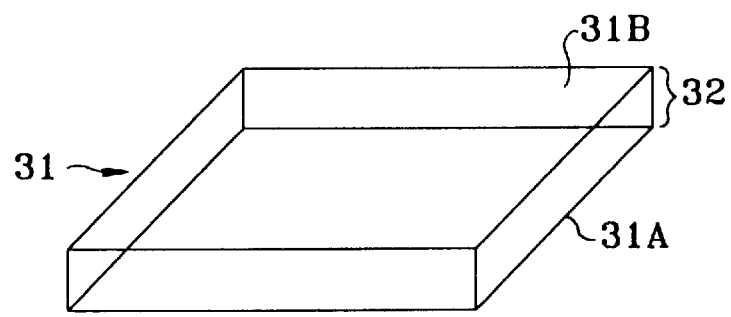
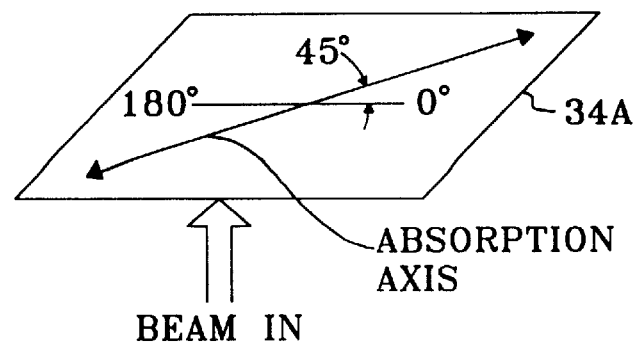
BEAM IN Fig. 56
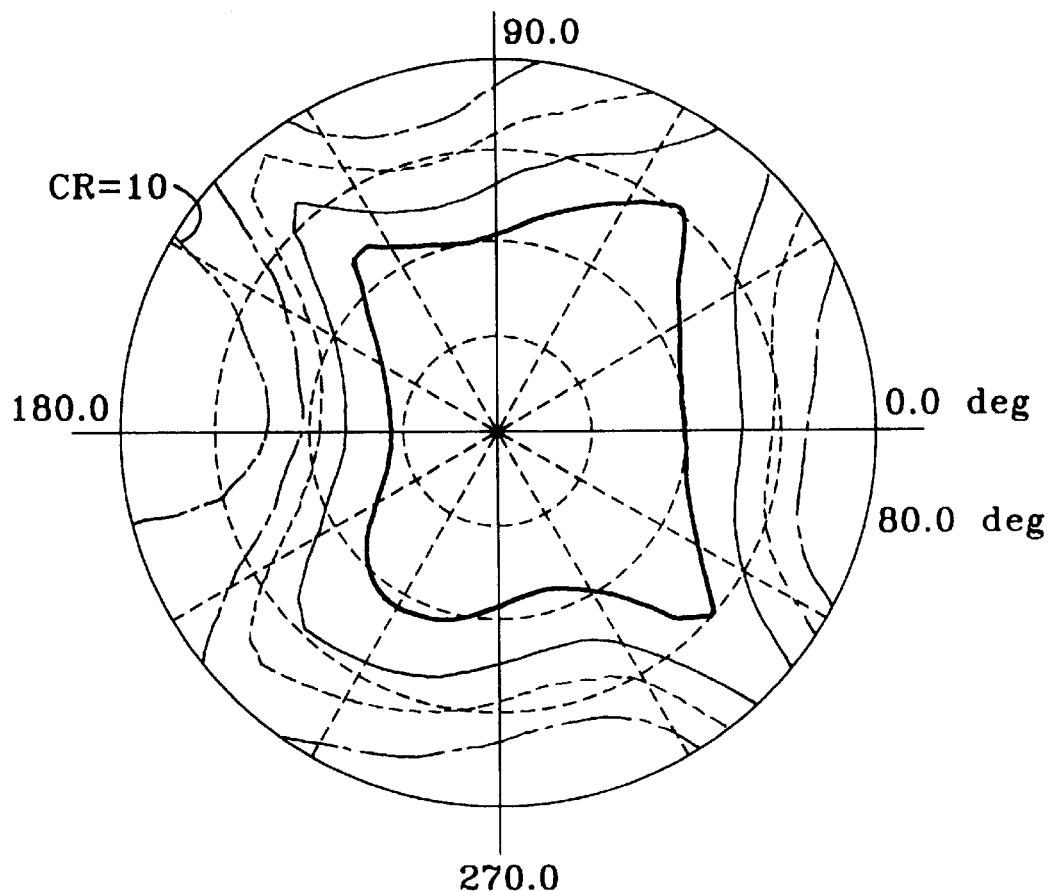
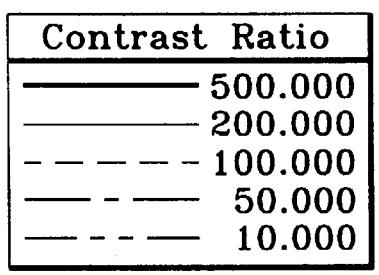

Fig. 57
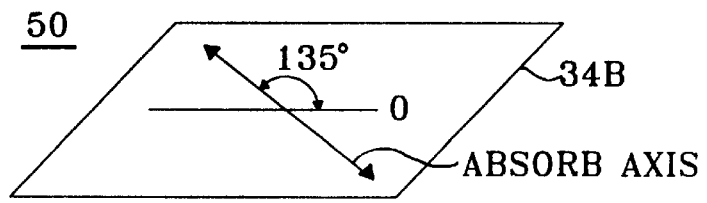
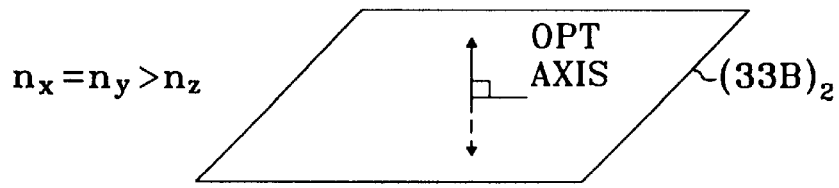
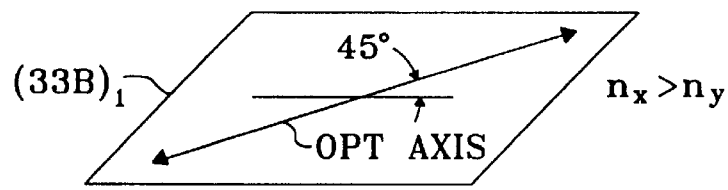
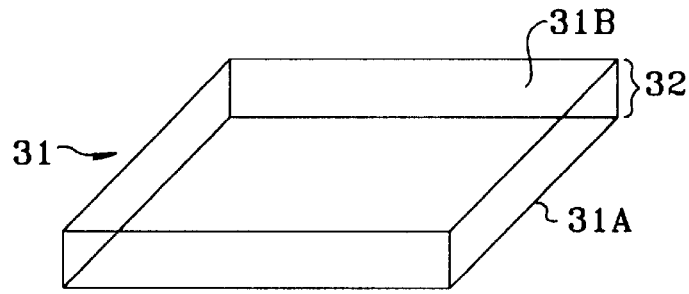
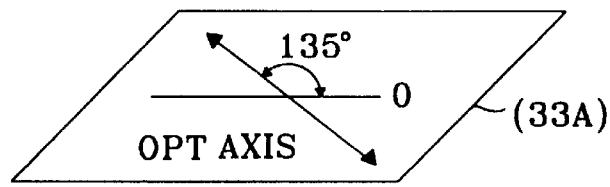
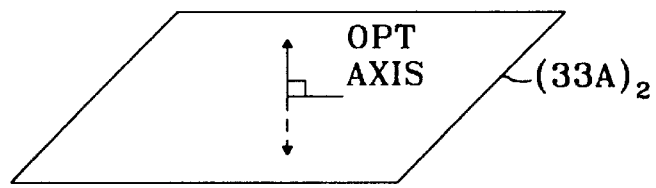
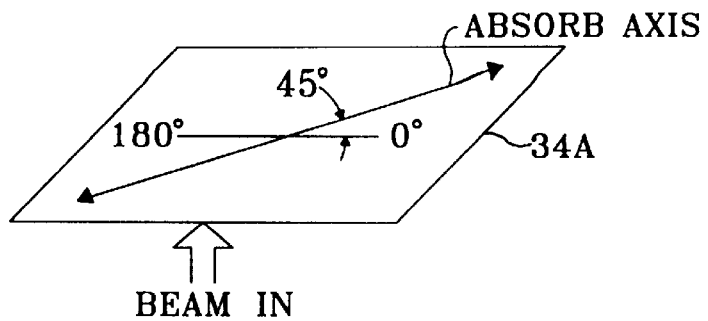

Fig. 61
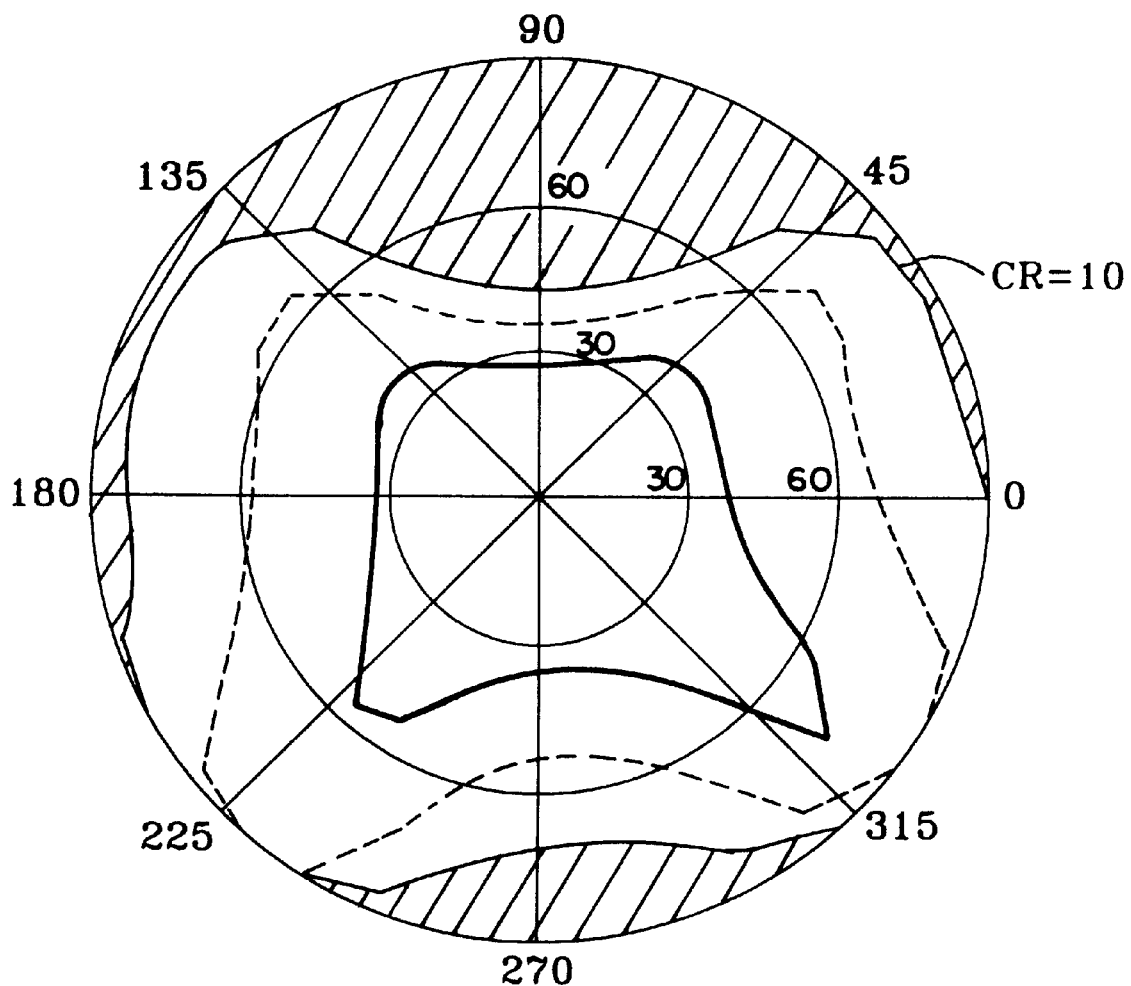
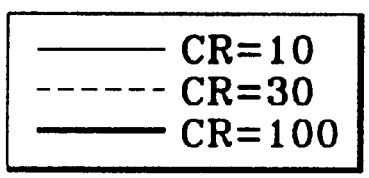

Fig. 66
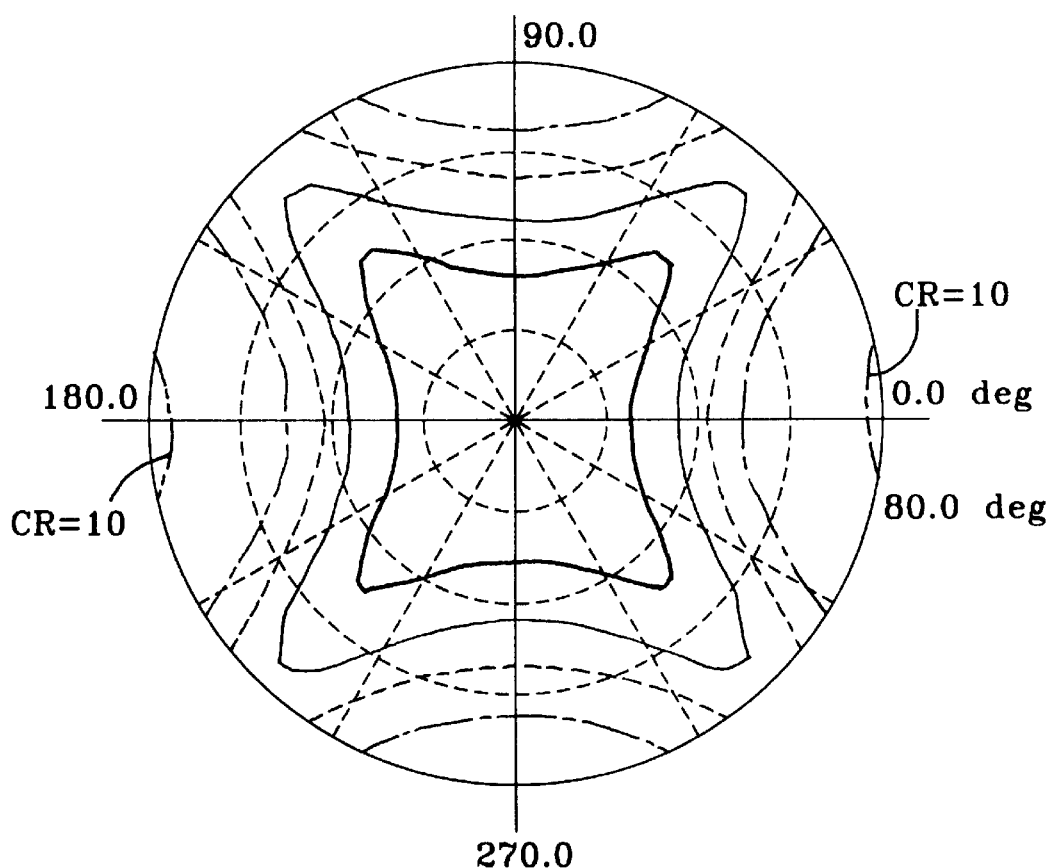
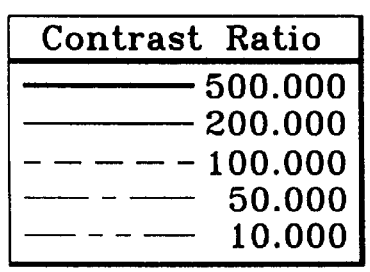

d/p=0    NO CHIRAL d/p=0.0325  FORWARD CHIRAL d/p=0.13  FORWARD CHIRAL d/p=0.325   FORWARD CHIRAL d/p=0.65   FORWARD CHIRAL d/p=0.0325  REVERSE CHIRAL d/p=0.13  REVERSE CHIRAL d/p=0.325 REVERSE CHIRAL

Fig. 78
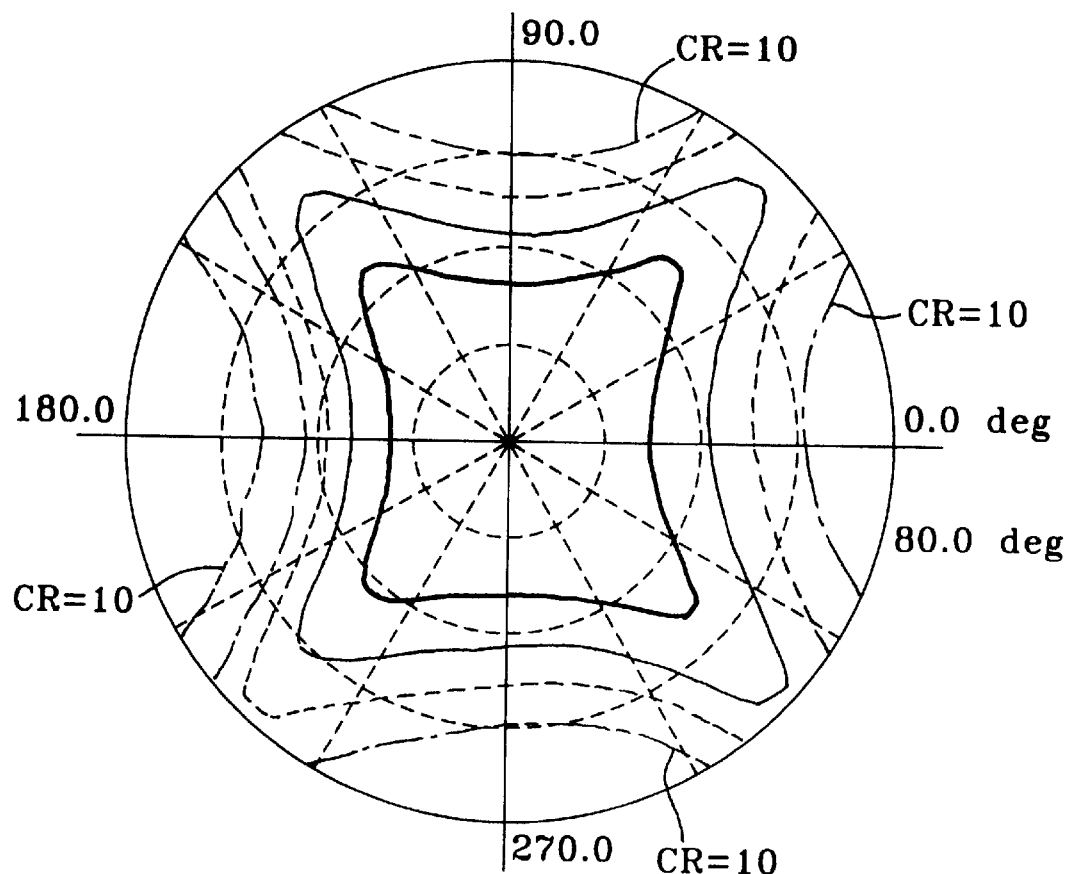
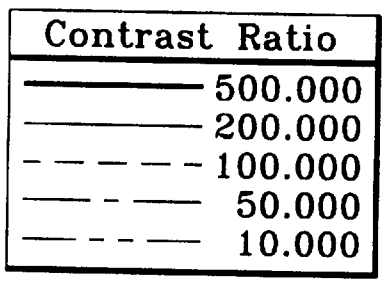

d/p=0.125

LIQUID CRYSTAL DISPLAY DEVICE OPERATING IN A VERTICALLY ALIGNED MODE

BACKGROUND OF THE INVENTION

The present invention generally relates to liquid crystal display devices and more particularly to a liquid crystal display device operating in a so-called VA (Vertically Aligned) mode in which liquid crystal molecules having a negative dielectric anisotropy are aligned generally perpendicularly to a panel surface of the liquid crystal display device.

Liquid crystal display devices are used as a display device of various information processing apparatuses such as a computer. Liquid crystal display devices, having a compact size and consuming little electric power, are particularly suitable for application in portable information processing apparatuses. On the other hand, use of such liquid crystal display devices also in a fixed-type information processing apparatus such as a desktop-type computer, is also being studied.

Conventional liquid crystal display devices generally use a so-called TN (Twisted Nematic)-mode construction in which p-type liquid crystal molecules having a positive dielectric anisotropy are aligned horizontally between a pair of mutually opposing panel substrates, wherein the liquid crystal molecules adjacent to one panel substrate and the liquid crystal molecules adjacent to the other panel substrate are aligned in respective directions crossing with each other perpendicularly.

In such a TN-mode liquid crystal display device, various liquid crystals are already developed, and the liquid crystal display device can be fabricated by a well-established process with low cost.

On the other hand, a TN-mode liquid crystal display device has a drawback in realizing a high contrast representation of images. It should be noted that a TN-mode liquid crystal display device provides a black representation by causing the liquid crystal molecules to align vertically to the principal surface of the panel substrate by applying a driving electric field, while the liquid crystal molecules immediately adjacent to the panel substrate tend to maintain the horizontal alignment even when the driving electric field is applied. Thereby, the birefringence associated with such horizontal liquid crystal molecules allows a passage of light even in the activated state in which the passage of light through the liquid crystal layer should be interrupted completely. Thus, there occurs a leakage of light or coloring of the panel when an attempt is made in a TN-mode liquid crystal display device to display a white image on a black background (so-called "normally black mode") as is commonly adopted in a CRT display device, and the black state or level becomes worse than that of a "normally white mode," in which black images are displayed on a white background, because of dispersion. This is the reason why conventional TN-mode liquid crystal display devices are operated in the normally white mode.

A VA-mode liquid crystal display device is a liquid crystal display device in which liquid crystal molecules having a negative dielectric anisotropy are confined between a pair of panel substrates in a state that the liquid crystal molecules are aligned in a direction generally perpendicular to the principal surface of the panel substrates in a non-activated state of the liquid crystal display device. Thus, a light passes through a liquid crystal layer in such a liquid crystal display device without changing the polarization plane thereof in the non-activated state of the liquid crystal device, and the light is effectively interrupted by a pair of polarizers disposed at both sides of the liquid crystal layer in a crossed Nickol state. In such a VA-mode liquid crystal display device, therefore, it is possible to achieve a near-ideal black representation in the non-activated state of the liquid crystal display device. In other words, such a VA-mode liquid crystal display device can easily achieve a very high contrast representation not possible by a TN-mode liquid crystal display device.

In an activated state of a VA-mode liquid crystal display device, it should be noted that the liquid crystal molecules are aligned generally parallel to the panel substrates due to the electric field applied to the liquid crystal molecules, and a rotation is induced in the polarization state of an incident optical beam. Thereby, the liquid crystal molecules thus activated show a 90°-twist between the first panel substrate and the second panel substrate.

The VA mode itself has been known for a long time. Further, there exists a report about the property of a liquid crystal having a negative dielectric anisotropy (D. de Rossi, J. Appl. Phys. 49(3), March, 1978).

On the other hand, it has been thought conventionally that a VA-mode liquid crystal display device cannot provide the quality of representation comparative to that of a TN-mode liquid crystal display device, in terms of response time, viewing angle characteristics, voltage retention (or voltage holding ratio), and the like. Thus, little effort has been made so far for realizing a practical liquid crystal display device using a VA-mode liquid crystal. Particularly, it has been believed that construction of an active-matrix liquid crystal display device that uses thin-film transistors (TFT) is very difficult.

As a VA-mode liquid crystal can provide a contrast ratio superior to that of a conventional CRT (cathode-ray tube) display device, it is predicted that the major target of such a VA-mode liquid crystal display device would be to replace conventional CRT display devices. In order to achieve this target, however, it is particularly necessary to improve the viewing angle characteristics of the display device, in addition to usual requirements of increasing the display area and improving the response.

Japanese Laid-open Patent Publication 62-180326 describes a VA-mode liquid crystal display device in which a liquid crystal layer formed of liquid crystal molecules having a negative dielectric anisotropy, is confined between a pair of glass substrates such that the liquid crystal molecules align generally perpendicularly to the substrate surface in a non-activated state thereof in which no drive voltage is applied across the glass substrates. The reference further describes a construction to cause a 90°-twist for the liquid crystal molecules in the direction generally parallel to the substrate surface in the activated state thereof in which the drive voltage is applied across the substrates. Further, the reference teaches to dispose a polarizer and an analyzer at respective outer sides of the glass substrates such that respective optical absorption axes intersect perpendicularly with each other.

Japanese Laid-open Patent Publication 3-5721, on the other hand, describes a VA-mode liquid crystal display device in which a liquid crystal layer formed of liquid crystal molecules having a negative dielectric anisotropy, is confined between a pair of substrates. In the above noted reference, the liquid crystal layer has a retardation set in a range between 0.6 μm and 0.9 μm, and first and second birefringence media are disposed at both sides of a liquid crystal panel thus formed. Further, the reference teaches to provide a polarizer and an analyzer at respective outer sides of the foregoing birefringence media so as to cross the respective optical absorption axes perpendicularly. Further, the reference teaches to set the optical absorption axes so as to form a 45° angle with respect to the optical axes of the birefringence media.

Further, Japanese Laid-open Patent Publication 5-113561 describes a photo-conduction type liquid crystal light valve, wherein the reference teaches the use of a liquid crystal of negative dielectric anisotropy for a liquid crystal layer provided adjacent to a photo-conduction layer, such that the liquid crystal molecules align generally perpendicularly to the electrode surface in the non-activated state of the liquid crystal layer. Further, the reference teaches a feature to set the retardation of the liquid crystal layer to be 0.3 $\mu$m or more.

Further, Japanese Laid-open Patent Publication 5-113561 describes a VA-mode liquid crystal display device that includes optical compensation means having a negative optical activity in addition to a pair of substrates that confine a liquid crystal layer of liquid crystal molecules having a negative dielectric anisotropy therebetween, wherein the liquid crystal display device further includes first and second quarter-wavelength phase shift plates such that the first phase shift plate has a positive optical activity and an optical axis parallel to the substrates and such that the second phase shift plate has a negative optical activity and an optical axis parallel to the optical axis of the first phase shift plate. The liquid crystal display device of the reference further includes a polarizer and an analyzer in a crossed Nicol state such that the polarizer and the analyzer sandwich the foregoing construction therebetween.

However, such conventional VA-mode liquid crystal devices, while capable of providing a contrast ratio exceeding the contrast ratio achieved by the conventional TN-mode or STN-mode liquid crystal display devices, cannot provide response, viewing angle characteristics, brightness and colorless representation required for a desktop display device.

SUMMARY OF THE INVENTION

Accordingly, it is a general object of the present invention to provide a novel and useful liquid crystal display device wherein the foregoing problems are eliminated.

Another and more specific object of the present invention is to provide a VA-mode liquid crystal display device in which the liquid crystal display device is optimized with respect to response, viewing angle characteristics and contrast of representation.

Another object of the present invention is to provide a liquid crystal display device, comprising:
first and second substrates opposing each other in a substantially parallel relationship;
a first electrode provided on a first principal surface of said first substrate, said first principal surface facing said second substrate;
a second electrode provided on a second principal surface of said second substrate, said second principal surface facing said first substrate;
a first molecular alignment film provided on said first principal surface of said first substrate so as to cover said first electrode;
a second molecular alignment film provided on said second principal surface of said second substrate so as to cover said second electrode; and
a liquid crystal layer confined between said first and second substrates, said liquid crystal layer containing therein n-type liquid crystal molecules having a negative dielectric anisotropy;
wherein said liquid crystal molecules show a retardation of 80 nm or more but not exceeding 400 nm.

Another object of the present invention is to provide a liquid crystal display device of a direct-view type, comprising:
a liquid crystal panel, said liquid crystal panel comprising: first and second substrates opposing each other in a substantially parallel relationship; a first electrode provided on a first principal surface of said first substrate, said first principal surface facing said second substrate; a second electrode provided on a second principal surface of said second substrate, said second principal surface facing said first substrate; a first molecular alignment film provided on said first principal surface of said first substrate so as to cover said first electrode; a second molecular alignment film provided on said second principal surface of said second substrate so as to cover said second electrode; and a liquid crystal layer confined between said first and second substrates, said liquid crystal layer containing therein n-type liquid crystal molecules having a negative dielectric anisotropy;
a first polarizer disposed at a first side of said liquid crystal panel, said first polarizer having a first optical absorption axis crossing with a center-of-twist axis, said center-of-twist axis bisecting a twist axis of said liquid crystal molecules, with an angle of about 45°;
a second polarizer disposed at a second, opposite side of said liquid crystal panel, said second polarizer having a second optical absorption axis crossing perpendicularly to said first optical absorption axis; and
an optical source disposed at one of said first and second sides of said liquid crystal panel;
said liquid crystal layer showing a retardation of 80 nm or more but not exceeding 400 nm.

According to the present invention, it is possible to realize a colorless, high-response VA-mode liquid crystal display having a very high contrast ratio superior to that of a CRT display device and simultaneously having improved viewing angle characteristics. Because of the improved viewing angle characteristics, the VA-mode liquid crystal display device is particularly suitable for a direct-view type liquid crystal display device, which may be used for desktop applications.

Another object of the present invention is to provide a liquid crystal display device, comprising:
a liquid crystal panel, said liquid crystal panel comprising: first and second substrates opposing each other in a substantially parallel relationship; a first electrode provided on a first principal surface of said first substrate, said first principal surface facing said second substrate; a second electrode provided on a second principal surface of said second substrate, said second principal surface facing said first substrate; a first molecular alignment film provided on said first principal surface of said first substrate so as to cover said first electrode; a second molecular alignment film provided on said second principal surface of said second substrate so as to cover said second electrode; and a liquid crystal layer confined between said first and second substrates, said liquid crystal layer containing therein liquid crystal molecules having a negative dielectric anisotropy;
a first polarizer disposed at a first side of said liquid crystal panel; and a second polarizer disposed at a second, opposite side of said liquid crystal panel;

wherein said liquid crystal display device further comprises first and second retardation films disposed in one of a first gap formed between said liquid crystal panel and said first polarizer and a second gap formed between said liquid crystal panel and said second polarizer, said first and second retardation films having a positive optical anisotropy and a negative optical anisotropy respectively, and wherein said first retardation film is disposed closer to said liquid crystal panel than said second retardation film.

According to the present invention, the viewing angle characteristics of the liquid crystal display device are improved substantially by employing the first and second retardation films, wherein the effect of the improvement is enhanced further by arranging the first retardation film to be located closer to the liquid crystal panel as compared with the second retardation film.

Another object of the present invention is to provide a liquid crystal display device, comprising:

a liquid crystal panel, said liquid crystal display panel comprising: first and second substrates opposing each other in a substantially parallel relationship; a first electrode provided on a first principal surface of said first substrate, said first principal surface facing said second substrate; a second electrode provided on a second principal surface of said second substrate, said second principal surface facing said first substrate; a first molecular alignment film provided on said first principal surface of said first substrate so as to cover said first electrode; a second molecular alignment film provided on said second principal surface of said second substrate so as to cover said second electrode; and a liquid crystal layer confined between said first and second substrates, said liquid crystal layer containing therein liquid crystal molecules having a negative dielectric anisotropy;

a first polarizer disposed at a first side of said liquid crystal panel; and a second polarizer disposed at a second, opposite side of said liquid crystal panel;

wherein said liquid crystal layer has a retardation $\Delta n \cdot d$ satisfying a relationship $$\psi/549 \leq \Delta n \cdot d \leq (225+\psi)/549$$

where $\psi$ is a twist angle of the liquid crystal molecules.

According to the present invention, the problem of coloring of the VA-mode liquid. crystal display device is successfully minimized by optimizing the twist of the liquid crystal molecules in the liquid crystal layer such that the liquid crystal molecules cause a twisting uniformly in the thickness direction of the liquid crystal layer with an optimum pitch p with respect to the thickness d of the liquid crystal layer.

Other objects and further features of the present invention will become apparent from the following detailed description when read in conjunction with the attached drawings.

BRIEF DESCRIPTION OF THE DRAWINGS

FIGS. 3A–3D are diagrams showing a dynamic performance of the liquid crystal display device of FIG. 1 for various constructions;

FIG. 4A is a diagram showing a modification of the liquid crystal display device of FIG. 1 in which a retardation film is added adjacent to a liquid crystal panel in the construction of FIG. 1;

FIGS. 32–34 are diagrams showing viewing angle characteristics of the liquid crystal display device of FIG. 4A for various settings of the twist angle of liquid crystal molecules forming the liquid crystal layer in the device of FIG. 4A;

FIGS. 40–43 are diagrams showing viewing angle characteristics of the liquid crystal display device of FIG. 4A for various pre-tilt angles of the liquid crystal molecules;

FIG. 44 is a diagram showing viewing angle characteristics of a typical twist-nematic liquid crystal display device;

FIGS. 47A and 47B are diagrams showing viewing angle characteristics of the liquid crystal display device of FIG. 45 for a case in which a retardation film is added;

FIG. 51 is a diagram showing a construction of the liquid crystal display device according to a third embodiment of the present invention;

FIG. 56 is a diagram showing viewing angle characteristics of the liquid crystal display device of FIG. 51;

FIG. 57 is a diagram showing a construction of the liquid crystal display device according to a fourth embodiment of the present invention;

FIG. 61 is a diagram showing viewing angle characteristics of the liquid crystal display device of FIG. 60;

FIG. 66 is a diagram showing the result of simulation for the viewing angle characteristics of the liquid crystal display device of the seventh embodiment.

FIGS. 78 and 79 are diagrams showing respectively viewing angle characteristics and chromaticity characteristics of a liquid crystal display device according to a modification of the eighth embodiment;

DETAILED DESCRIPTION OF THE PREFERRED EMBODIMENTS

First, the principle of the present invention will be explained.

Figure 1:
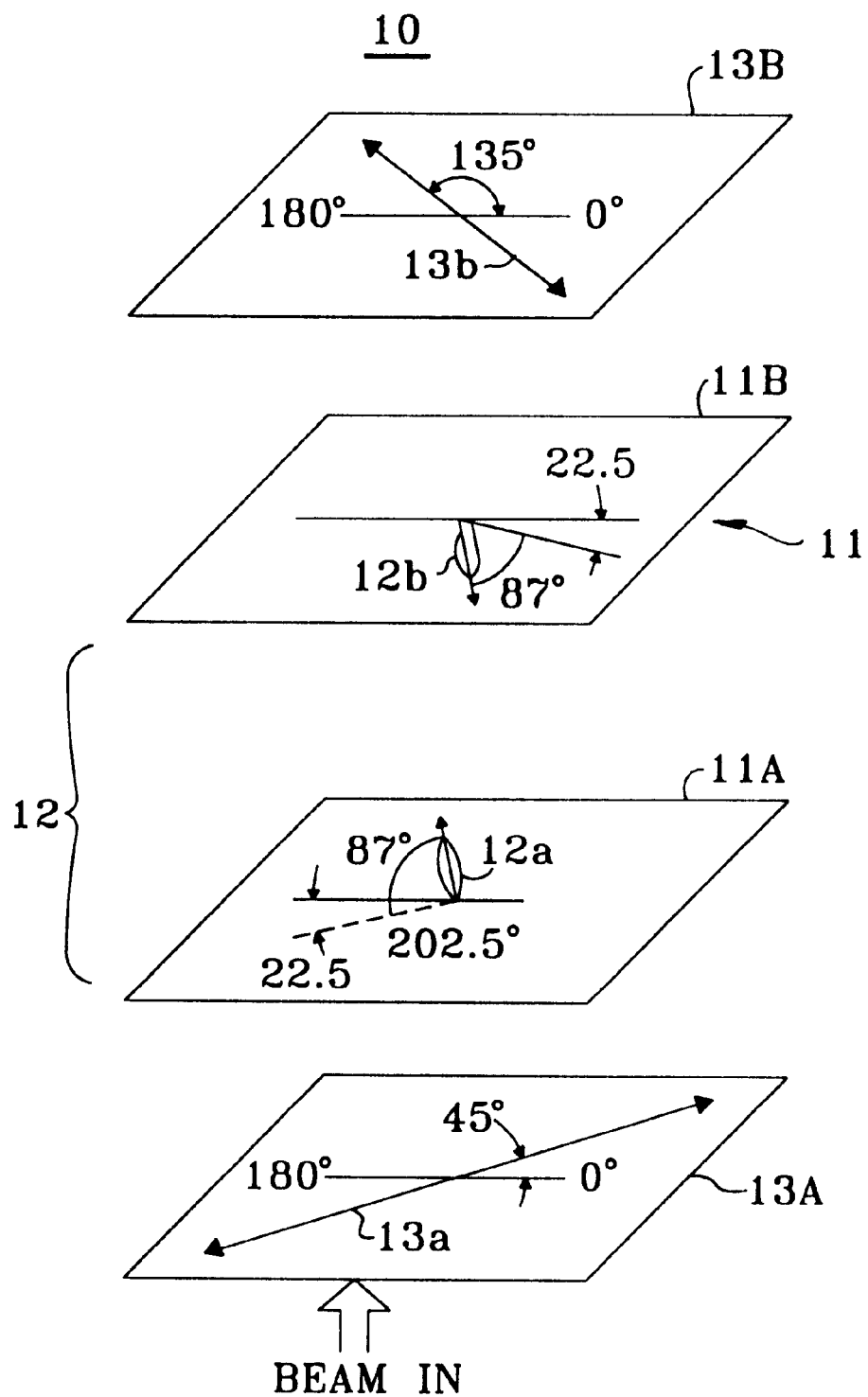
FIG. 1 is a diagram showing the fundamental construction of a liquid crystal display device of the present invention.

FIG. 1 shows the construction of a liquid crystal display device 10, wherein it should be noted that FIG. 1 represents the fundamental construction of the liquid crystal display device of the present invention.

Referring to FIG. 1, the liquid crystal device 10 includes a pair of mutually opposing glass substrates 11A and 11B confining therebetween a liquid crystal layer 12 having a thickness d. Thereby, the substrates 11A and 11B and the liquid crystal layer 12 form together a liquid crystal panel 11. Further, a first polarizer 13A having an absorption axis 13a in a first direction is disposed below the liquid crystal panel 11, and a second polarizer (called also "analyzer") 13B having an absorption axis 13b in a second direction is disposed above the liquid crystal panel 11.

In the liquid crystal display device 10 of FIG. 1, it should be noted that the liquid crystal layer 12 is formed of an n-type liquid crystal having a negative dielectric anisotropy. Thereby, each of the substrates 11A and 11B carries thereon a molecular alignment layer (not shown), and the molecular alignment films thus formed are prepared, typically by means of rubbing, such that liquid crystal molecules 12a adjacent to the lower substrate 11A are aligned generally vertically to the substrate 11A. Similarly, liquid crystal molecules 12b adjacent to the upper substrate 11B are aligned generally vertically to the substrate 11B. In other words, the liquid crystal display device 10 is a device of the so-called VA (vertically aligned)-mode.

In the construction of FIG. 1, it should be noted that the lower substrate 11A carries, on an upper major surface thereof, a first molecular alignment layer (not illustrated, to be described later with reference to embodiments), wherein the first molecular alignment layer is subjected to a rubbing process in a direction offset in the counter-clockwise direction from the longer edge of the substrate 11A by an angle of 22.5°. The first molecular alignment layer thus processed causes a director, which indicates the direction of alignment of the liquid crystal molecules 12a, to point a direction offset in an upward direction from the rubbing direction of the first molecular alignment layer by an angle of about 87°.

Similarly, the upper substrate 11B carries, on a lower major surface thereof, a second molecular alignment layer (not illustrated, to be described later with reference to embodiments), wherein the second molecular alignment layer is subjected to a rubbing process in a direction offset in the clockwise direction from the longer edge of the substrate 11B by an angle of 22.5°. The second molecular alignment layer thus processed causes a director of the liquid crystal molecules 12b to point a direction offset in a downward direction from the rubbing direction of the second molecular alignment layer by an angle of about 87°. Thereby, the liquid crystal molecules in the liquid crystal layer 12 form a twist angle of 45° between the upper and lower substrates 11A and 11B.

It should be noted that the substrates 11A and 11B are set in the respective orientations, when forming the liquid crystal panel 11, such that the general rubbing direction of the substrate 11A and the general rubbing direction of the substrate 11B are opposite of each other.

As already noted, the polarizer 13A having the absorption axis 13a is disposed below the liquid crystal panel 11, wherein the polarizer 13A polarizes an optical beam incident to the liquid crystal panel 11 from the lower direction, such that the plane of polarization is perpendicular to the foregoing absorption axis 13a. Similarly, the polarizer 13B having the absorption axis 13b is disposed above the liquid crystal panel 11, wherein the polarizer 13B polarizes the optical beam incident to the liquid crystal panel 11 from the lower direction, such that the plane of polarization is perpendicular to the absorption axis 13b.

Thus, by disposing the polarizers 13A and 13B such that respective absorption axes 13a and 13b intersect each other perpendicularly, it is possible to interrupt the optical beam passing through the liquid crystal panel 11 without a substantial change of the polarization plane. In other words, the polarizer 13B interrupts the optical beam polarized by the polarizer 13A and passed through the liquid crystal panel 11 without experiencing a rotation of the polarization plane, and the liquid crystal display device provides a black representation.

It should be noted that each of the substrates 11A and 11B carries a transparent electrode (not illustrated) in the state that the transparent electrode is embedded in the molecular alignment layer. In the non-activated state of the liquid crystal device in which no drive voltage is applied across the electrodes, the liquid crystal molecules in the liquid crystal layer 12 align generally vertically to the substrates as in the case of the liquid crystal molecule 12a or the liquid crystal molecule 12b. Thereby, a near-ideal black representation is achieved in the non-activated state of the liquid crystal display device.

In an activated state, on the other hand, the liquid crystal molecules are aligned generally parallel to the substrates 11A and 11B. Thereby, the optical beam passing through the liquid crystal panel 11 experiences a rotation of the polarization plane due to such horizontally aligned liquid crystal molecules and passes through the polarizer 13B. Thereby, the liquid crystal display device 10 provides a white representation in the activated state.

Figure 2A:
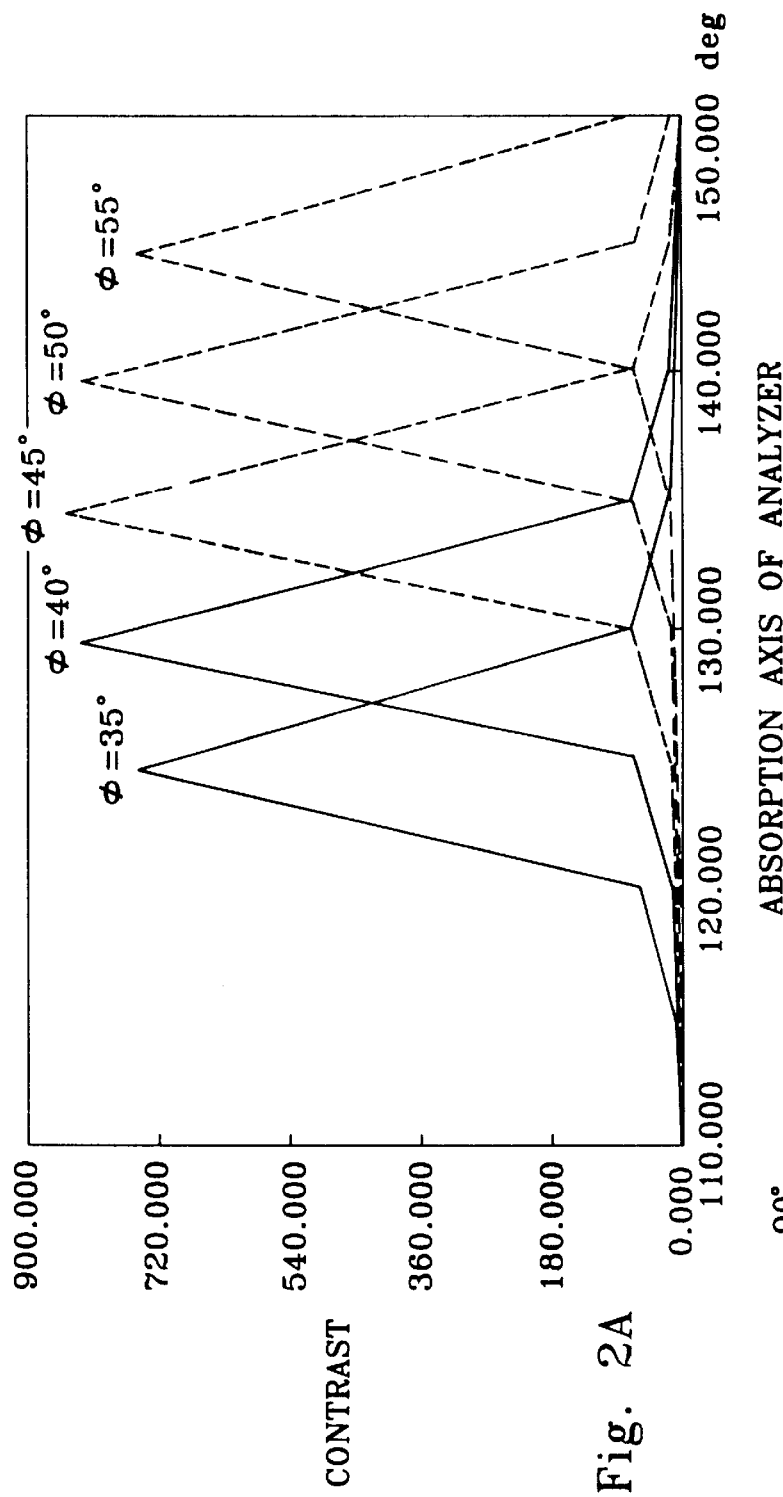
FIGS. 2A and 2B are diagrams respectively showing the relationship between the contrast and orientation of polarizers used in the liquid crystal display device of FIG. 1 and the definition of parameters used in FIG. 2A.
Figure 2B:
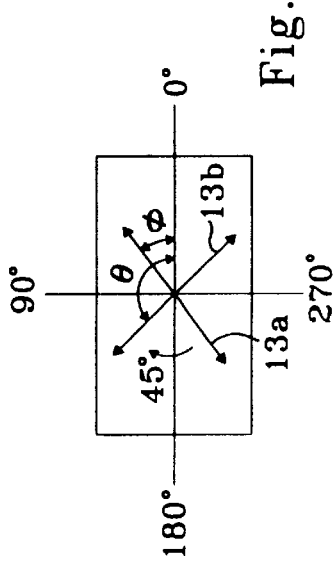

FIG. 2A shows the contrast ratio achieved by the liquid crystal display device 10 for the case in which the angle $\phi$ of the absorption axis 13a and the angle $\theta$ of the absorption axis 13b are changed variously, wherein the definition of the angles $\phi$ and $\theta$ is given in FIG. 2B. The contrast ratio was measured by comparing the transmittance of the liquid crystal display device 10 for the non-activated state in which no drive voltage is applied and the transmittance of an activated state in which a drive voltage of 5 V is applied.

In the example of FIG. 2A, a liquid crystal supplied from E. Merck, Inc. (MJ95785, $^\Delta n=0.0813$, $^\Delta \in=-4.6$) is used for the liquid crystal layer 12, wherein $_\Delta \in$ represents the dielectric anisotropy of the liquid crystal, while $_\Delta n$ represents the birefringence of the liquid crystal defined as $_\Delta n=n_e-n_o$, in which $n_e$ is a refractive index of an extraordinary ray in the liquid crystal while $n_o$ represents a refractive index of an ordinary ray also in the liquid crystal. Further, a commercially available product of Nitto Denko KK (G1220DU) is used for the polarizers 13A and 13B. The thickness d of the liquid crystal layer 12 is set to 3.5 $\mu$m.

In FIG. 2B showing the definition of the angles $\phi$ and $\theta$, it should be noted that, in order to represent the twist angle and to define the center of the twist clearly, the upper substrate 1B is illustrated in a state rotated by 180° to the state of FIG. 1.

Referring to FIG. 2A, it should be noted that the contrast ratio of the liquid crystal display device 10 becomes maximum in the crossed-Nickol state in which the absorption axis 13a of the polarizer 13A and the absorption axis 13b of the polarizer 13B intersect perpendicularly, and particularly when the angle $\phi$ is set to 45° ($\phi$=45°). In this state, it should be noted that the absorption axis 13a of the polarizer 13A forms an angle of 45° with respect to the center line C of twist, which coincides with a line represented in FIG. 2B by 0°–180°. In the crossed Nickol state, therefore, the angle of the absorption axis 13b of the polarizer 13B with respect to the center line C of the twist becomes 135°.

It will be obvious that a similar maximum of the contrast ratio is also achieved when the angles $\phi$ and $\theta$ are set respectively to −45° and −135°. In this case, the absorption axis 13a of the polarizer 13A forms the angle of 135° with respect to the center line C of the twist, while the absorption axis 13b of the polarizer 13B forms the angle of 45°.

As will be seen from FIG. 2A, the liquid crystal display device 10 achieves a contrast ratio exceeding 700 for any settings of the angles $\phi$ and $\theta$. This is a remarkable improvement over normal TN-mode liquid crystal display devices, in which the maximum contrast ratio is in the order of 100 at best.

FIGS. 3A–3D show the operational characteristics of the liquid crystal display device 10 of FIG. 1, wherein the results shown in FIGS. 3A–3D are for the liquid crystal display device having the construction described already.

Referring to the drawings, FIG. 3A shows the waveform of the drive voltage pulse applied to the liquid crystal layer in the liquid crystal panel 11, while FIG. 3B shows the change of the transmittance occurring in the liquid crystal panel 11 in response to the drive voltage pulse of FIG. 3A.

In FIG. 3B, the continuous line represents the result in which no chiral substance is added to the liquid crystal layer 12 in the panel 11, while the broken line represents the result in which a chiral substance is added, as is commonly practiced in a TN-mode liquid crystal display device. The result of FIG. 3B is for the case in which the thickness d of the liquid crystal layer 12 is set to 3.5 $\mu$m and the twist angle of the liquid crystal molecules is set to 45° as already noted. In the example of FIG. 3B, the chiral substance admixed in the liquid crystal layer 12 has a pitch p set such that a ratio d/p with respect to the thickness d of the liquid crystal layer is 0.25.

The result of FIG. 3B clearly indicates that admixing of the chiral substance in the liquid crystal layer 12 provides an adverse effect on the dynamic response of the liquid crystal display device 10 substantially. More specifically, it is noted that, while the liquid crystal display device 10 shows a high optical transmittance continuously in response to the drive voltage pulse of FIG. 3A for the entire duration of the drive voltage pulse when no chiral substance is added to the liquid crystal layer, the optical transmittance decreases with time when the chiral substance is added, even when the electric drive pulse is applied to the liquid crystal layer 12 continuously with a constant magnitude.

FIG. 3C shows the transmittance of the liquid crystal display device 10 in response to the voltage pulse of FIG. 3A for the case in which the thickness d of the liquid crystal layer 12 is set to 3.5 $\mu$m, wherein the twist angle of the liquid crystal molecules is changed in the experiment of FIG. 3C in the range between 0°–90°. As will be seen clearly from FIG. 3C, the dynamic response is not affected substantially by the twist angle of the liquid crystal molecules. In the experiment of FIG. 3C, it should be noted that the twist angle was controlled by setting the rubbing directions of the substrates 11A and 11B.

FIG. 3D shows the change of the transmittance in response to the voltage pulse of FIG. 3A of the liquid crystal display device 10 wherein the thickness d of the liquid crystal layer 12 is changed variously in the range between 4.5 µm and 2.5 µm. As can be seen clearly from FIG. 3D, the magnitude of change of the transmittance decreases with the decrease of the thickness d. Further, it should be noted that a turn-on transient time $T_{on}$, indicating the time needed for the transmittance of the liquid crystal display device 10 to reach, starting from a 0% transmittance state, a 90% transmittance state of the saturated transmittance (T=100%), decreases with decreasing thickness d of the liquid crystal layer 12. Similarly, a turn-off transient time $T_{off}$, indicating the time needed for the transmittance of the device 10 to reach, starting from a saturated transmittance state (T=100%), a 10% transmittance state of the saturated state, decreases with decreasing thickness d of the liquid crystal layer 12. In other words, the response of the liquid crystal display device 10 becomes faster with decreasing thickness d of the liquid crystal layer 12. Particularly, the rising and falling of the transmittance becomes very sharp when the thickness d is set to 2.5 µm or less.

FIG. 4A shows the construction of a liquid crystal display device 20 in which a retardation film 14A is added to the structure of FIG. 1 below the liquid crystal panel 11 for improving the viewing angle characteristics of the liquid crystal display device further. It should be noted that the retardation film 14A compensates for a phase shift of the optical beam passing through or passed through the liquid crystal layer 12 in the liquid crystal panel 11.

In the construction of FIG. 4A, it should be noted that the retardation film 14A provides a negative retardation $_A n \cdot d_1$ in the z-direction ($_A n = n_y - n_z = n_x - n_z$; where $n_x$, $n_y$ and $n_z$ represent refractive indices specified by a refractive index ellipsoid respectively on the principal axes x, y and z; $d_1$ represents the thickness of the retardation film), wherein the retardation film 14A is disposed between the polarizer 13A and the liquid crystal panel 11. Thereby, the retardation film 14A compensates for the birefringence occurring in the optical beam passing through the liquid crystal panel 11.

Figure 4B:
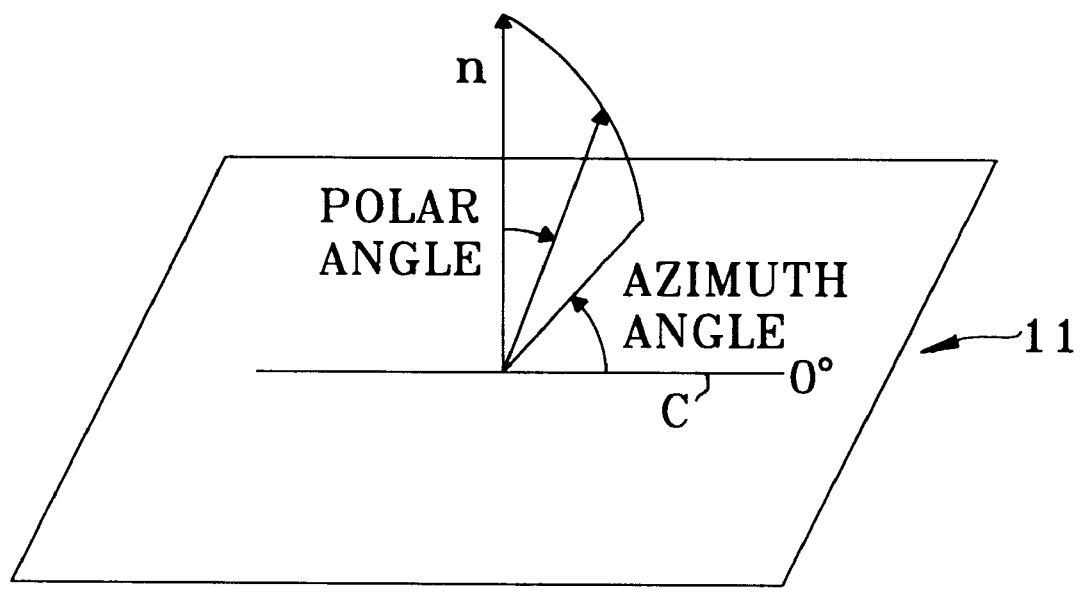
FIG. 4B is a diagram showing a definition of the azimuth angle and the polar angle.

FIGS. 5–14 represent the viewing angle characteristics of the liquid crystal display device 20 including the retardation film 14A, for various values of the retardation R' produced by the retardation film 14A, wherein each of FIGS. 5–14 shows a contrast ratio CR achieved by the liquid crystal display device 20 in the form of contour lines. In the illustrated examples, the contrast ratio CR is represented for the values of 500.0, 200.0, 100.0, 50.0 and 10.0, wherein the contour lines are represented in a coordinate system shown in FIG. 4B specified by an azimuth angle and a polar angle. As indicated in FIG. 4B, the azimuth angle is measured in the plane parallel to the liquid crystal panel from the center line C of the twist, while the polar angle is measured from a normal to the liquid crystal panel. The polar angle becomes zero in the direction perpendicular to the liquid crystal panel 11.

Each of FIGS. 5–14 includes azimuth angles of 0.0°, 90.0°, 180.0° and 270.0° as represented along the circumference and a polar angle of 0.0° to 80.0° in the form of concentric circles. In each of FIGS. 5–14, the center of the circle indicates the front direction of the liquid crystal display device 20 where the polar angle is 0.0°. Further, the outermost circle represents the polar angle of 80.0°. In the experiments of FIGS. 11–20, the birefringence $_A n$ of the liquid crystal panel is set to 0.0804, the thickness d to 3 µm, the twist angle of the liquid crystal molecules to 45°, and the pre-tilt angle to 89°. Thus, the liquid crystal panel 11 provides a retardation $_A n \cdot d$ of 241 nm.

Figure 5:
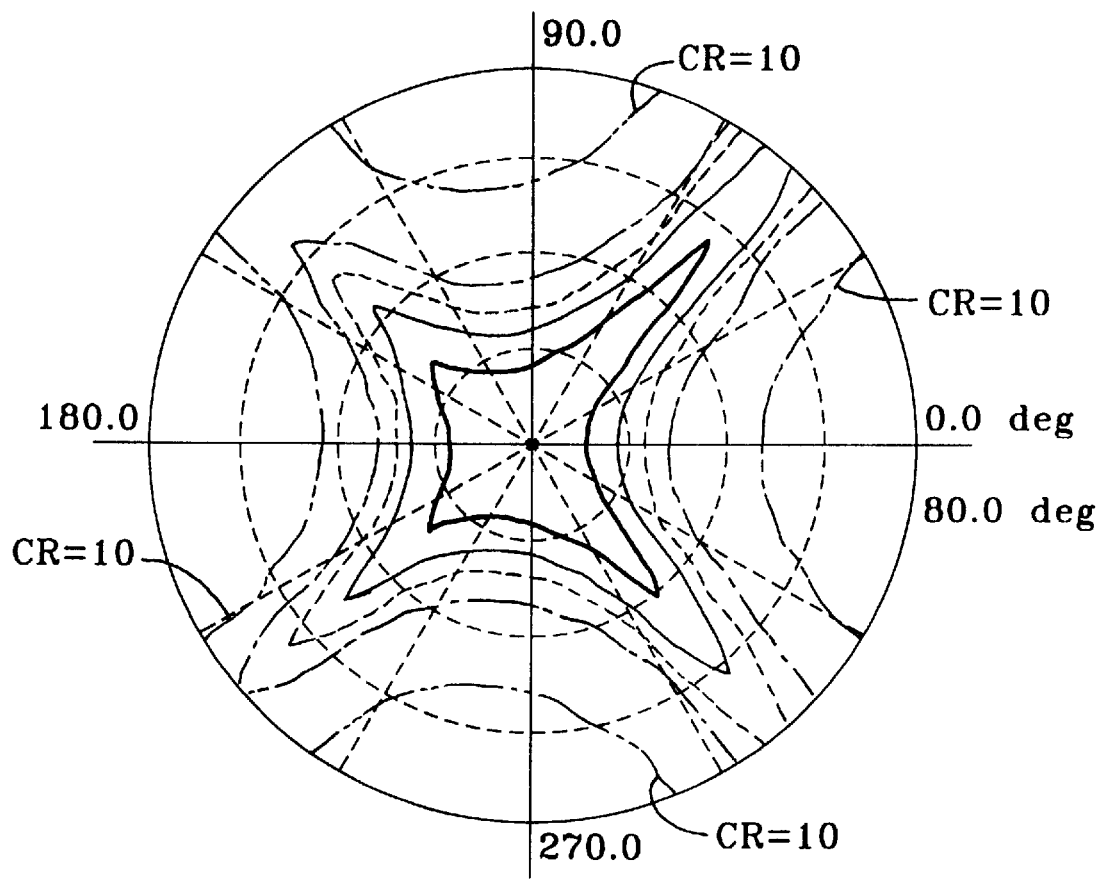
FIGS. 5–14 are diagrams showing viewing angle characteristics of the liquid crystal display device of FIG. 4A for various settings of retardation of the retardation film.
Figure 6:
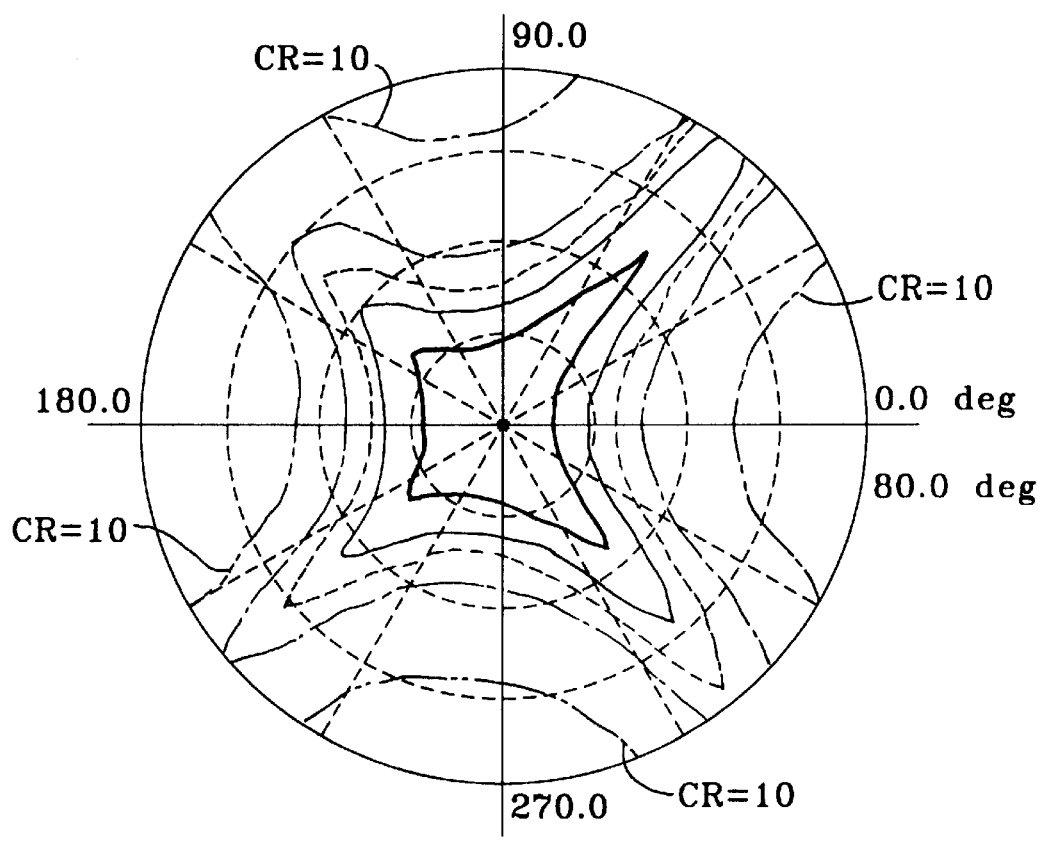
Figure 7:
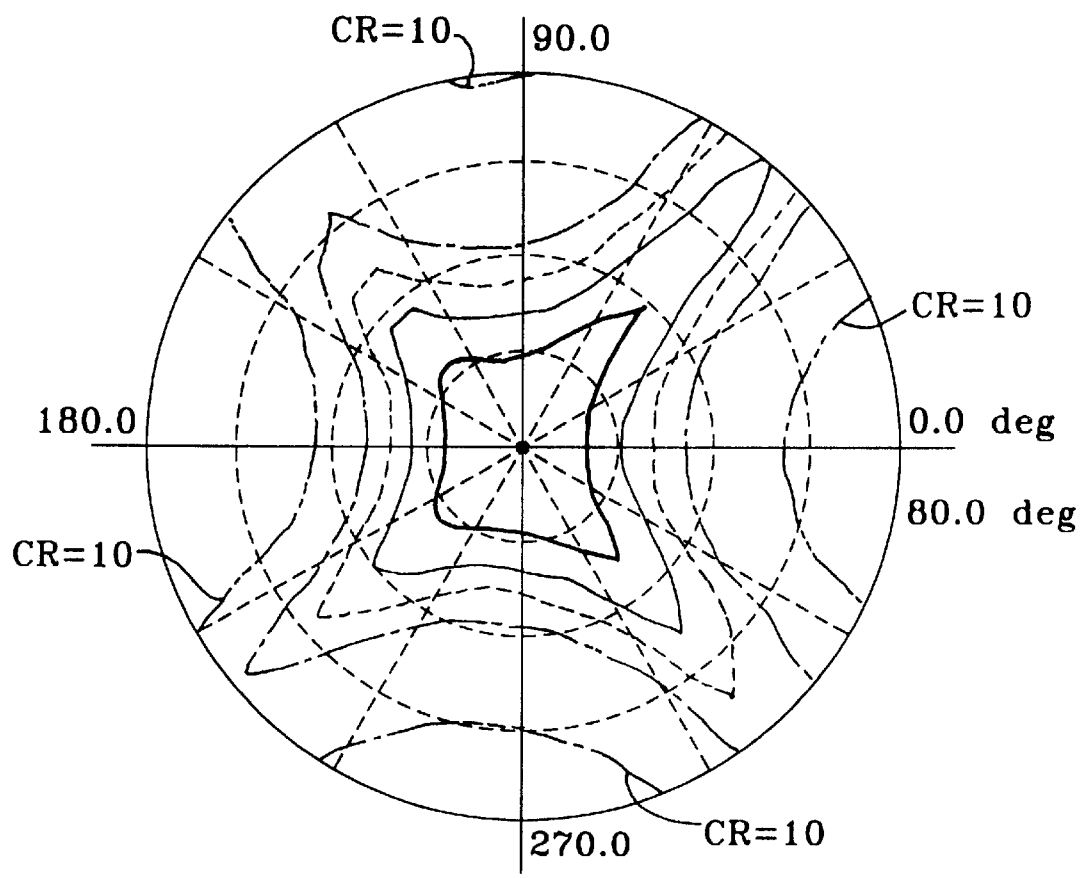
Figure 8:
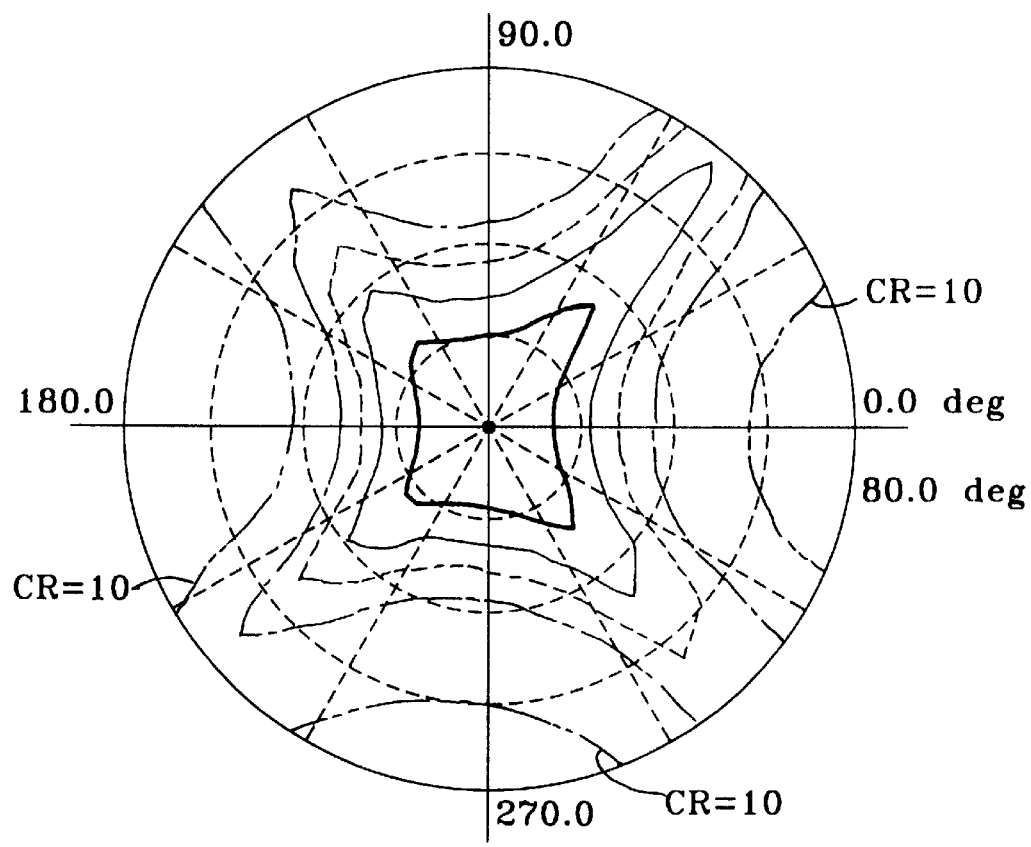
Figure 9:
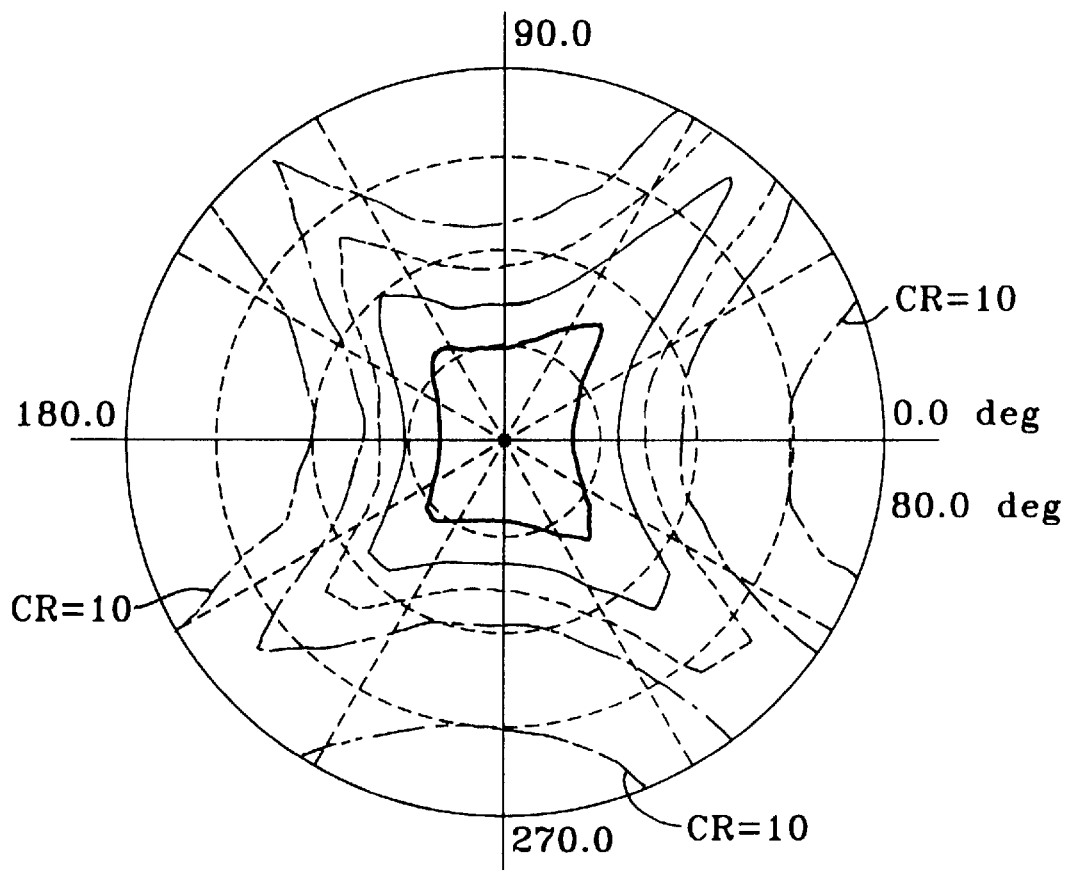
Figure 10:
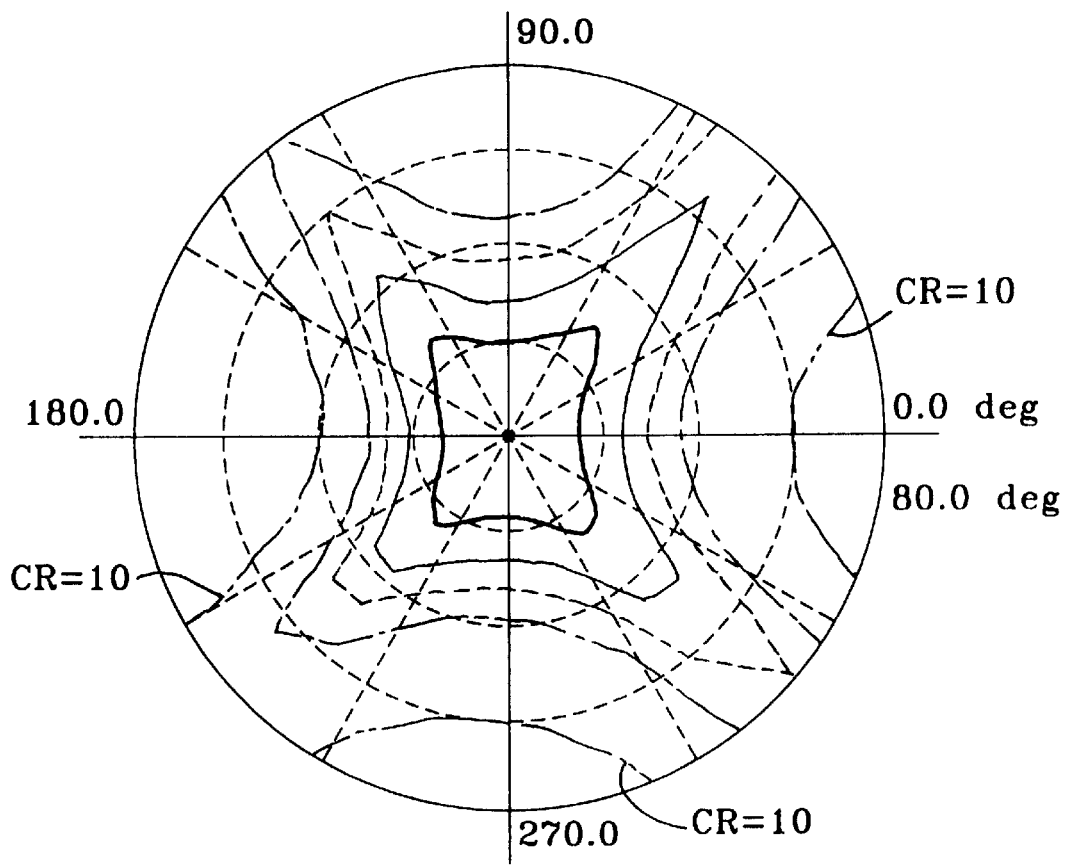
Figure 11:
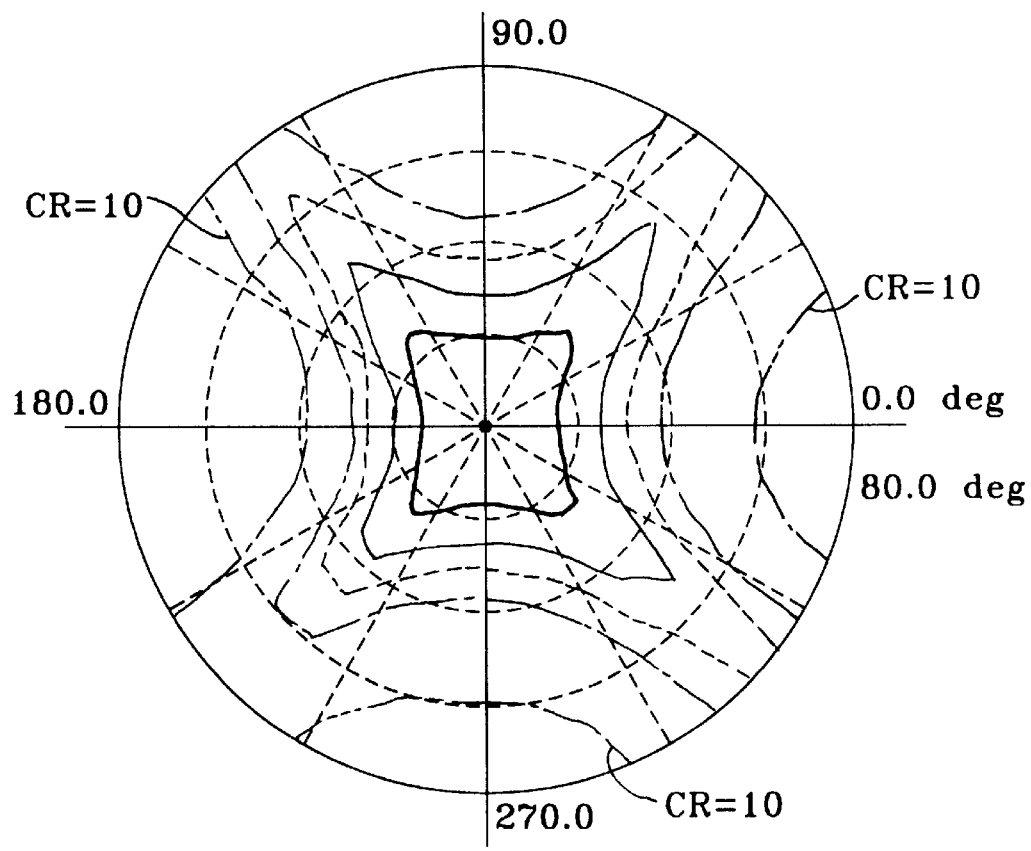
Figure 12:
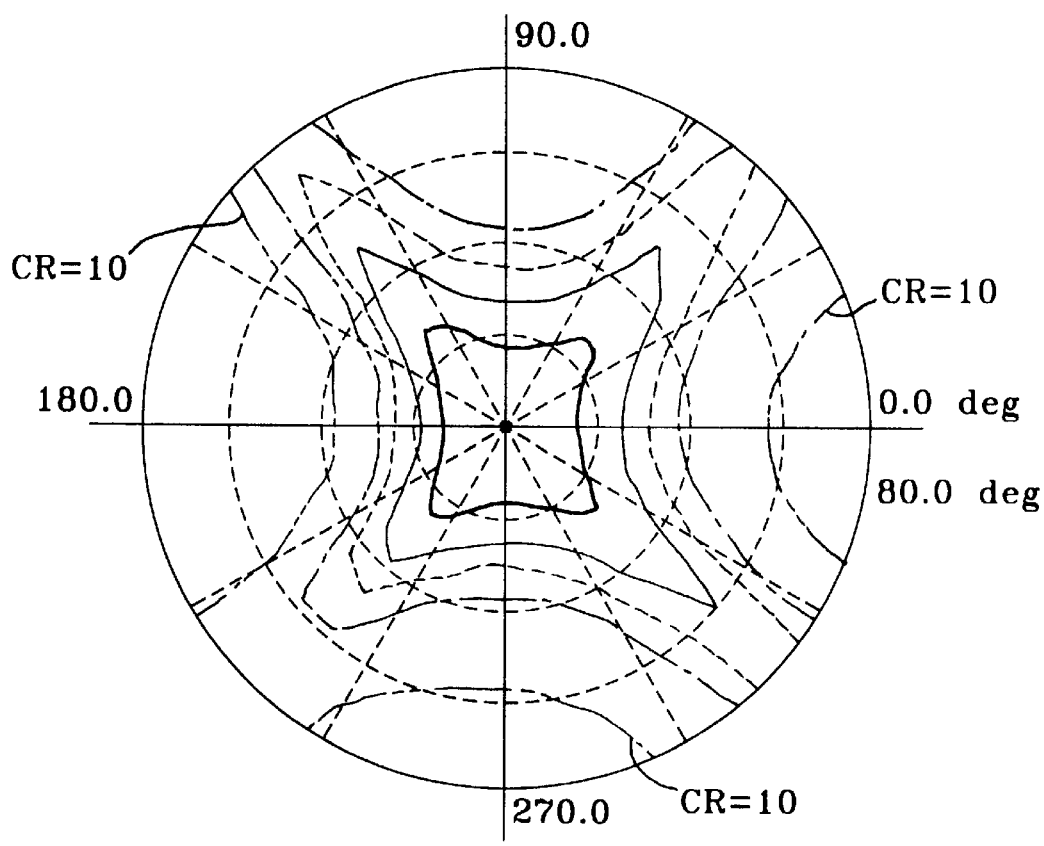
Figure 13:
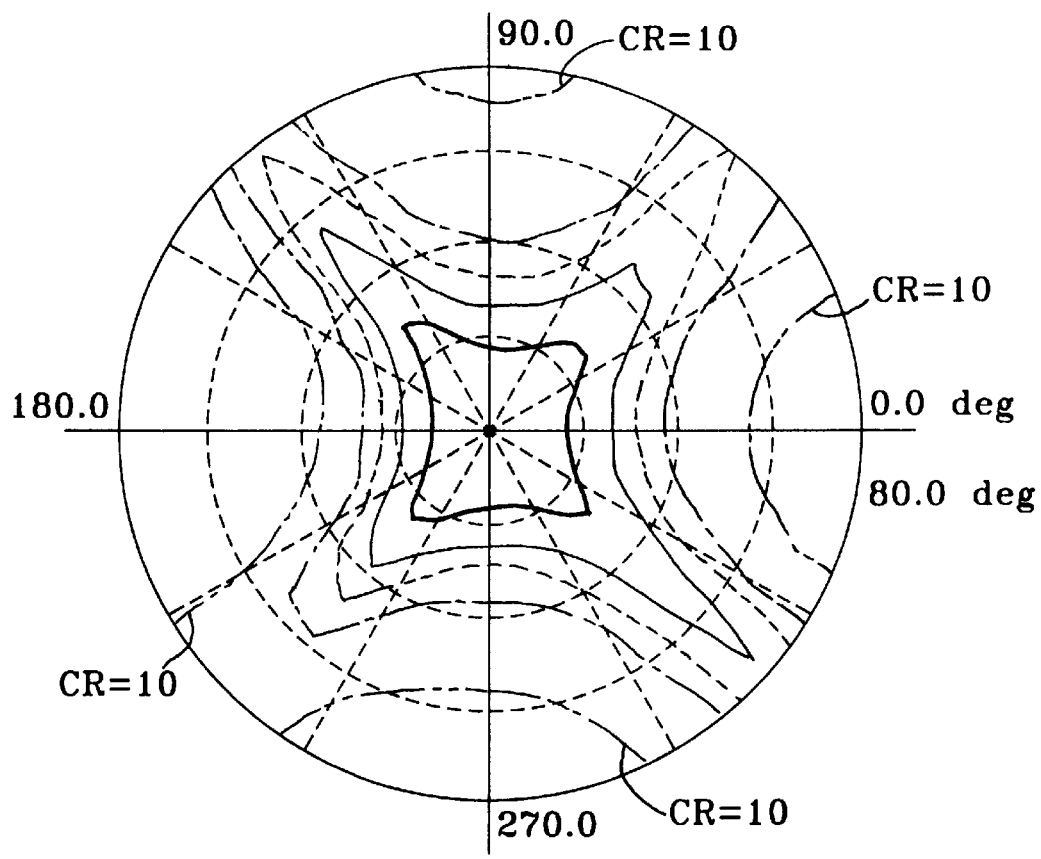
Figure 14:
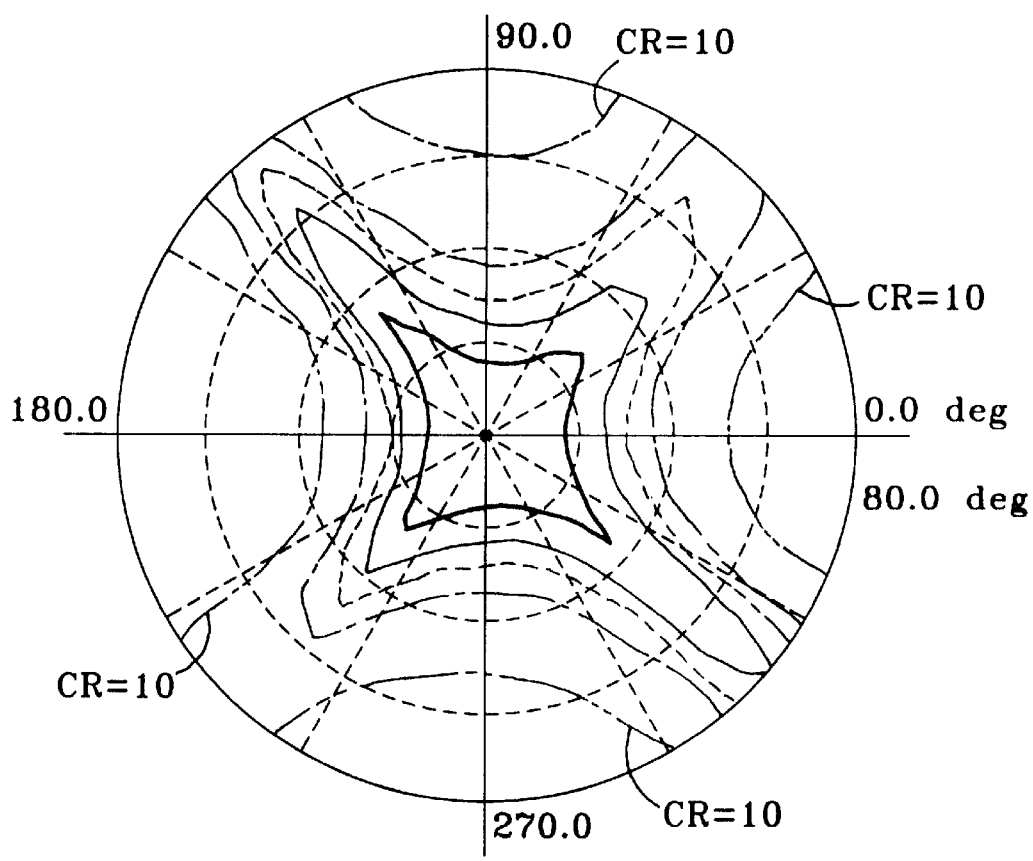
Figure 15:
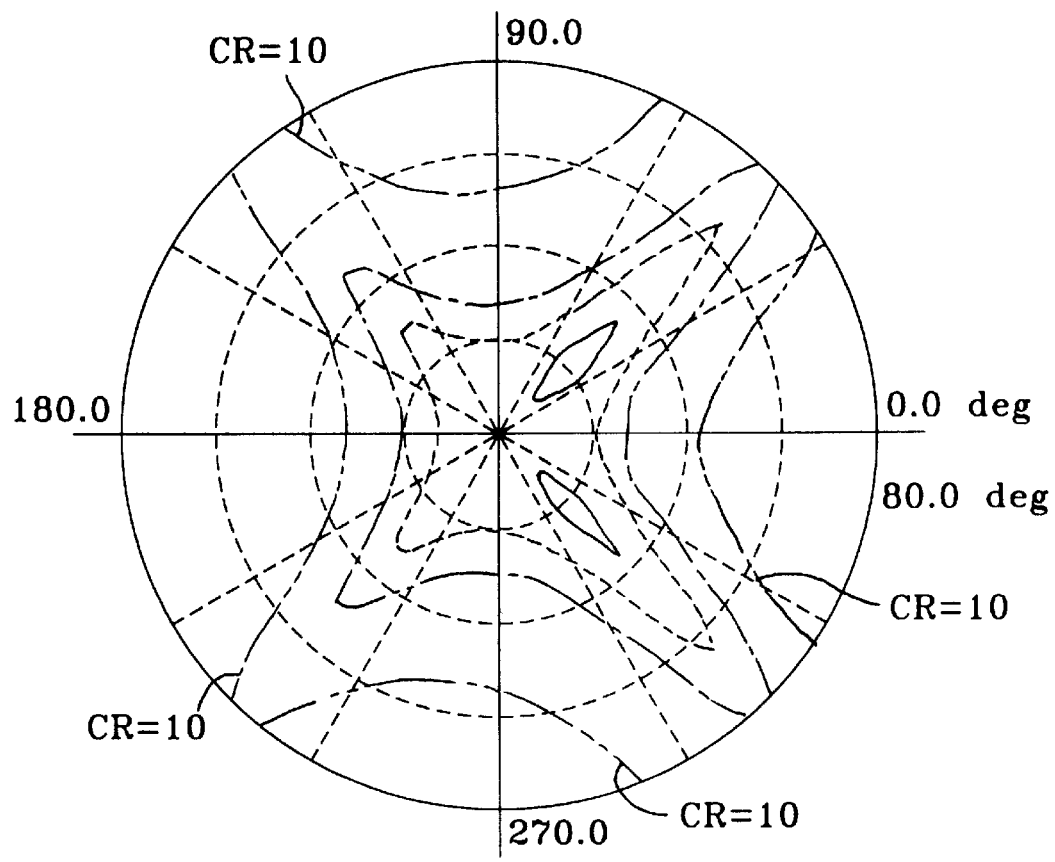
FIGS. 15–20 are diagrams showing viewing angle characteristics of the liquid crystal display device of FIG. 4A for various thickness d of liquid crystal layer of the liquid crystal panel.
Figure 16:
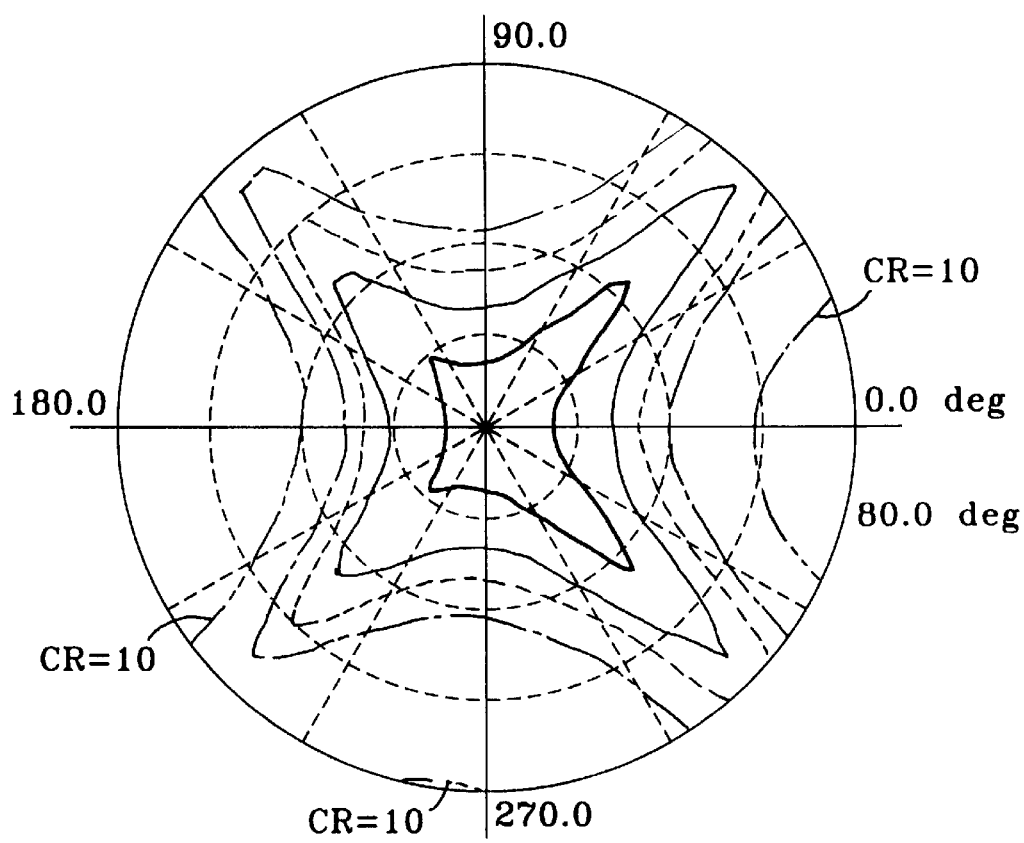
Figure 17:
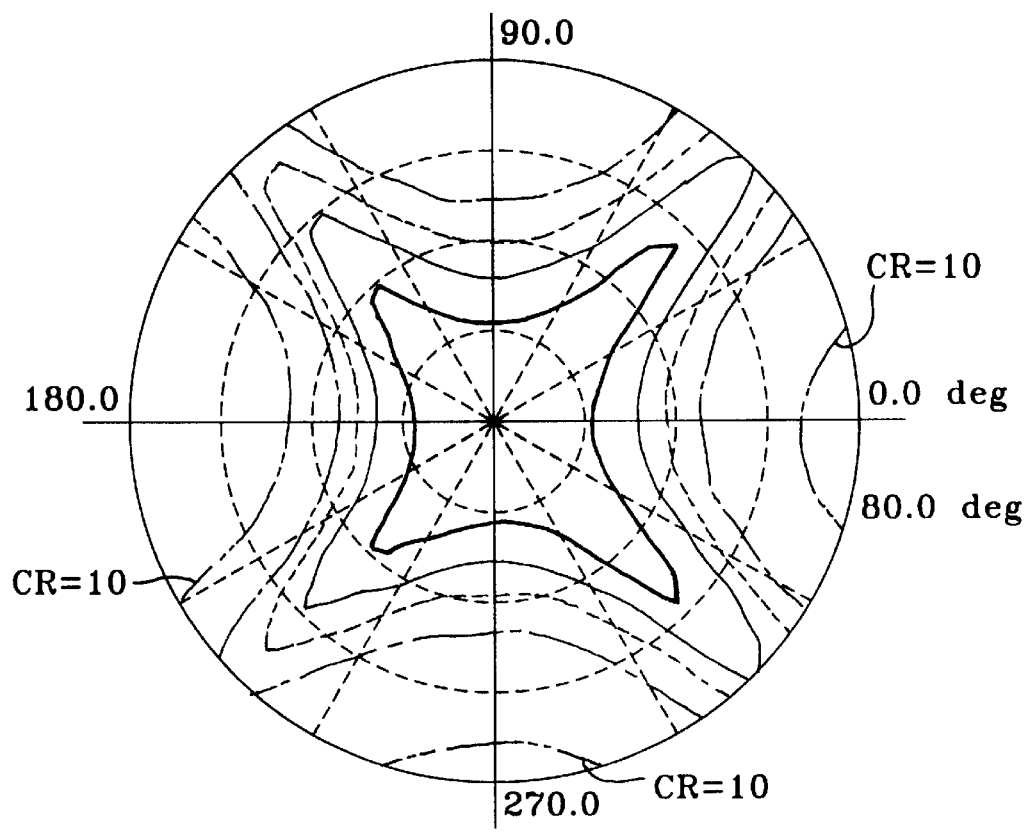
Figure 18:
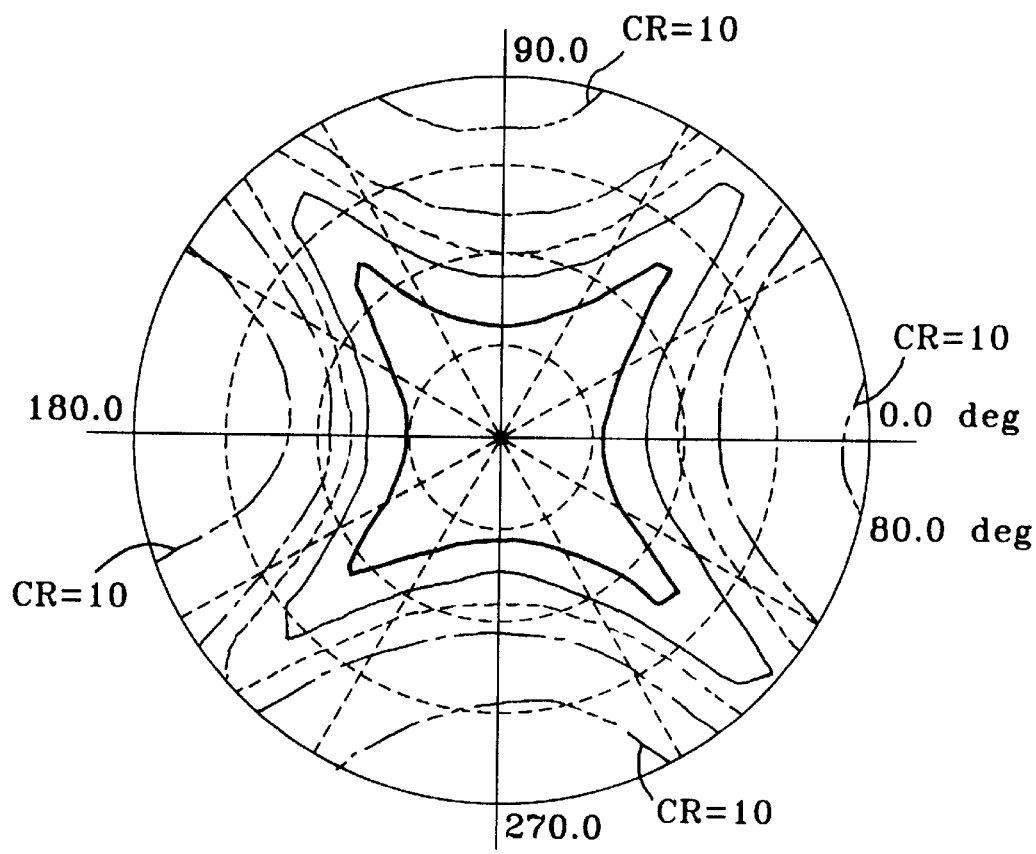
Figure 19:
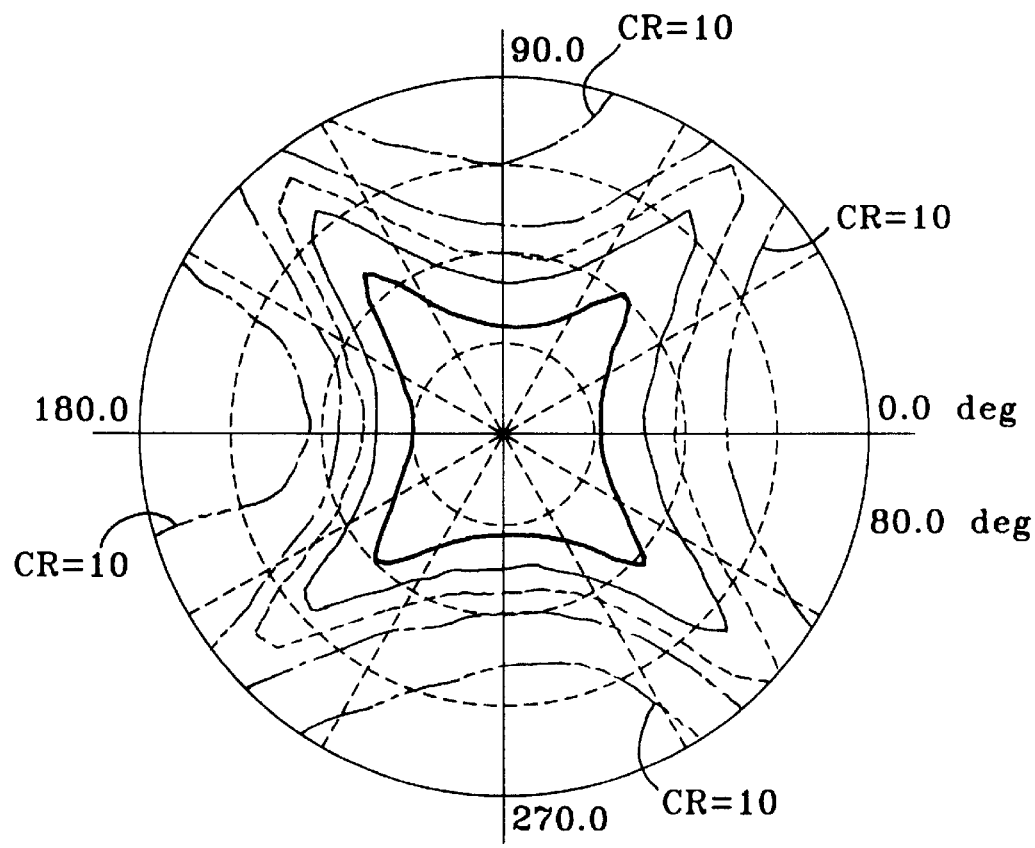
Figure 20:
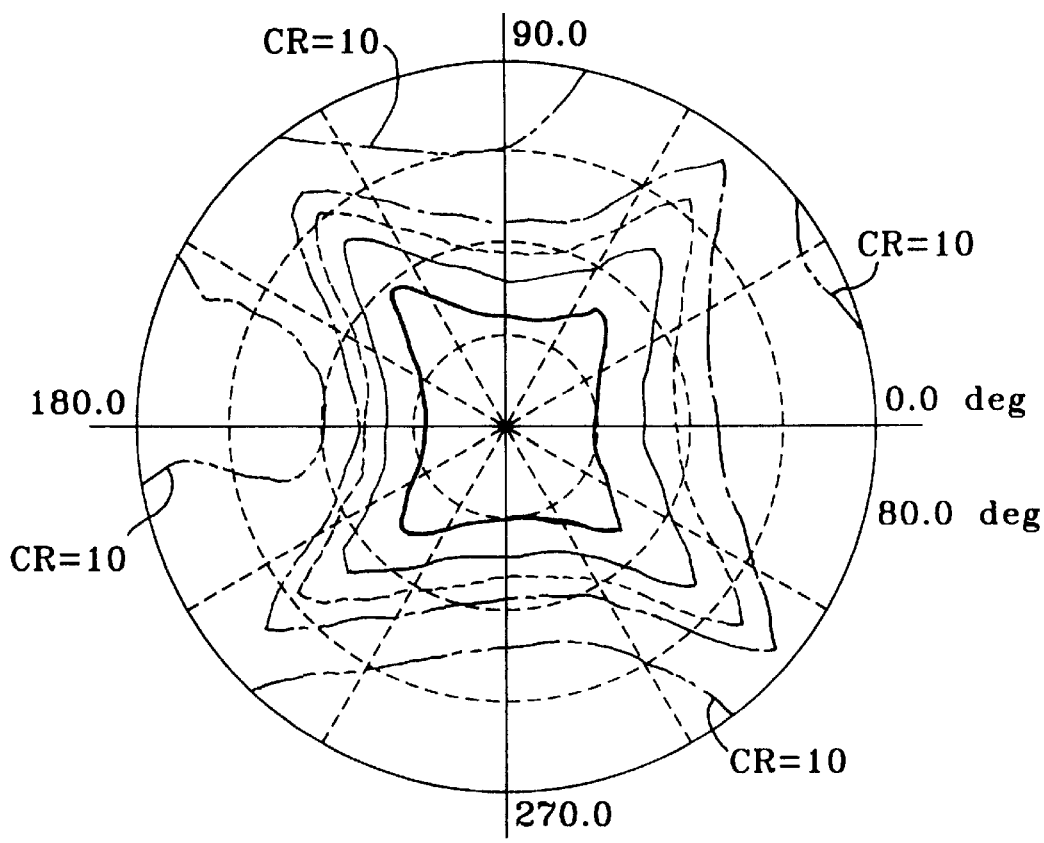
Figure 21:
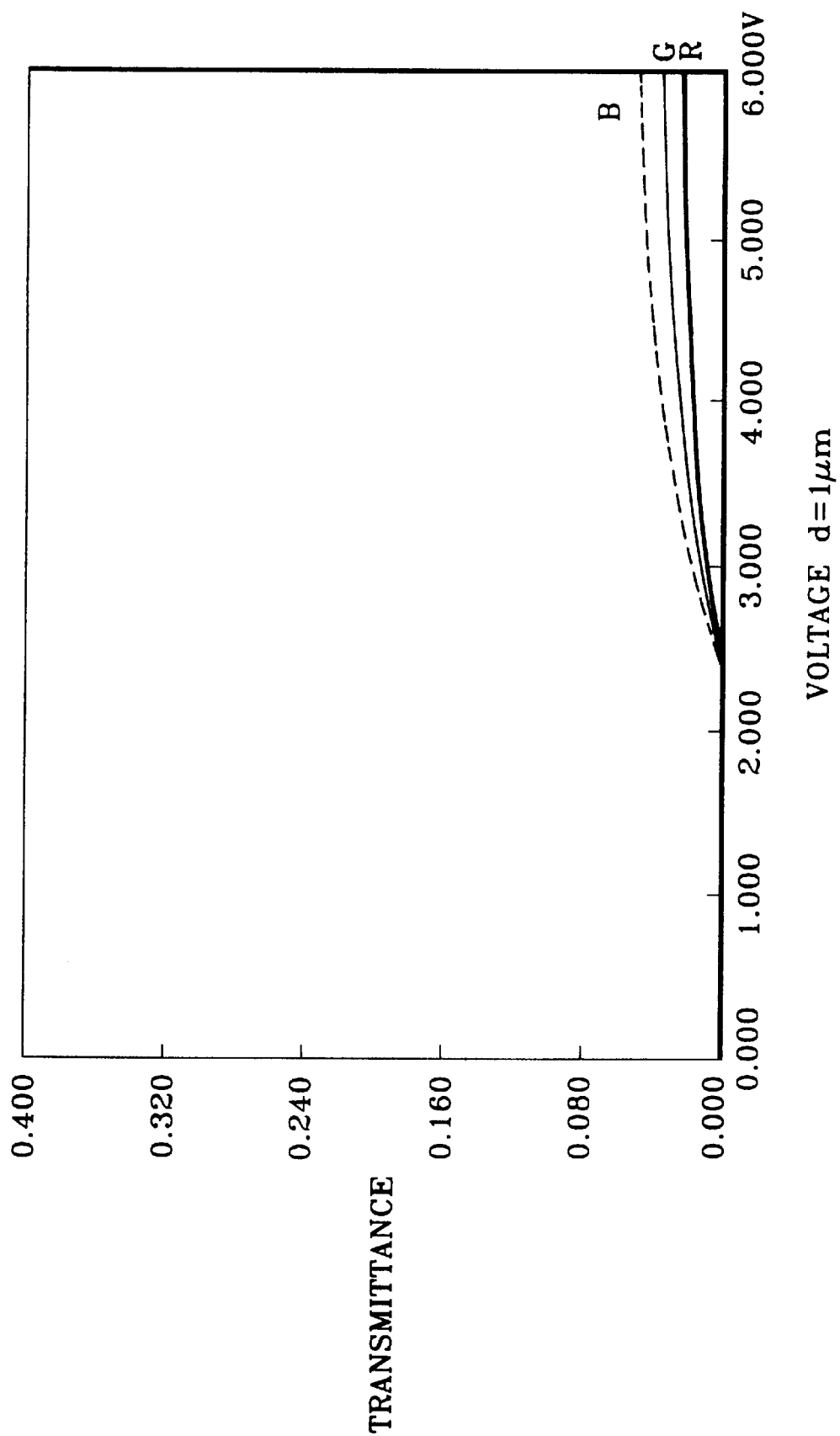
FIGS. 21–26 are diagrams showing a transmittance of the liquid crystal display device of FIG. 4A for various thicknesses of a liquid crystal layer included in the liquid crystal panel.
Figure 22:
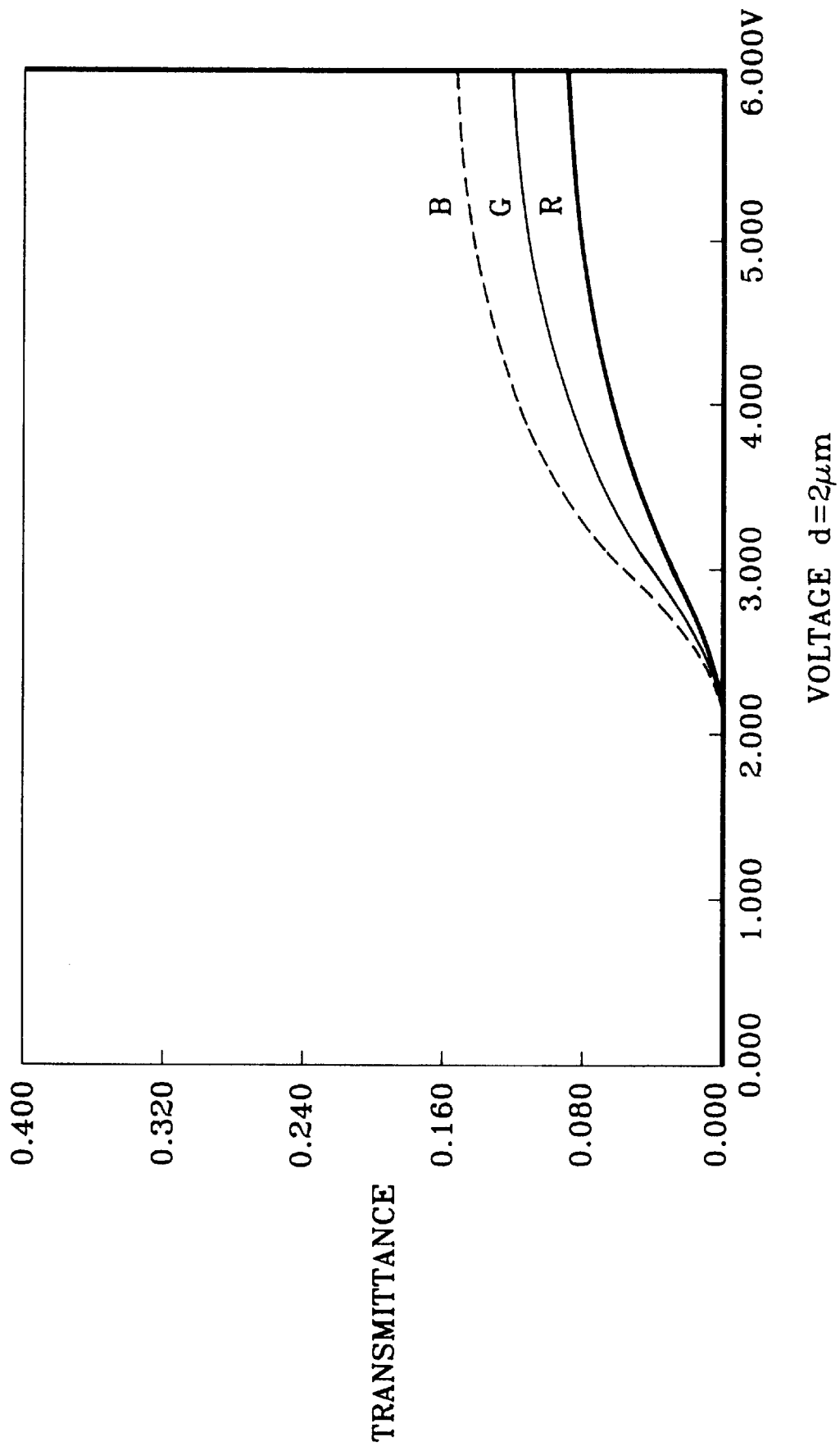
Figure 23:
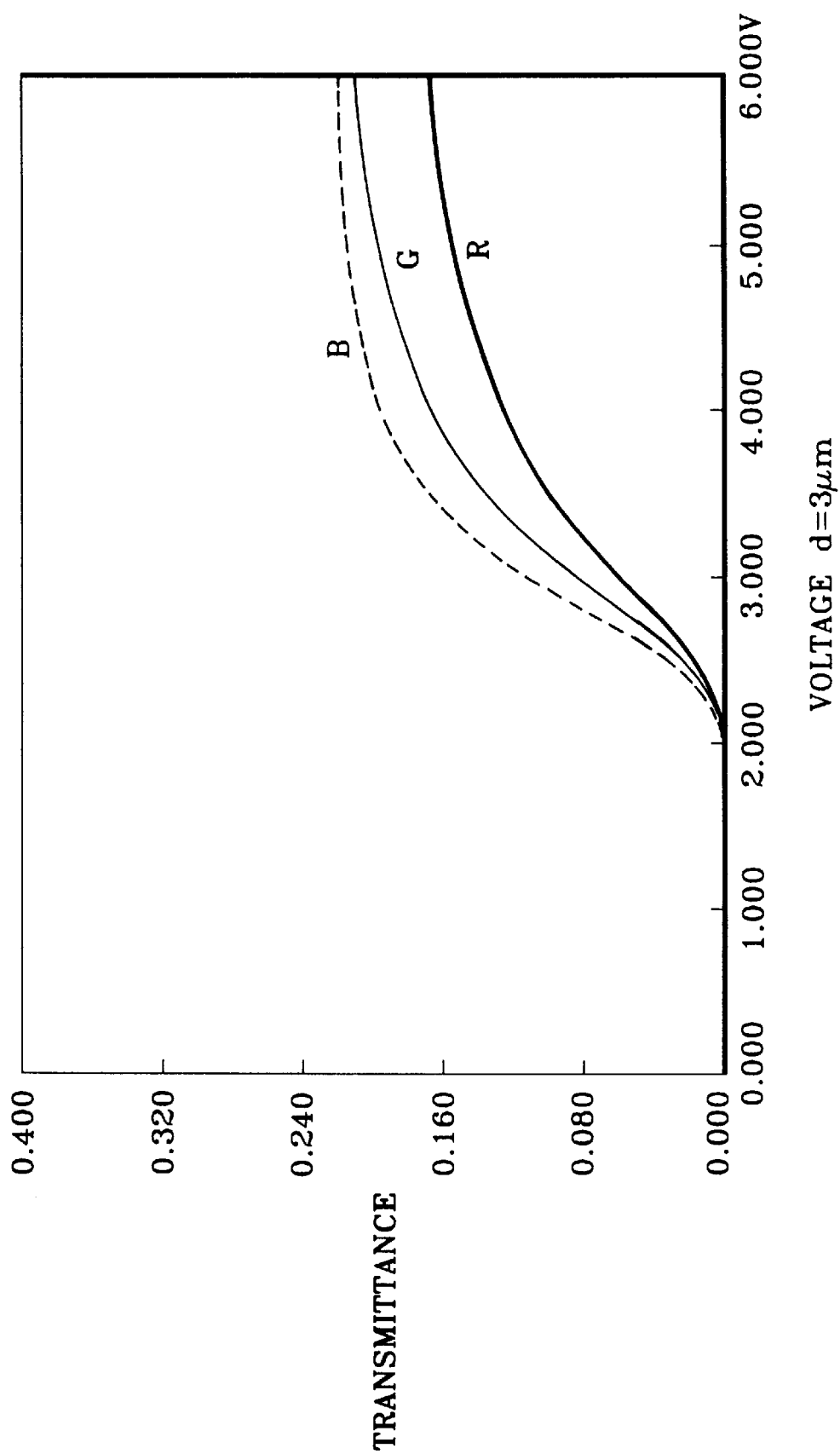
Figure 24:
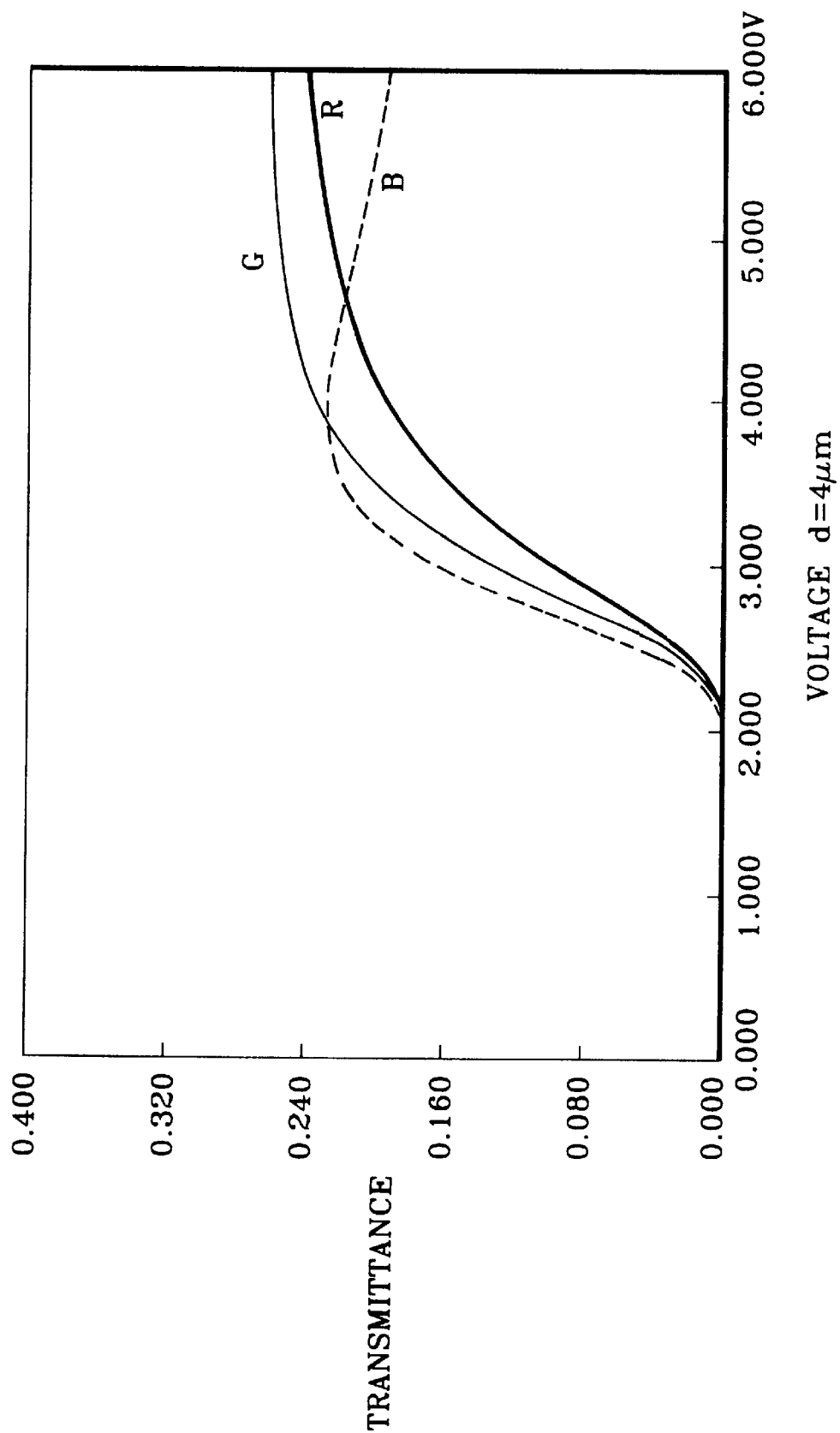
Figure 25:
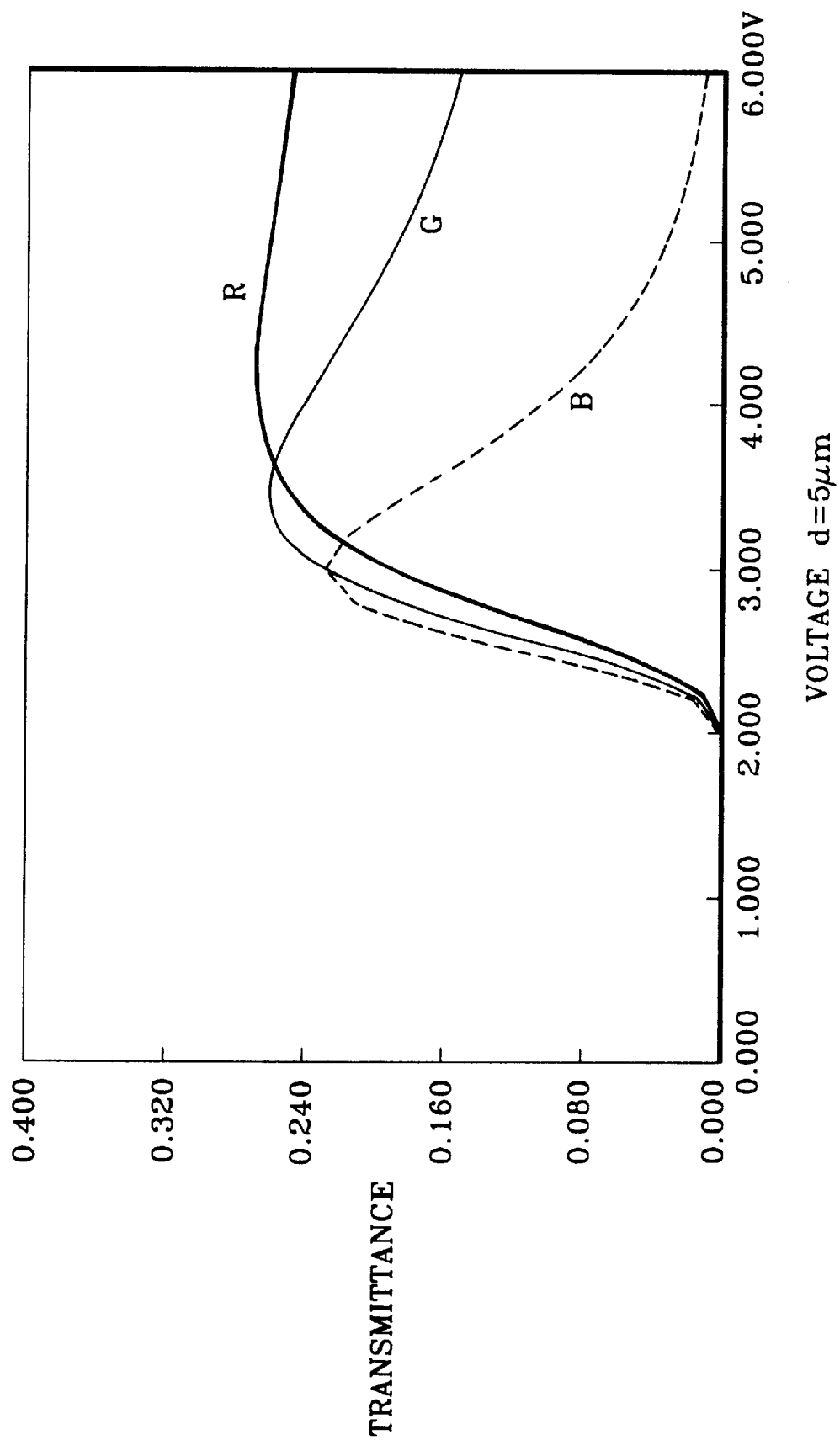
Figure 26:
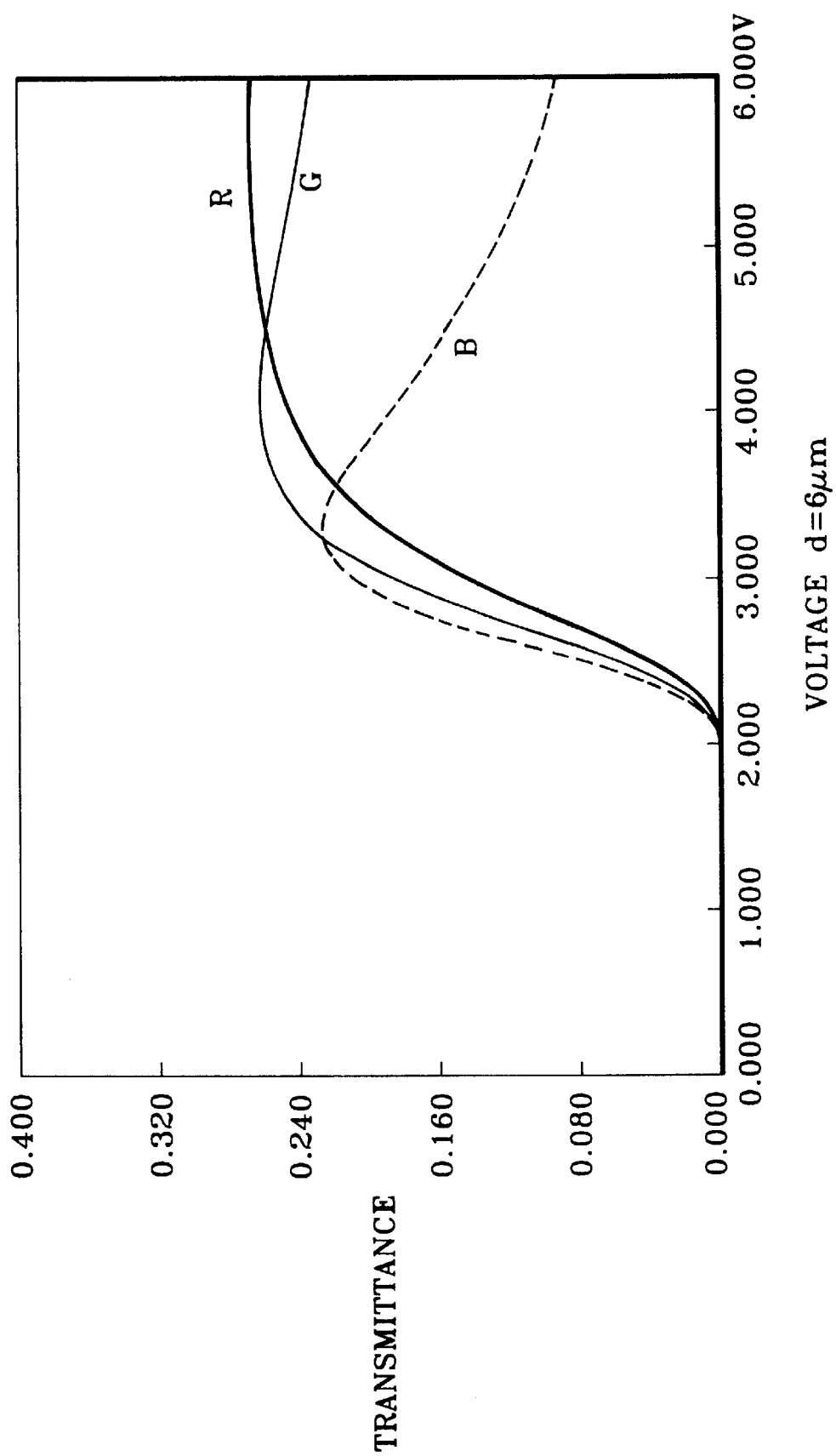

In the example of FIG. 5, the retardation R' is set to 108 nm. Thus, a ratio $R'/_A n \cdot d$ indicating the ratio of the retardation R' to the retardation of the liquid crystal panel 11 takes a value of 0.45. In the example of FIG. 6, on the other hand, the retardation R' is 144 nm and the ratio $R'/_A n \cdot d$ takes a value of 0.6. Further, in the example of FIG. 7, the retardation R' is 180 nm and the ratio $R'/_A n \cdot d$ takes a value of 0.75. In the example of FIG. 8, the retardation R' is 198 nm and the ratio $R'/_A n \cdot d$ takes a value of 0.82. In the example of FIG. 9, the retardation R' is 216 nm and the ratio $R'/_A n \cdot d$ takes a value of 0.90. In the example of FIG. 10, the retardation R' is 234 nm and the ratio $R'/_A n \cdot d$ takes a value of 0.97. In the example of FIG. 11, the retardation R' is 252 nm and the ratio $R'/_A n \cdot d$ takes a value of 1.05. In the example of FIG. 12, the retardation R' is 270 nm and the ratio $R'/_A n \cdot d$ takes a value of 1.12. In the example of FIG. 13, the retardation R' is 288 nm and the ratio $R'/_A n \cdot d$ takes a value of 1.20. Further, in the example of FIG. 14, the retardation R' is 324 nm and the ratio $R'/_A n \cdot d$ takes a value of 1.34.

Referring to FIGS. 5–14, it should be noted that the liquid crystal display device 20 provides particularly excellent viewing angle characteristics in the condition of FIG. 9 or FIG. 10 in which the foregoing ratio $R'/_A n \cdot d$ is set near 1 (0.97 to 1.05). In other words, the result of FIGS. 5–14 clearly indicates that the viewing angle characteristics of the liquid crystal display device 20 are improved substantially by disposing the retardation film 14A adjacent to the liquid crystal panel 11 such that the total retardation of the retardation film(s) is generally equal to the retardation of the liquid crystal panel.

It should be noted that the foregoing relationship holds also when another retardation film 14B is disposed above the liquid crystal panel 11 as indicated in FIG. 4A by a broken line. In this case, the foregoing value R' of the retardation is given as a sum of the retardation film 14A and the retardation film 14B.

FIGS. 15–20 shows the viewing angle characteristics of the liquid crystal display device 20 of FIG. 4A for the case in which the thickness d of the liquid crystal layer 12 forming the liquid crystal panel 11 is changed variously, while maintaining the total retardation R' of the retardation films 14A and 14B to be generally equal to the retardation $_A n \cdot d$ of the liquid crystal panel 11. In FIGS. 15–20, it should be noted that the contour designated by "CR=10" indicates the viewing angle characteristics in which a contrast ratio of 10 are achieved. The same applies also to FIGS. 5–14 described previously.

Referring to FIGS. 15–20, it should be noted that the viewing angle characteristics of the liquid crystal display device 20 are obviously deteriorated when the thickness d is reduced below 1 µm and hence the retardation $_A n \cdot d$ of the liquid crystal panel 11 is reduced below 82 nm. Further, when the thickness d exceeds 5 µm and the retardation $_A n \cdot d$ exceeds 410 nm, the viewing angle characteristics of the liquid crystal display device 20 deteriorate again. Thus, it is preferable to set the retardation of the liquid crystal panel 11 to be larger than about 80 nm, more preferably equal to or larger than 82 nm but not exceeding 410 nm.

FIGS. 21–26 show the transmittance of the liquid crystal display device 20 for the front direction while changing the thicknesses d of the liquid crystal layer 12 variously, wherein each of FIGS. 21–26 shows the change of the transmittance for each of the three primary colors, blue (B), green (G) and red (R). In FIGS. 21–26, the change of the transmittance is caused by changing the drive voltage from 0 V to 6 V.

As will be seen clearly from FIGS. 21–26, the transmittance is very small for any of the three primary colors even when a drive voltage of 6 V is applied, as long as the thickness d of the liquid crystal layer is smaller than about 1 μm ($_A$n·d=82 nm). See FIG. 21.

When the thickness d of the liquid crystal layer is increased above 1 μm, the transmittance increases steeply for all of the three primary colors. Further, as can be seen clearly in FIGS. 24 and 25, it is possible to set the transmittance to be generally equal for all of the R, G and B by setting the magnitude of the drive voltage pulse to about 4 V.

When the thickness d is increased further as in the case of FIG. 6, in which the thickness d is set to 6 μm, the drive voltage that provides a generally common transmittance for all of the three primary colors is reduced to about 3 V. In this case, however, the range or band of the drive voltage in which the foregoing common transmittance is obtained is substantially narrowed as compared with the case in which the thickness d is set not to exceed 6 μm. In other words, the result of FIG. 26 indicates that a small variation of the drive voltage may cause a coloring of the represented image. In order to avoid such a problem of unwanted coloring, it is necessary to control the drive voltage exactly. However, such an exact control of the drive voltage in a mass-produced liquid crystal display device is difficult.

The foregoing analysis indicates that it is preferable to set the thickness d of the liquid crystal layer 12 to be larger than about 1 μm but not exceeding about 6 μm. Associated with this, it is preferable to set the retardation of the liquid crystal layer 12 to be larger than about 80 nm but not exceeding about 400 nm.

FIGS. 27–31 are CIE-plots (CIE-1931 standard chromaticity diagram) showing the change of the reproduced color observed in the liquid crystal display device of FIG. 4A for the case in which the polar angle is changed from +80° to –80°. In FIGS. 27–30, the thick continuous line shows the case in which the azimuth angle is set to 0°, the thin continuous line shows the case in which the azimuth angle is set to 45°, and the broken line shows the case in which the azimuth angle is set to 90°.

Figure 27:
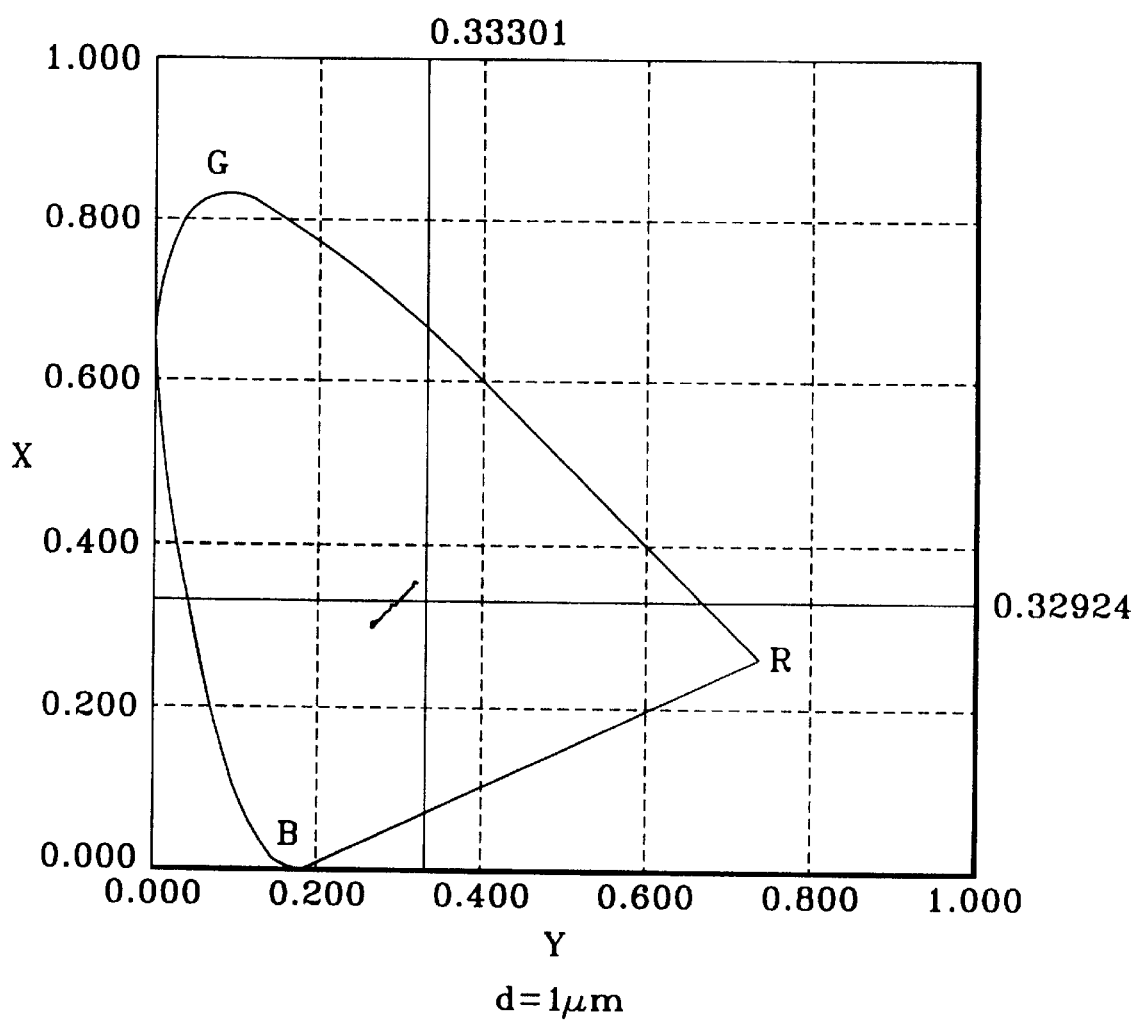
FIGS. 27–31 are diagrams showing a coloring of the liquid crystal display device of FIG. 4A for various thicknesses of the liquid crystal layer.

Referring to FIG. 27, it should be noted that the observed color change is minimum for any settings of the polar angle and the azimuth angle as long as the thickness d of the liquid crystal layer 12 is set to 1 μm and the retardation $_A$n·d of the liquid crystal panel 11 to 82 nm. When the thickness d of the liquid crystal layer 12 exceeded 3 μm (246 nm in terms of the retardation $_A$n·d of the liquid crystal panel 11) as in the case of FIG. 28, the observed color change is slightly pronounced. However, azimuth-dependence of the color is still not observed in the case of FIG. 28.

Figure 29:
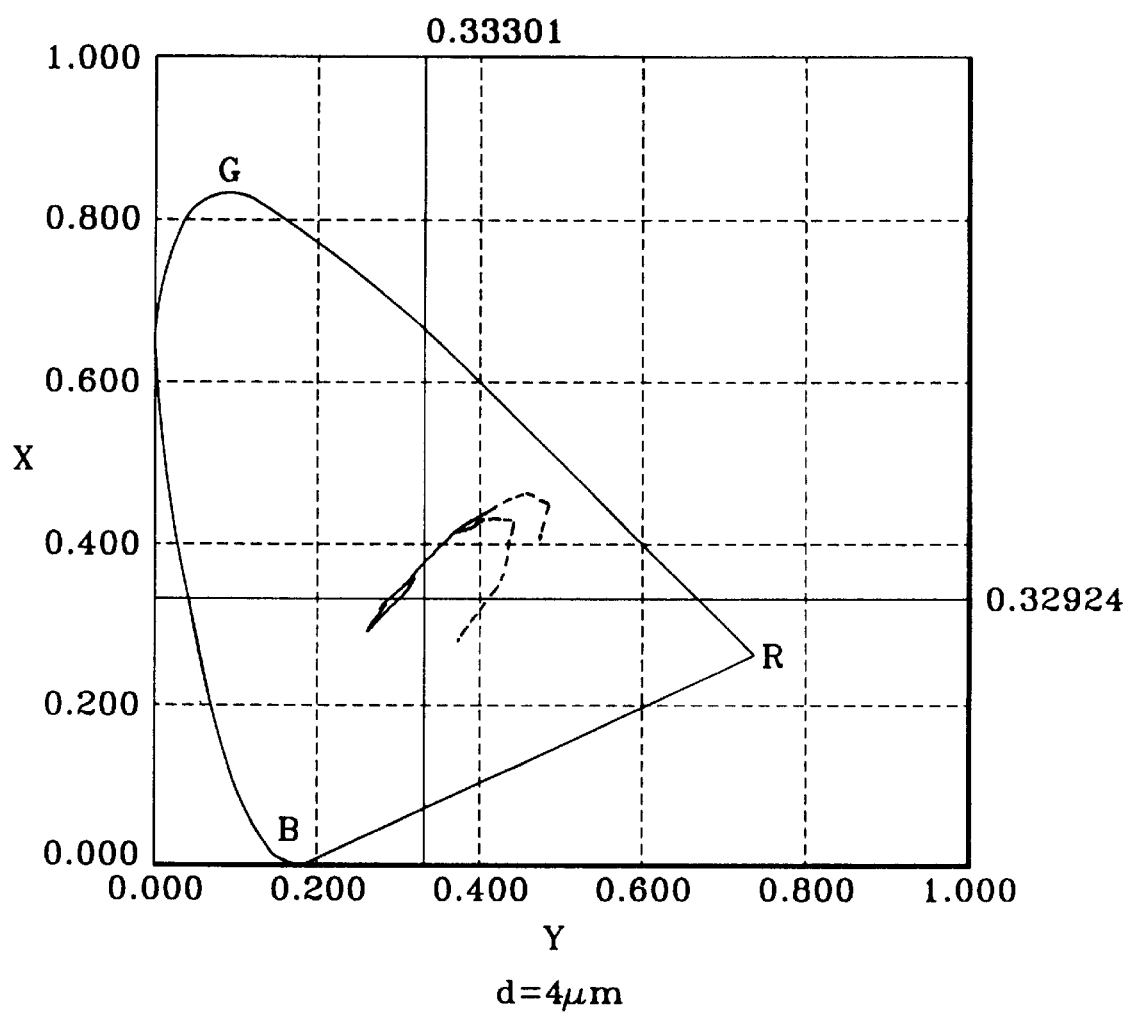

When the thickness d of the liquid crystal layer 12 has exceeded 4 μm (328 nm in terms of the retardation $_A$n·d of the liquid crystal panel 11) as in the case of FIG. 29, the observed color change becomes more prominent. Further, there appears a difference in the color change between the case in which the azimuth angle is set to 90° and the case in which the azimuth angle is set to 0° or 45°.

Figure 30:
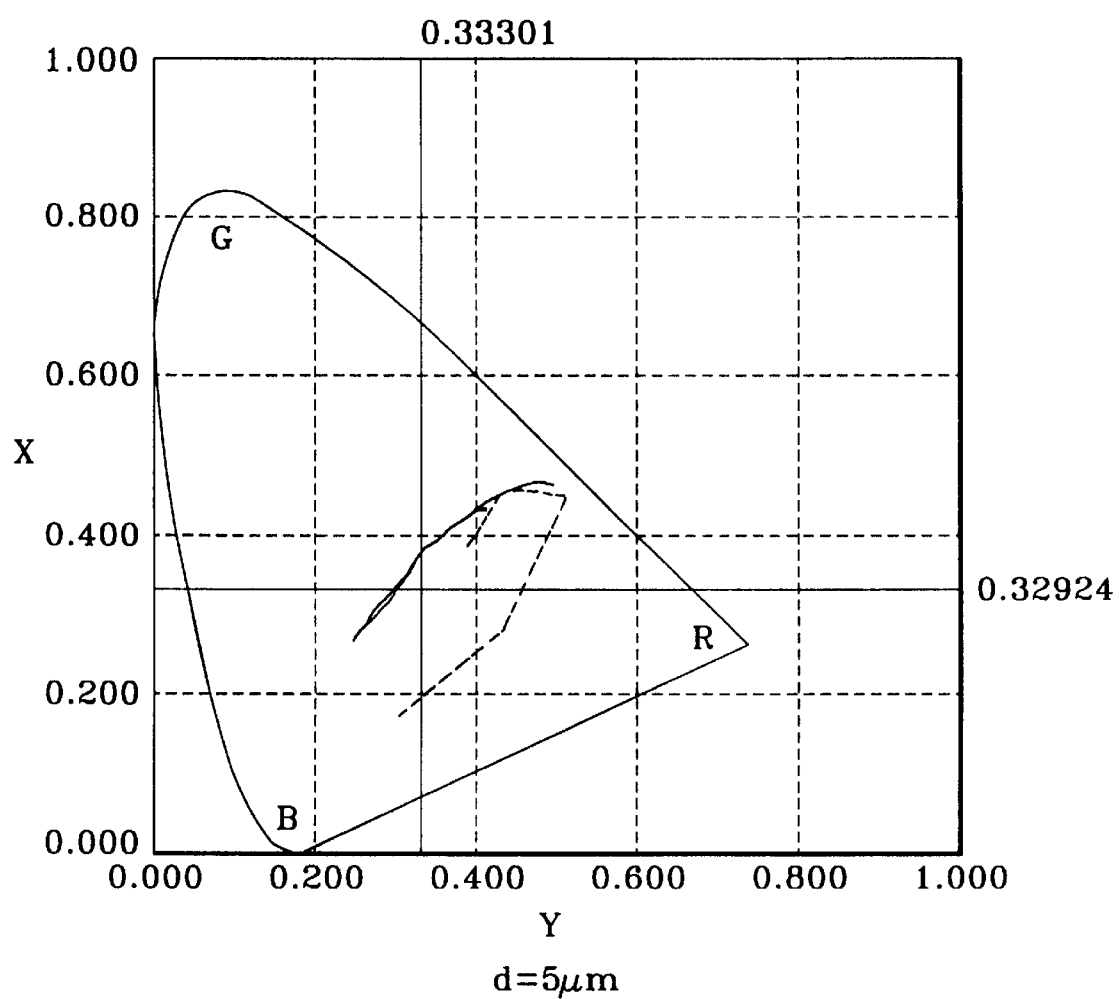
Figure 31:
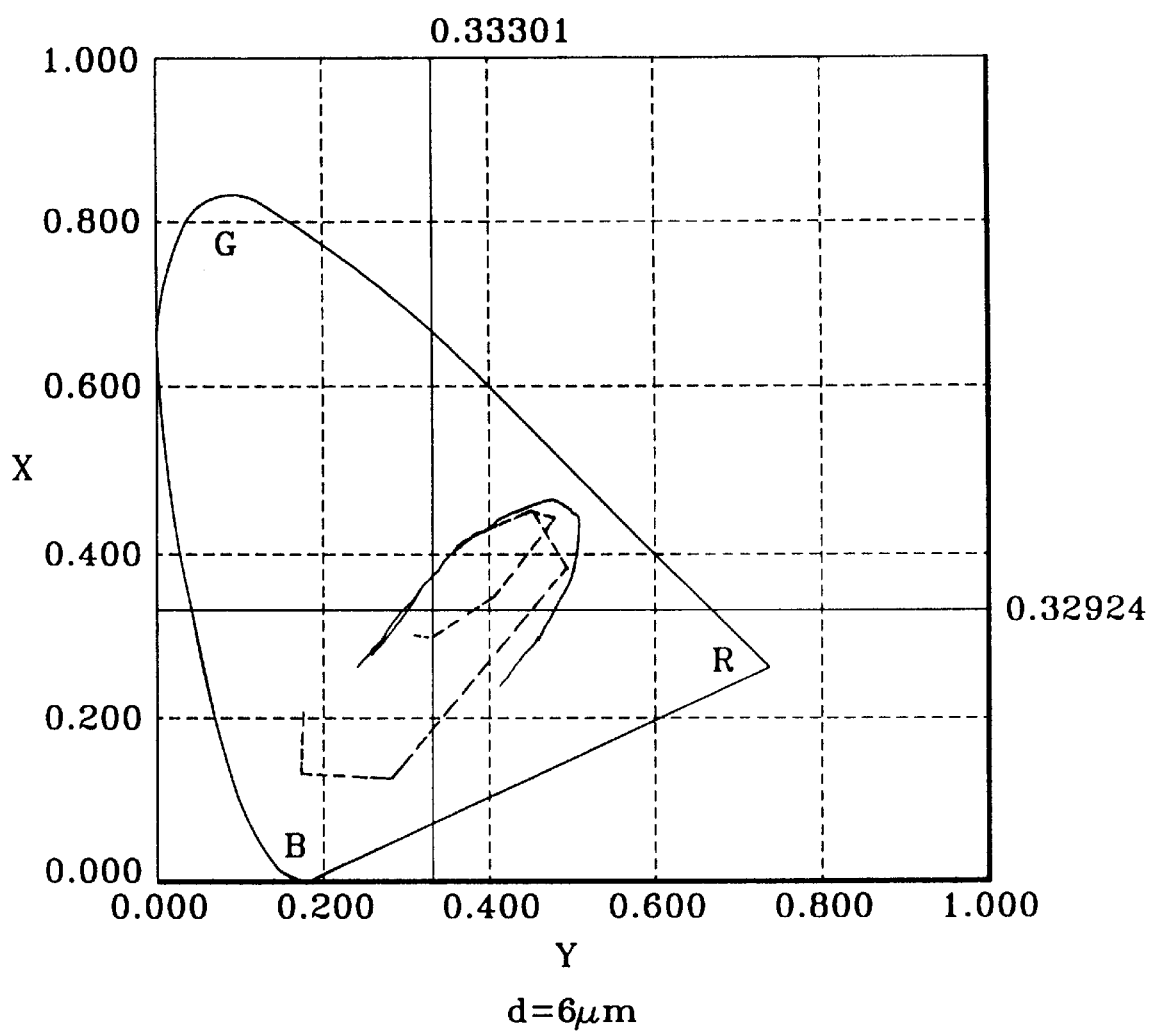

When the thickness d of the liquid crystal layer 12 is set to 5 μm (410 nm in terms of the retardation $_A$n·d of the liquid crystal panel 11) as in the case of FIG. 30, or when the thickness d is set to 6 μm (492 nm in terms of the retardation $_A$n·d) as in the case of FIG. 31, a very large color change is observed.

Figure 28:
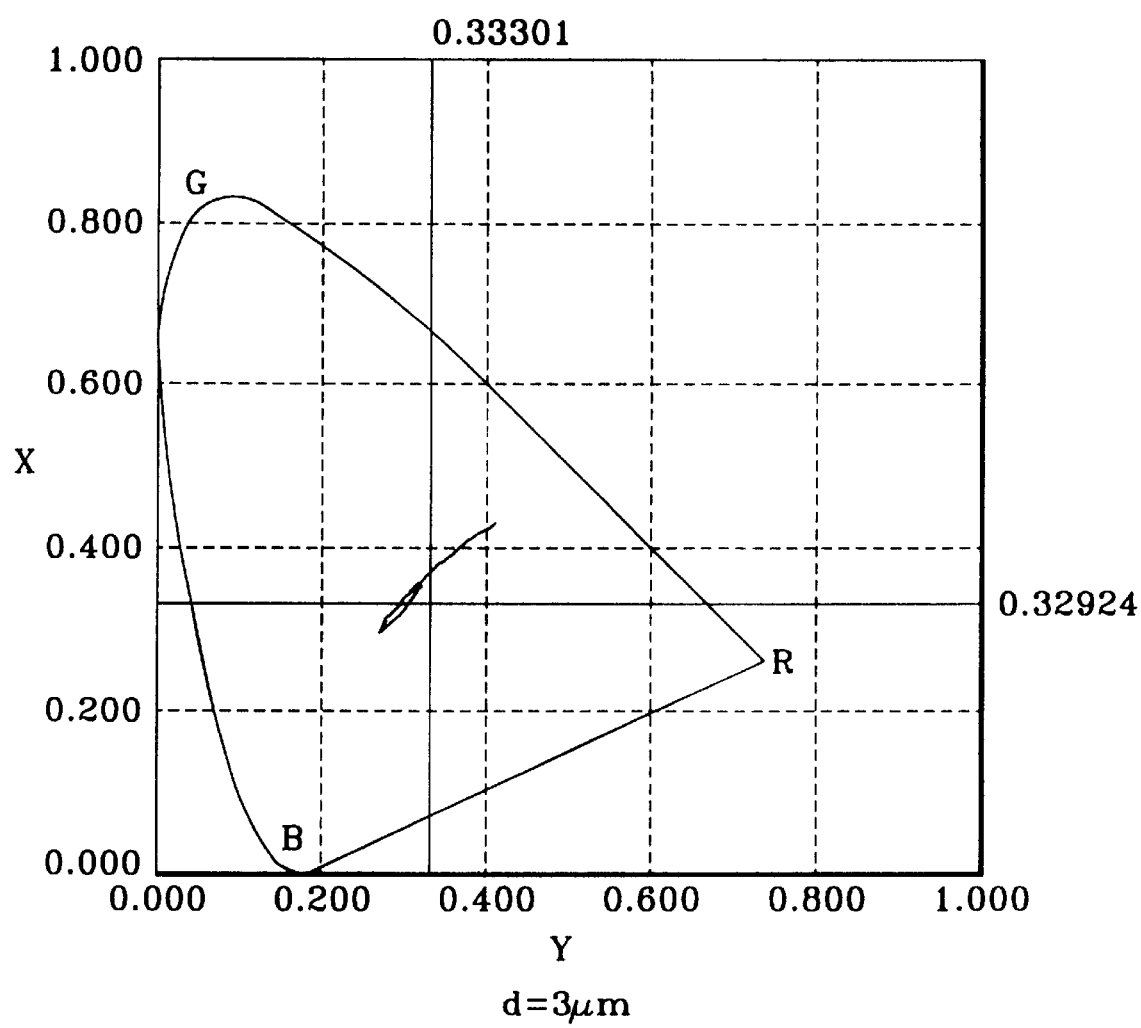

The result of FIGS. 27–31 indicates that it is preferable to set the retardation $_A$n·d of the liquid crystal layer 12 to be smaller than about 300 nm, preferably smaller than 280 nm, which is an intermediate value between the case of FIG. 28 and the case of FIG. 29, when the VA liquid crystal display device is to be used for a full-color display device of the direct-view type, which is required to have wide viewing angle characteristics.

Further, the inventor of the present invention examined the effect of the twist angle of the liquid crystal molecules on the viewing angle characteristics of the liquid crystal display device 20 of FIG. 4A. In the investigation, the thickness d of the liquid crystal layer 12 is set to 3 μm.

Figure 32:
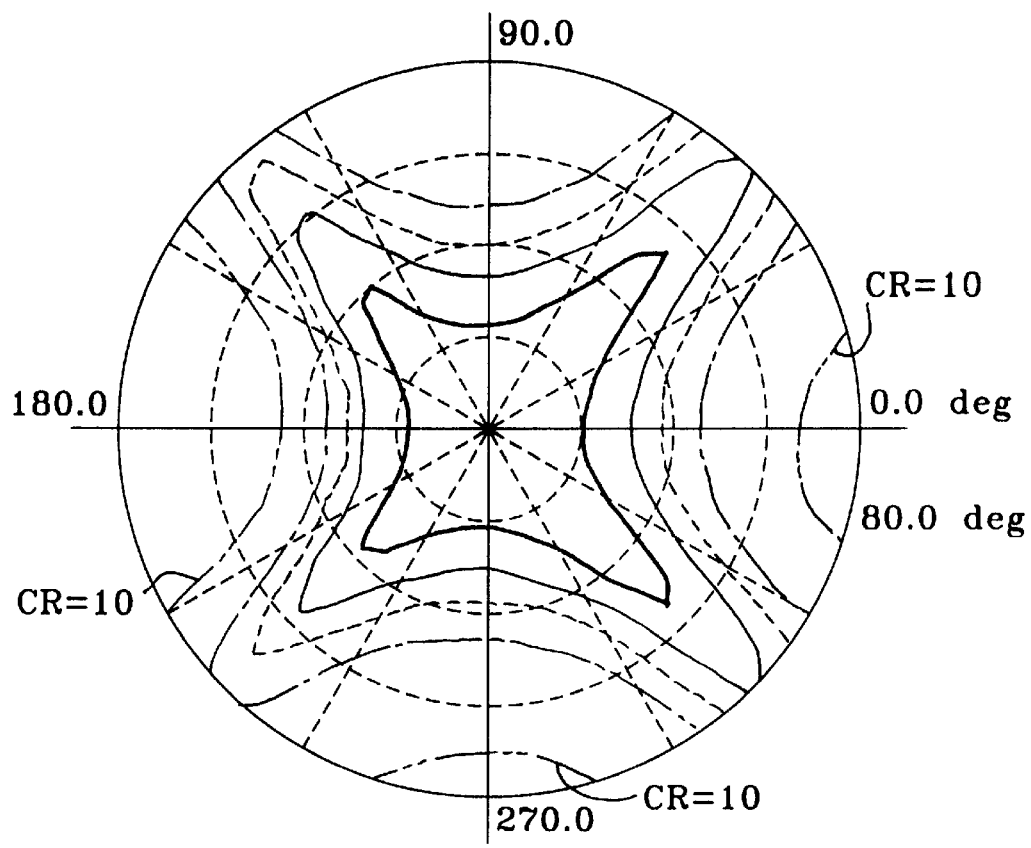
Figure 34:
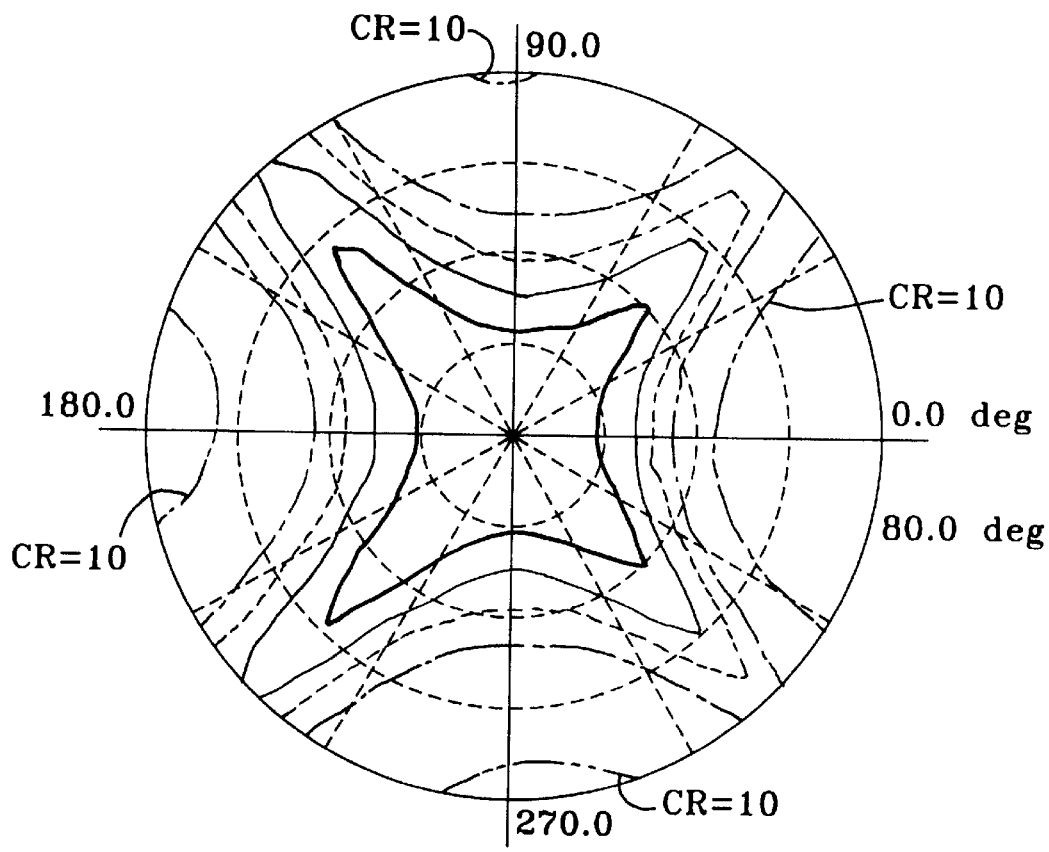

FIGS. 32–34 show the viewing angle characteristics of the liquid crystal display device respectively for the case in which the twist angle is set to 0°, 90° and 180°. As will be seen from FIGS. 32–34, no substantial dependence of the viewing angle characteristics on the twist angle is observed.

In the experiments described heretofore about the liquid crystal display device 20 of FIG. 4A, it should be noted that no chiral substance is added to the liquid crystal layer 12, contrary to the practice used in ordinary TN-mode liquid crystal display devices. Thus, the inventor of the present invention has undertaken an investigation about the effect of the chiral substance on the viewing angle characteristics of a VA-mode liquid crystal display device.

Figure 35A:
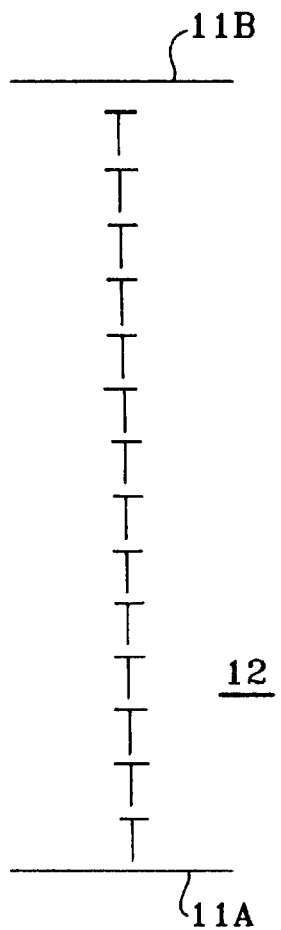
FIGS. 35A and 35B are diagrams showing the orientation of the liquid crystal molecules in the liquid crystal layer of the liquid crystal display device of FIG. 4A for the case in which a chiral substance is added to the liquid crystal layer.

In a VA-mode liquid crystal display device such as the device 20 of FIG. 4A, the liquid crystal molecules are aligned generally perpendicularly to the panel substrate as indicated in FIG. 35A in a non-activated state thereof, in which no drive voltage is applied to the liquid crystal panel. Thus, no substantial effect appears on the viewing angle characteristics even when a chiral substance is added to the liquid crystal layer 12 forming the liquid crystal panel 11. It should be noted that FIG. 35A shows the non-activated state of the liquid crystal layer 12 with a chiral substance added thereto.

Figure 35B:
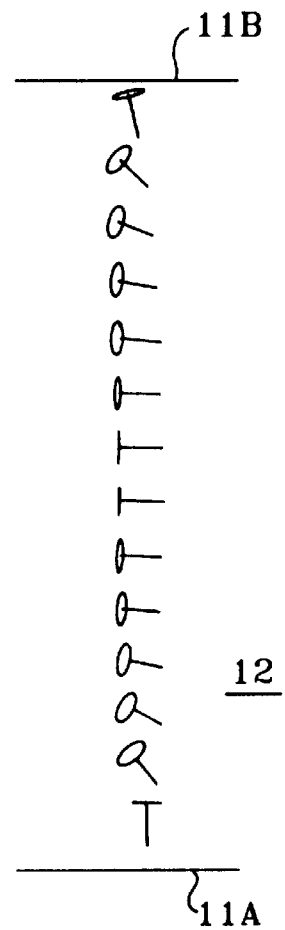

In an activated state shown in FIG. 35B in which the liquid crystal molecules are aligned horizontally, on the other hand, it is expected that the chiral pitch of the chiral substance added to the liquid crystal layer 12 may induce some effect on the optical property of the liquid crystal display device 20. In the state of FIG. 35B, it should be noted that the liquid crystal molecules show a twisting in the thickness direction of the liquid crystal layer 12 with a generally uniform twist angle, which is determined by the chiral pitch p of the chiral substance and the thickness d of the liquid crystal layer.

Figure 36A:
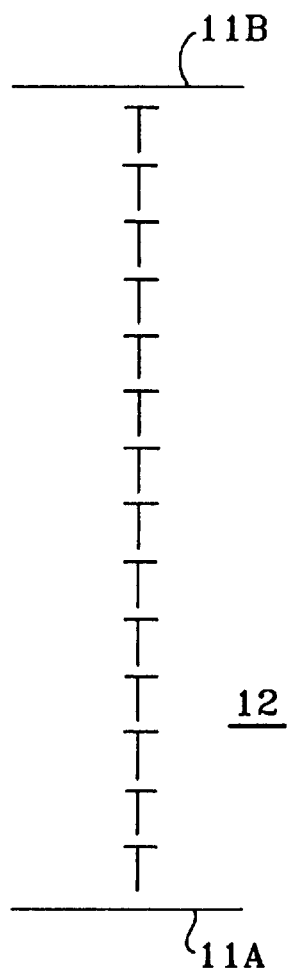
FIGS. 36A and 36B are diagrams showing the orientation of the liquid crystal molecules of the liquid crystal display device of FIG. 4A for the case in which no chiral substance is added to the liquid crystal layer.
Figure 36B:
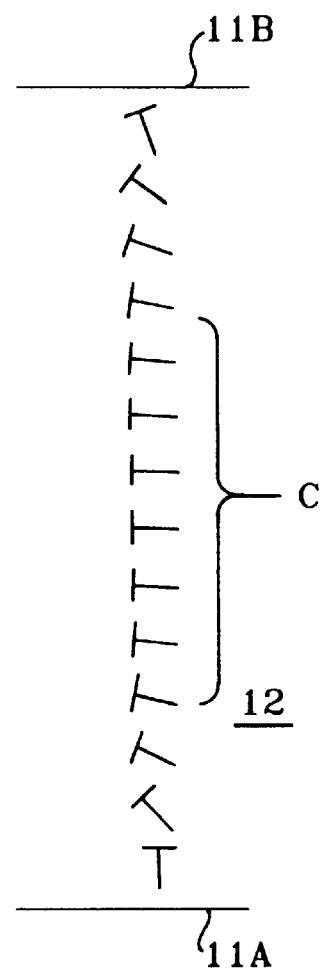

In the case in which the chiral substance is not added to the liquid crystal layer 12, the liquid crystal molecules show a generally vertically oriented state similar to the state of FIG. 35A in the non-activated state of the VA-mode liquid crystal display device 20 as indicated in FIG. 36A. However, the liquid crystal molecules show a somewhat irregularly oriented horizontal state in the activated state of the liquid crystal display device 20 as indicated in FIG. 36B, due to the absence of chiral pitch control by the chiral substance. As indicated in FIG. 36B, the twisting of the liquid crystal molecules appears in the vicinity of the molecular alignment films carried by the lower and upper substrates 11A and 11B, while no substantial twisting occurs in a central region C of the liquid crystal layer 12.

Figure 37:
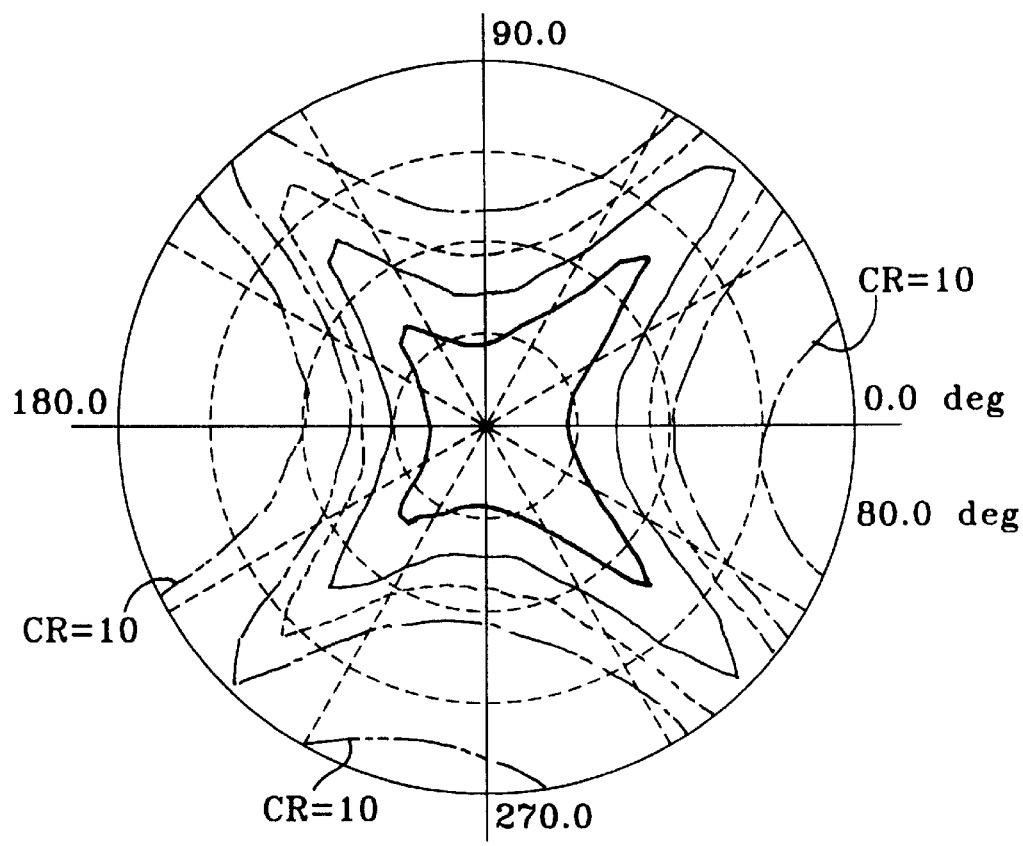
FIG. 37 is a diagram showing viewing angle characteristics of the liquid crystal display device of FIG. 4A for the case in which a chiral substance is added to the liquid crystal layer.

FIG. 37 shows the viewing angle characteristics of the liquid crystal display device 20 of FIG. 4A in which the thickness d of the liquid crystal layer 12 is set to 3 μm and the twist angle of the liquid crystal molecules is set to 90°, for the case in which a chiral substance is added to the liquid crystal layer 12 with a chiral pitch control in which the d/p ratio is set to 0.25, wherein d represents the thickness of the liquid crystal layer 12 as noted already and p represents the chiral pitch of the chiral substance.

Referring to FIG. 37, it should be noted that the region that provides a contrast ratio CR of 10 or more is decreased as compared with the viewing angle characteristics of FIG. 33 for a comparable construction of the liquid crystal display device 20 except that no chiral substance is added to the liquid crystal layer 12. The result of FIG. 37 indicates that the use of chiral substance in a VA-mode liquid crystal display device is not preferable from a viewpoint of improving the viewing angle characteristics.

Figure 38:
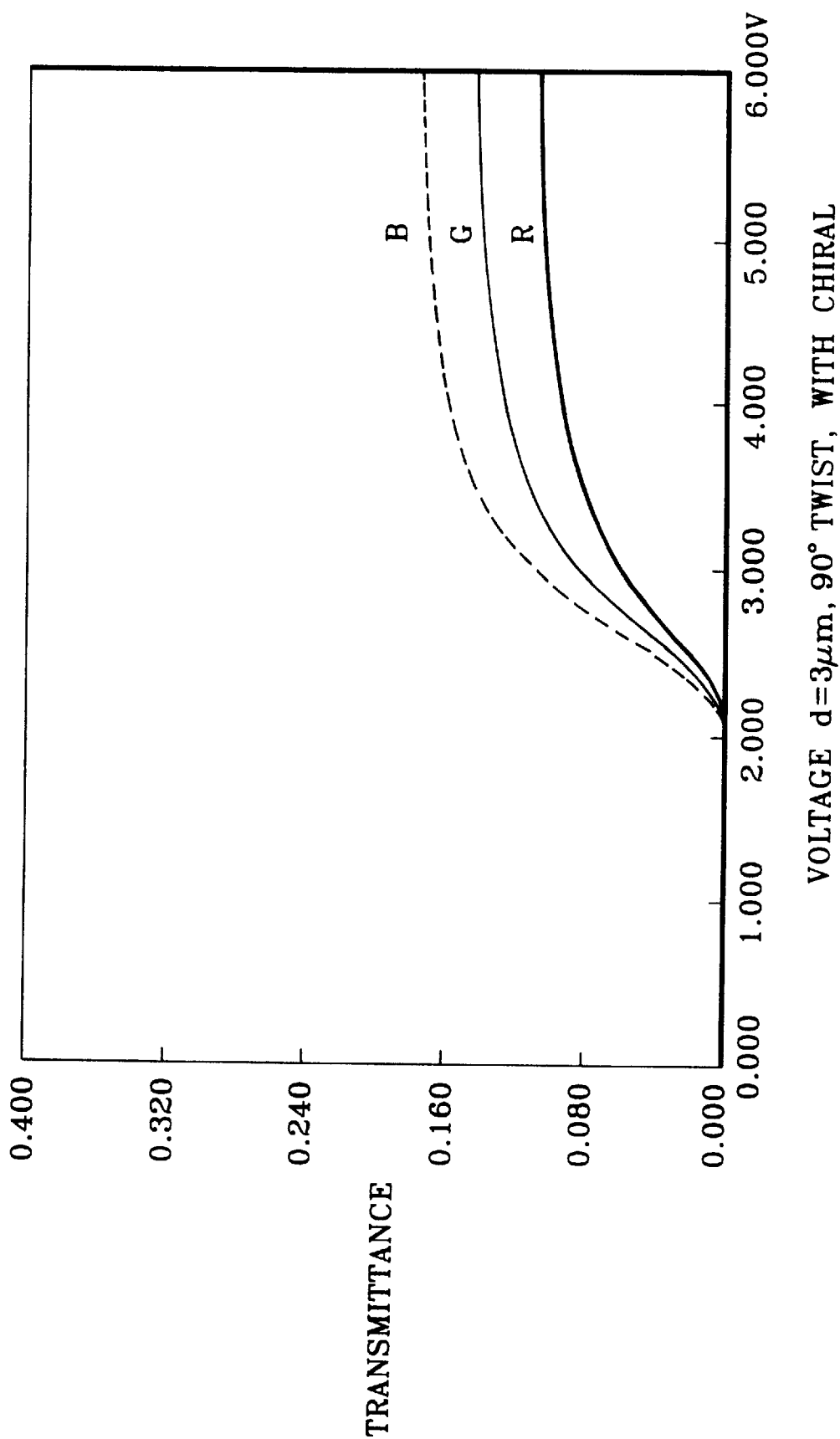
FIG. 38 is a diagram showing a transmittance of the liquid crystal display device of FIG. 4A for the case in which a chiral substance is added to the liquid crystal layer.
Figure 39:
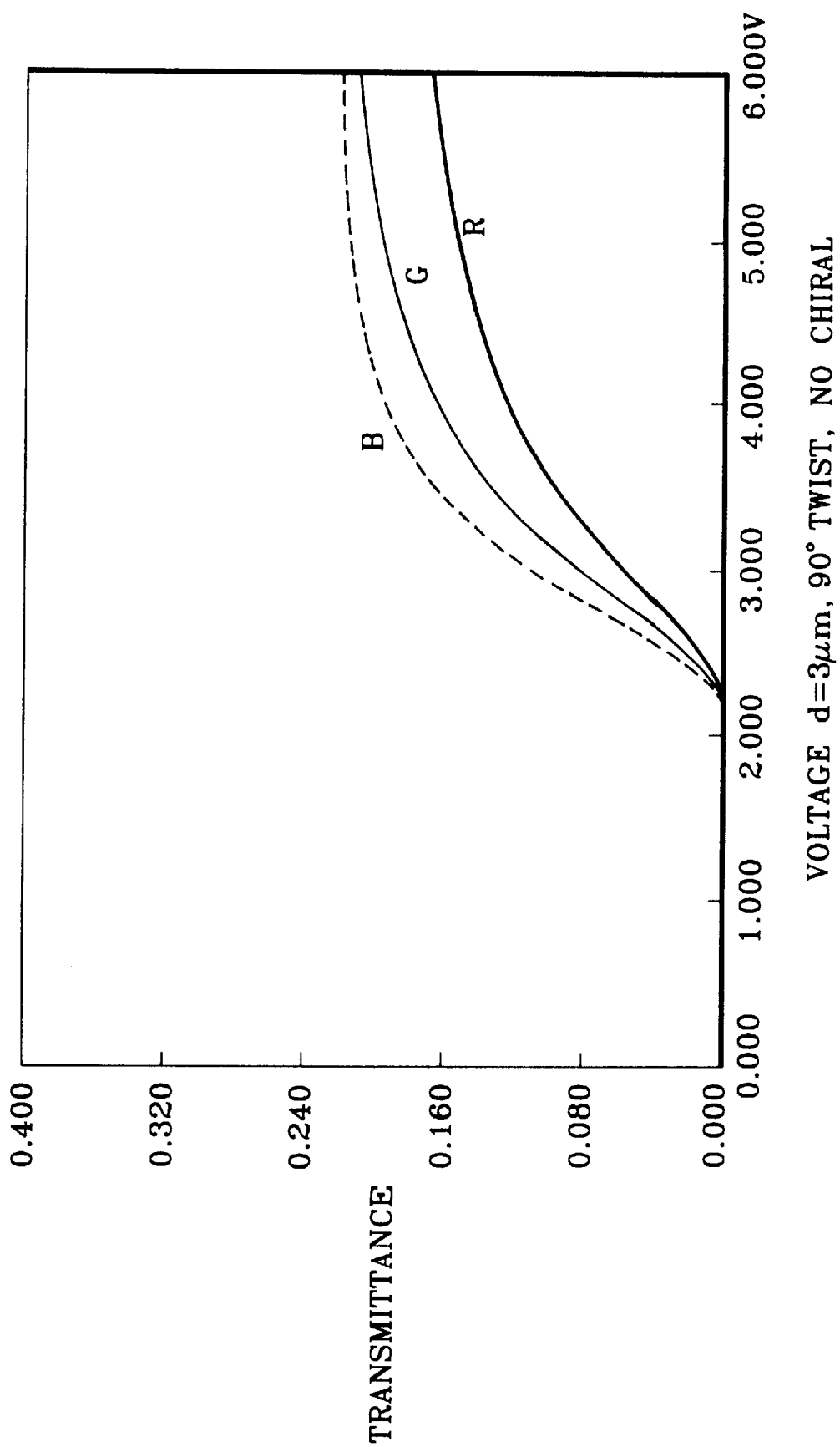
FIG. 39 is a diagram showing a transmittance of the liquid crystal display device of FIG. 4A for the case in which no chiral substance is added to the liquid crystal layer.

FIGS. 38 and 39 show the transmittance of the liquid crystal display device 20 for each of the three primary colors R, G and B in the front direction of the display device for a case in which the thickness d is set to 3 μm and the twist angle of the liquid crystal molecules is set to 90°, wherein FIG. 38 shows the case in which a chiral substance is added while FIG. 39 shows the case in which no chiral substance is added.

The result of FIGS. 38 and 39 indicates that the addition of the chiral substance causes a decrease of the transmittance and hence the brightness of the liquid crystal display device 20. It is believed that the region C of FIG. 36B, in which the liquid crystal molecules are not twisted, causes an efficient rotation of the optical plane for the optical beam passing therethrough, while no such a region is formed in the state of FIG. 35B.

From FIGS. 38 and 39, it is concluded that it is preferable not to add a chiral substance to the liquid crystal layer in a VA-mode liquid crystal display device from a viewpoint of improving the brightness and hence the contrast ratio.

Figure 41:
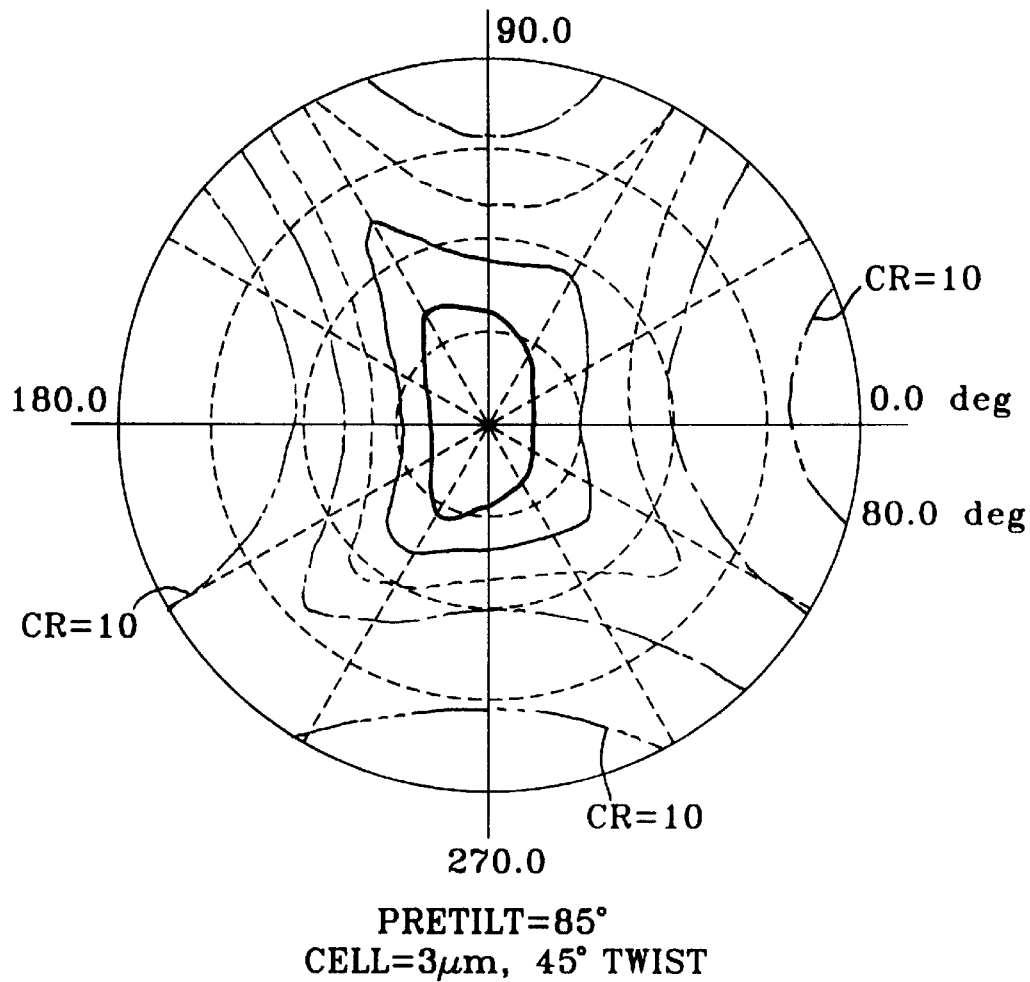
Figure 42:
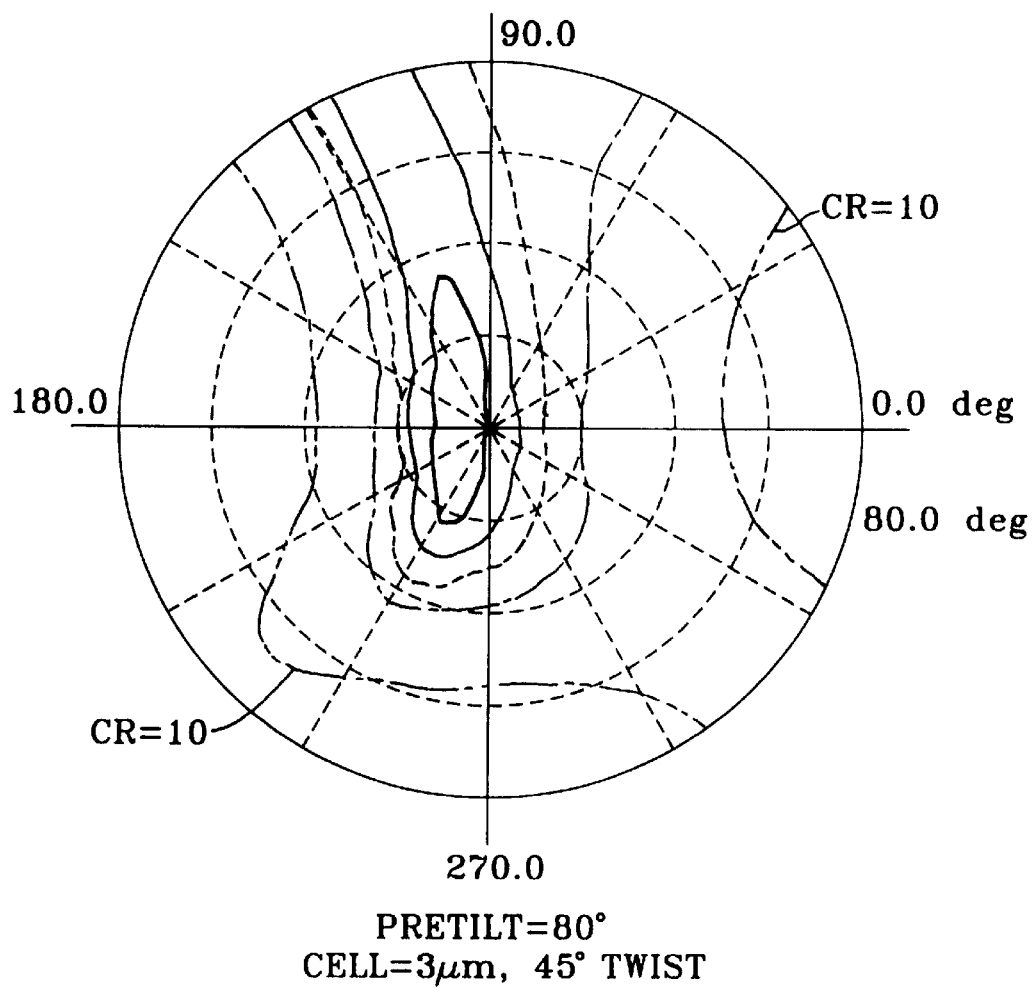
Figure 43:
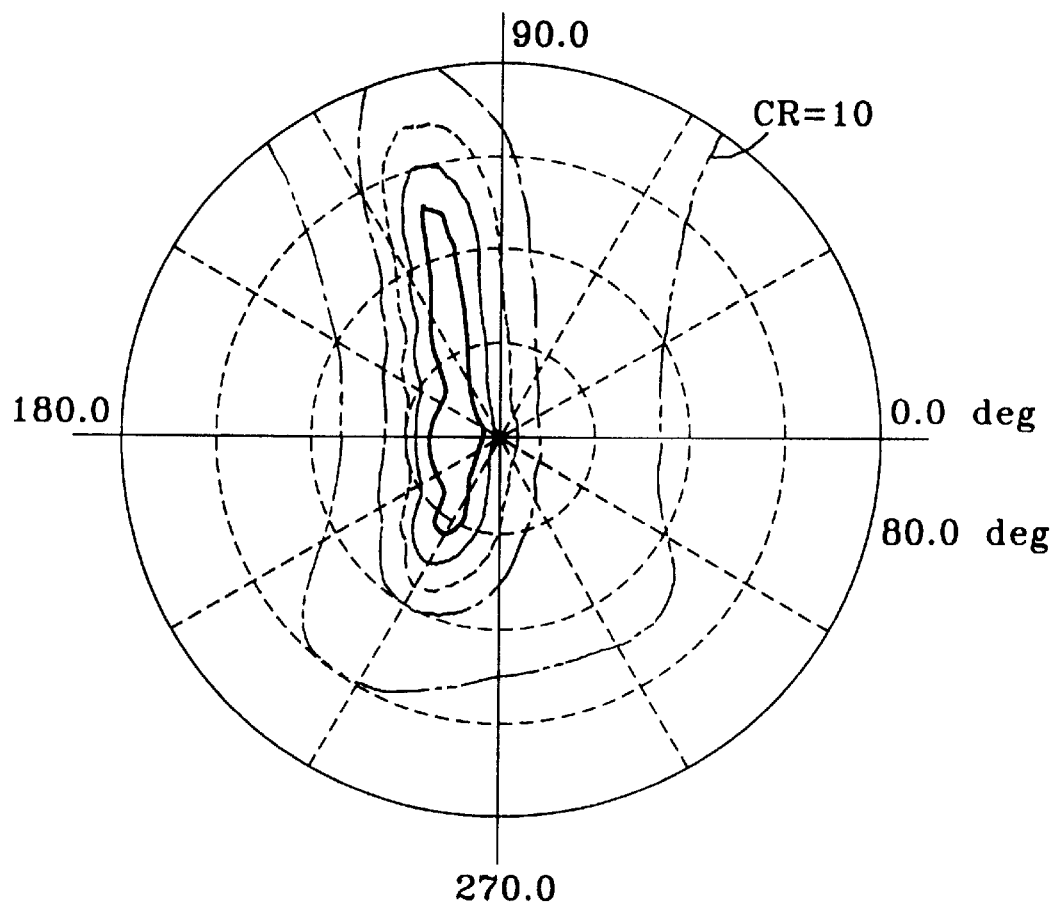

Further, the inventor of the present invention has conducted an investigation on the effect of the pre-tilt angle of the liquid crystal molecules on the viewing angle characteristics of the liquid crystal display device 20 of FIG. 4A. The result is represented in FIGS. 40–43, wherein FIG. 40 shows the case in which the pre-tilt angle is set to 89.99°, FIG. 41 shows the case in which the pre-tilt angle is set to 85°, FIG. 42 shows the case in which the pre-tilt angle is set to 80°, and FIG. 43 shows the case in which the pre-tilt angle is set to 75°. Further, FIG. 44 shows the viewing angle characteristics of a standard TN-mode liquid crystal display device as a reference.

Referring to FIGS. 40–44, it should be noted that the case of FIG. 40, in which the pre-tilt angle is set substantially to 90°, provides the widest viewing angle characteristics and that the viewing angle characteristics become narrower with decreasing pre-tilt angle. When the pre-tilt angle is set to 75° as in the case of FIG. 43, the obtained viewing angle characteristics are more or less equal to that of a typical TN-mode liquid crystal display device shown in FIG. 44.

The foregoing results indicate that; it is preferable to set the pre-tilt angle of the liquid crystal molecules to be larger than 75°, preferably larger than 87°, more preferably larger than 89°.

First Embodiment

Figure 45:
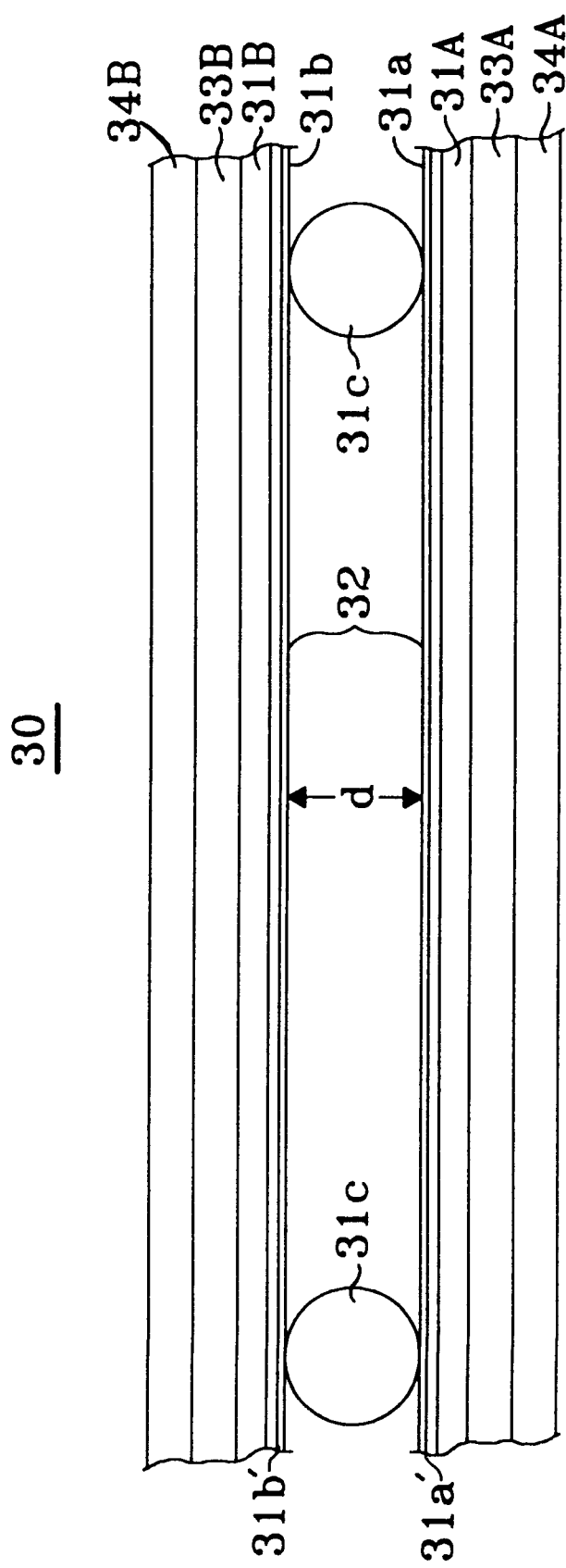
FIG. 45 is a diagram showing a construction of a liquid crystal display device according to a first embodiment of the present invention.

FIG. 45 shows a construction of a liquid crystal display device 30 according to a first embodiment of the present invention in a cross-sectional view.

Referring to FIG. 45, the liquid crystal display device 30 includes a glass substrate 31A and a glass substrate 31B, wherein the glass substrate 31A carries, on an upper major surface thereof, a transparent electrode 31a' of ITO and a molecular alignment film 31a covering the electrode 31a' as usual in a liquid crystal display device. Similarly, the glass substrate 31B carries, on a lower major surface thereof, a transparent electrode 31b' of ITO and a molecular alignment film 31b covering the electrode 31b', wherein the substrate 31A and the substrate 31B are disposed such that the molecular alignment film 31a and the molecular alignment film 31b face with each other with polymer spacer balls 31c intervening therebetween.

Further, the space thus formed between the substrates 31A and 31B is sealed by providing a seal member (not illustrated), and a liquid crystal having a negative dielectric anisotropy such as MJ941296 of E. Merck, Inc. ($_\triangle\in=0.0804$, $^\triangle\in=-4$) is injected to the foregoing space by a vacuum injection process. Thereby, a liquid crystal layer 32 is formed. In such a liquid crystal panel, the thickness d of the liquid crystal layer 32d is determined by the diameter of the polymer spacer balls 31c.

On the outer sides of the liquid crystal panel thus formed, retardation films 33A and 33B are disposed. Further, polarizers 34A and 34B are disposed on the outer sides of the retardation films 33A and 33B with respective orientations with respect to the center of twist, as explained already with reference to FIG. 1 or FIG. 4A. In other words, the liquid crystal display device 30 of FIG. 45 corresponds to the case of the liquid crystal display device 20 of FIG. 4A in which the retardation film 14B indicated in FIG. 4A by a broken line is provided.

TABLE I below summarizes the result of an evaluation test conducted for the liquid crystal display device 30 of the response and viewing angle characteristics at 25° C. for various thicknesses d of the liquid crystal layer 32 while setting the twist angle to 45°. In this experiment, RN783 of Nissan Chemicals KK was used for the molecular alignment t films 31a and 31b. Further, G1220DU of Nitto Denko KK or SK-1832A of Sumitomo Chemicals KK was used for the polarizers 34A and 34B. In the tested device 30, the retardation films 33A and 33B were omitted. However, the compensation of the retardation of the liquid crystal panel was achieved, to some extent, by protective films covering the polarizers. The protective film is known as TAC film (TAC=triacetate cellulose) and has a very small, but finite birefringence. For example, the G1220DU polarizer carries a protective film that shows a retardation of about 44 nm. The TAC film of the SK-1832AP7 polarizer exhibits a retardation of about 50 nm. No chiral substance was added to the liquid crystal layer 32.

TABLE I

| PANEL # | d (μm) | $T_{on}$ (ms) | $T_{off}$ (ms) | CR ≧ 10° at 25° C. | | | | |
|---|---|---|---|---|---|---|---|---|
| | | | | 0° | 90° | 180° | −90° | av. |
| OM480 | 3.75 | 13.56 | 9.04 | 41 | 54 | 48 | 54 | 49.25 |
| OM482 | 3.00 | 8.79 | 5.71 | 42 | 58 | 52 | 58 | 52.50 |
| OM484 | 2.60 | 7.81 | 4.45 | 42 | 60 | 52 | 60 | 53.50 |

Referring to TABLE I, it should be noted that the turn-on transient time $T_{on}$ as well as the turn-off transient time $T_{off}$ of the liquid crystal display device 30 decreases with decreasing thickness d of the liquid crystal layer 32. In other words, the response of the liquid crystal display device 30 improved by decreasing the thickness d of the liquid crystal layer 32. Further, the range of the viewing angle in which the contrast ratio R exceeds 10° (CR≧10°) expands with decreasing thickness d of the liquid crystal layer 32. On the other hand, excessive decrease of the thickness d results in a decrease of the brightness as already noted. Thus, it is preferred to set the thickness d of the liquid crystal layer 32 such that the retardation $_A$n·d of the liquid crystal layer 32 falls in a range between about 80 nm and about 400 nm.

Figure 46A:
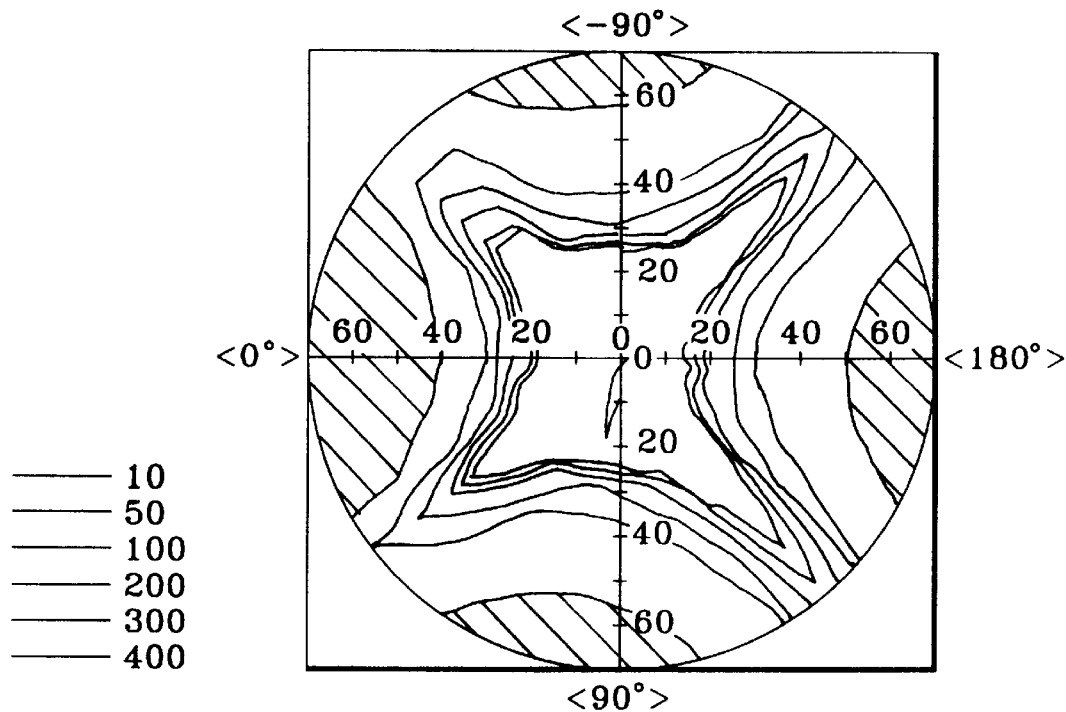
FIGS. 46A and 46B are diagrams showing viewing angle characteristics of the liquid crystal display device of FIG. 45.
Figure 46B:
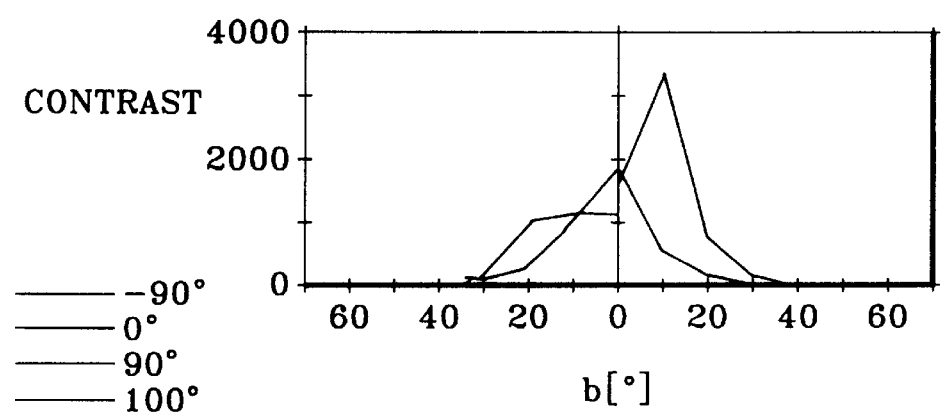

FIGS. 46A and 46B show the viewing angle characteristics of the liquid crystal display device 30 of FIG. 45 for the case in which the thickness d is set to 3 μm and the twist angle is set to 45°. In the example of FIGS. 46A and 46B, no chiral substance was added to the liquid crystal layer 32. Further, the TAC films covering the polarizers 34A and 34B were used for the retardation films 33B and 34B. In other words, no separate retardation films were used. In the experiment, the G1220DU polarizer marketed by Nitto Denko KK. was used for the polarizers 34A and 34B as already noted, in combination with the MJ941296 liquid crystal of Merck Japan, LTD.

In FIG. 46A, it should be noted that a region indicated by white represents the viewing angle characteristics that provide a contrast ratio equal to 10 or more (CR≧10). It will be noted that a very large area is represented white in FIG. 46A, indicating that the tested liquid crystal display 30 device provides an excellent viewing angle characteristics. Further, FIG. 46B indicates that a contrast ratio of near 2000 is obtained in the front direction of the liquid crystal display device.

FIGS. 47A and 47B show the viewing angle characteristics of the liquid crystal display device 30 of FIG. 45 for the case in which a commercially available retardation film (VACO of Sumitomo Chemicals KK) is used for the retardation films 33A and 33B, wherein it should be noted that the retardation films 33A and 33B are set such that a total retardation R' including also the contribution from the TAC films of the polarizers 34A and 34B, takes a value of 218 nm, which value is selected close to the retardation $_A$n·d of 241 nm of the liquid crystal layer 12 and hence the liquid crystal panel 11.

As will be seen from FIG. 47A, the area of the viewing angle that provides a contrast ratio of 10 or more increases further as compared with the case of FIG. 46A. Further, the contrast achieved in the front direction of the panel reaches 4000 as indicated in FIG. 47B.

Figure 48:
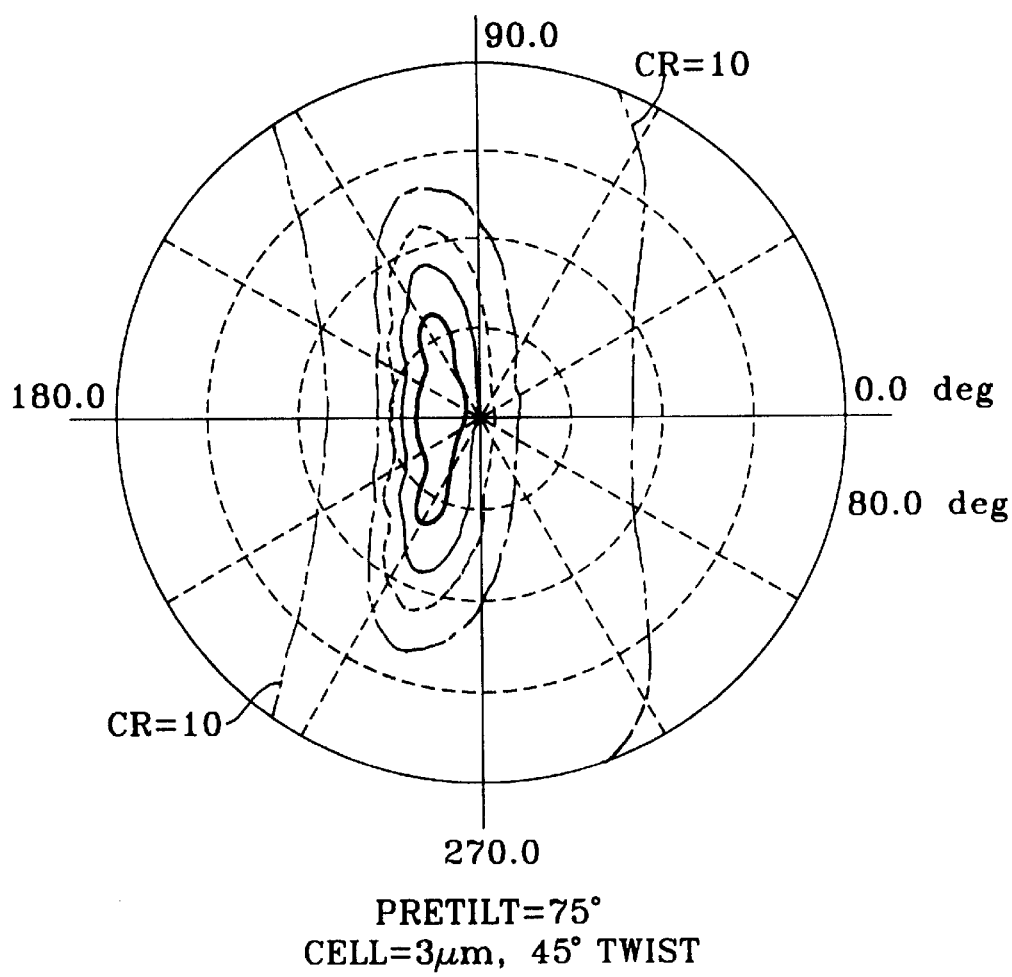
FIG. 48 is a diagram showing viewing angle characteristics of the liquid crystal display device of FIG. 45 for a case in which a pair of retardation films are added and the pre-tilt angle of the liquid crystal molecules is set to 75°.

It has been described previously with reference to FIGS. 40–44 that the viewing angle characteristics of a VA-mode liquid crystal display device are deteriorated to the degree of an ordinary TN-mode liquid crystal display device when the pre-tilt angle is set to 75°. In the construction of FIG. 45 that includes the retardation films 33A and 33B above and below the liquid crystal layer 32, however, the area of the viewing angle in which the contrast ratio CR of 10 or more is achieved is increased to a satisfactory level for a liquid crystal display device as indicated in FIG. 48. It should be noted that the result of FIG. 48 is for the case in which the liquid crystal layer 32 has a thickness of 3 μm and the pre-tilt angle is set to 75°.

Second Embodiment

Next, a second embodiment of the present invention will be described.

In the second embodiment, another liquid crystal, MX95785 of Merck Japan, Ltd., is used in the liquid crystal display device 30 of FIG. 45 for the liquid crystal layer 32, in place of the foregoing MJ941296 liquid crystal. The MX95785 liquid crystal has a birefringence $_A$n of 0.813 and a negative dielectric anisotropy $_A\varepsilon$ of −4.6. As the rest of the construction is identical to the liquid crystal display device 30 of FIG. 45, further description about the construction of the liquid crystal display device will be omitted.

Figure 49:
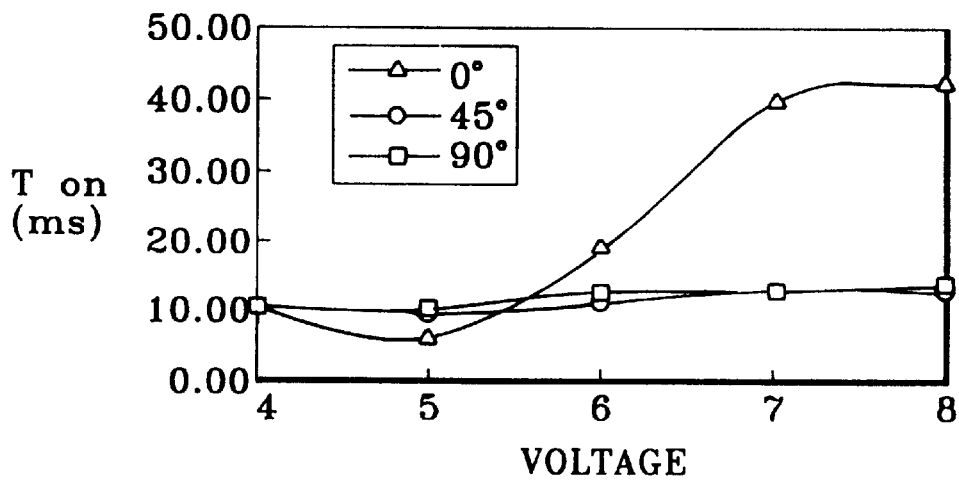
FIGS. 49 and 50 are diagrams showing a response of the liquid crystal display device according to a second embodiment of the present invention.

FIG. 49 shows turn-on transient characteristics of the liquid crystal display device for the case in which the thickness d of the liquid crystal layer 32 is set to 3 μm, wherein FIG. 49 shows a turn-on transient time $T_{on}$ for each of the twist angles of 0°, 45° and 90°. No chiral substance is added to the liquid crystal layer 32. As will be seen clearly from FIG. 49, the turn-on transient time $T_{on}$ is about 10 ms except for the case where the twist angle is 0°, as long as the drive voltage is in the range of 4–8 V. In other words, the liquid crystal display device 30 shows an excellent turn-on response as compared with conventional TN-mode liquid crystal display devices that typically show a turn-on time $T_{on}$ of 20 ms or more.

Figure 50:
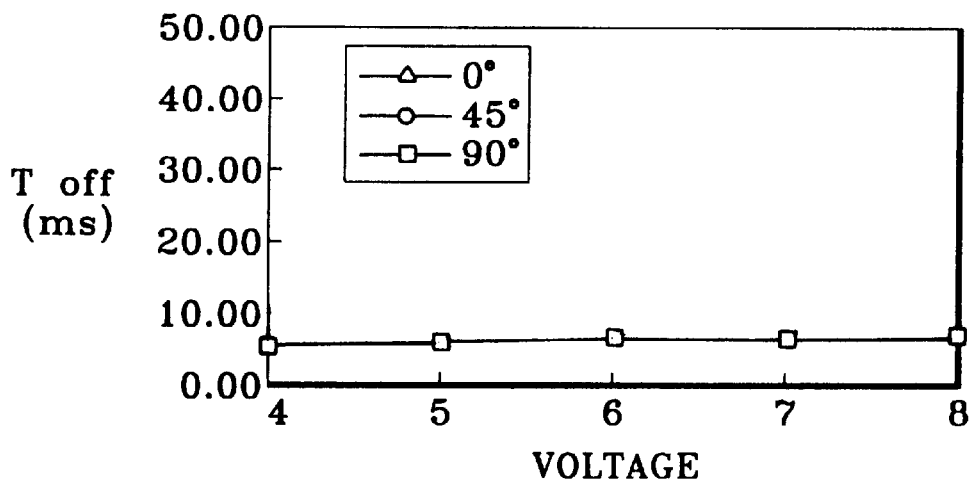

FIG. 50 shows the turn-off transient characteristics of the liquid crystal display device 30 for the case where the thickness d of the liquid crystal layer 32 is set to 3 μm, wherein FIG. 50 shows a turn-of transient time $T_{off}$ for each of the twist angles of 0°, 45° and 90°. In this example, as well, no chiral substance is added to the liquid crystal layer 32. As will be seen clearly from FIG. 50, the turn-off transient time $T_{off}$ is about 5 ms irrespective of the twist angle of the liquid crystal molecules. In other words, the liquid crystal display device 30 shows an excellent turn-off response as compared with conventional TN-mode liquid crystal display devices that typically show a turn-off time $T_{off}$ of 40 ms or more.

TABLE II

| R' (nm) VAC + TAC | CR ≧ 10 at 25° C. | | | | | inversion of gradation | | | | | |
|---|---|---|---|---|---|---|---|---|---|---|---|
| | 0° | 90° | 180° | −90° | av. | 0° | 45° | 90° | 135° | 180° | av. |
| 88 | 43 | 60 | 52 | 61 | 54 | 40 | 40 | 50 | 60 | 38 | 46 |
| 185 | 42 | 70 | 57 | 66 | 59 | 30 | 40 | 70 | 66 | 36 | 49 |
| 282 | 38 | 58 | 52 | 58 | 52 | 26 | 44 | 70 | 70 | 38 | 50 |

Δn · d = 246 nm

TABLE II shows, in the left column, the viewing angle of the liquid crystal display device 30 of the present embodiment for various values of the negative retardation R' caused by the polarizers 34A and 34B as well as by the retardation films 33A and 33B. Further, TABLE II shows, in the right column, the viewing angle in which an inversion occurs in a half-tone image displayed with an eleven-step gradation in the front direction of the liquid crystal panel. With increasing polar angle from the front direction, there occurs an inversion in the gradation, while such an inversion of gradation deteriorates the quality of the displayed image seriously. In the experiment of TABLE II, it should be noted that the liquid crystal layer 32 has a positive retardation with a magnitude of 246 nm. From TABLE II, it should be noted that the area of the satisfactory viewing angle increases for all of the azimuth angles of 90°, −90° and 180°, by setting the retardation caused by the retardation films 33A and 33B as well as by the TAC films of the polarizers 34A and 34B to be generally equal to the retardation $_A$n·d of the liquid crystal layer 32.

TABLE III

| twist (°) | CR ≧ 10 at 25° C. | | | | | inversion of gradation | | | | | |
|---|---|---|---|---|---|---|---|---|---|---|---|
| | 0° | 90° | 180° | −90° | av. | 0° | 45° | 90° | 135° | 180° | av. |
| 0 | 44 | 60 | 49 | 60 | 53 | 40 | 40 | 52 | 60 | 38 | 46 |
| 45 | 43 | 60 | 52 | 61 | 54 | 40 | 40 | 50 | 60 | 38 | 46 |
| 90 | 41 | 59 | 50 | 60 | 53 | 40 | 40 | 54 | 64 | 32 | 46 | no VAC films, use G1220DU polarizer (R' = 88 nm)

TABLE III shows, in the left column, the viewing angle of the liquid crystal display device of the present embodiment for various twist angles of the liquid crystal molecules in the liquid crystal layer 32. Further, the right column of TABLE III represents the viewing angle in which an inversion occurs in a half-tone image displayed with an eleven-step gradation in the front direction of the liquid crystal panel, similarly to the case of TABLE II. TABLE III indicates that there is no substantial effect caused in the viewing angle characteristics of the liquid crystal display device 30 by the twist angle of the liquid crystal molecules. It should be noted that the result of TABLE III is for the case in which the retardation films 33A and 33B are omitted and the phase compensation of the optical beam is achieved only by the retardation R' of 88 nm, which is caused by the TAC films covering the polarizers 34A and 34B.

Third Embodiment

FIG. 51 shows a construction of a liquid crystal display device 40 according to a third embodiment of the present invention, wherein those parts described previously are designated by the same reference numerals and the description thereof will be omitted.

Referring to FIG. 51, the liquid crystal display device 40 has a construction similar to that of the liquid crystal display device 30 of FIG. 45, except that the retardation film 33B of FIG. 45 having a negative retardation is replaced by a first retardation film $(33B)_1$ having a positive retardation and a second retardation film $(33B)_2$ having a negative retardation, wherein the first retardation film $(33B)_1$ of the positive retardation is disposed closer to the liquid crystal panel 31 with respect to the second retardation film $(33B)_2$ of the negative retardation. Thereby, it should be noted that the second retardation film $(33B)_2$ has an optical axis extending perpendicularly to the principal surface of the liquid crystal panel 31, while the first retardation film $(33B)_1$ has an optical axis parallel to the principal surface of the liquid crystal panel 31.

Figure 52:
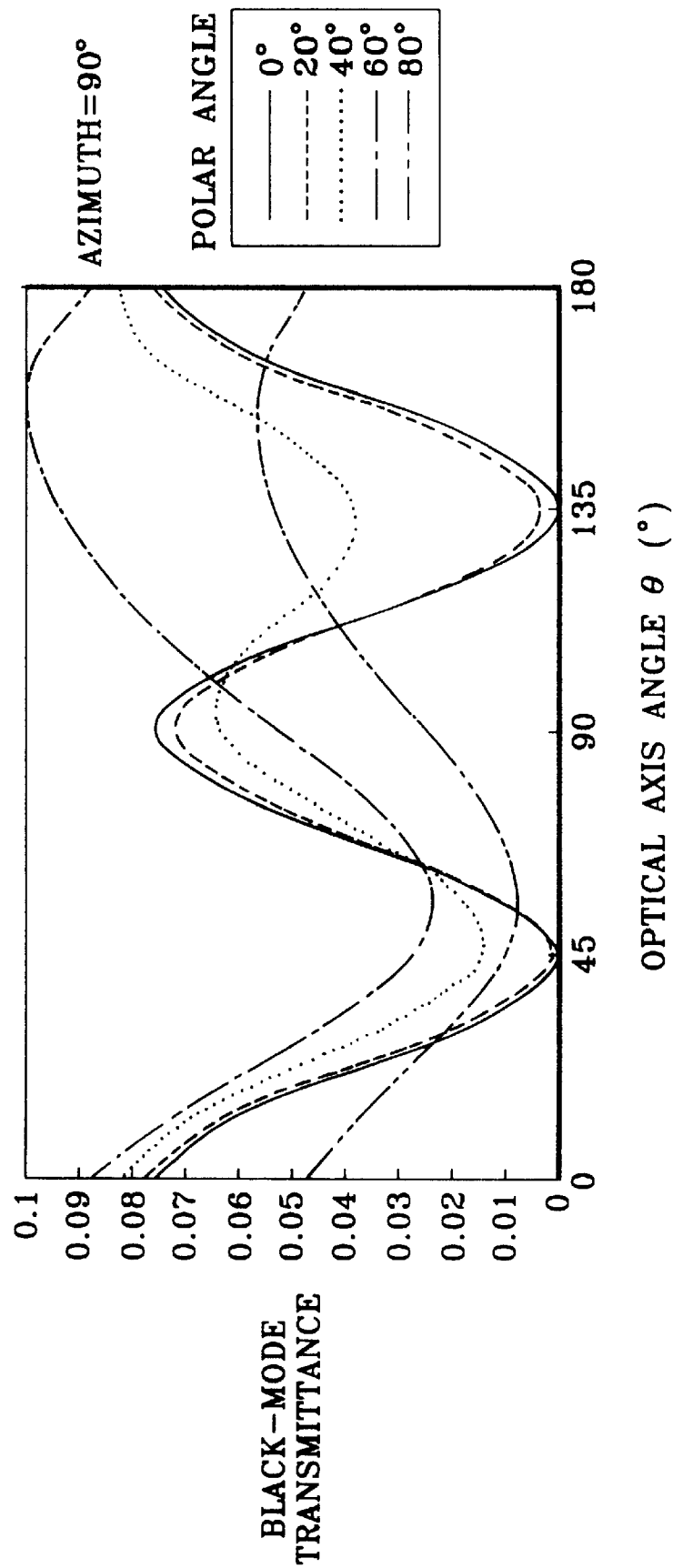
FIG. 52 is a diagram showing a black-state transmittance of the liquid crystal display device of FIG. 51.

FIG. 52 shows a black-state transmittance representing the transmittance of the liquid crystal display device 40 of FIG. 51 for the non-activated state thereof in which no drive voltage is applied to the liquid crystal cell, wherein FIG. 52 shows the black-state transmittance as viewed in the direction where the azimuth angle is 90° for the case in which the thickness d of the liquid crystal layer 32 is set to 3.5 μm and the twist angle is set to 45°. In the example of FIG. 52, the negative retardation of the retardation film $(33B)_2$ is set generally equal to the retardation $_An·d$ of the liquid crystal panel 31 and the positive retardation of the retardation film $(33B)_1$ is fixed at 100 nm. Thereby, FIG. 52 shows the change of the black-state transmittance as a function of the optical-axis angle θ, wherein the optical-axis angle θ indicates the angle that the optical axis of the retardation film $(33B)_1$ forms with respect to the center of twist of the liquid crystal molecules.

Referring to FIG. 52, it should be noted that the black-state transmittance becomes minimum for all of the polar angles when the optical-axis angle θ is set to about 45°. In other words, it is possible to improve the viewing angle characteristics for all of the polar angles by setting the optical-axis angle θ to be about 45°. Further, the contrast ratio CR is maximized as a result of minimization of the black-state transmittance.

In FIG. 52, it should be noted further that a minimum of the black-state transmittance is achieved also for the polar angle of 0° or 20° when the optical-axis angle θ is set to about 135°. However, this state is not a true optimum, as the black-state transmittance is not minimized for the polar angles of 40° or more in this state.

Figure 53:
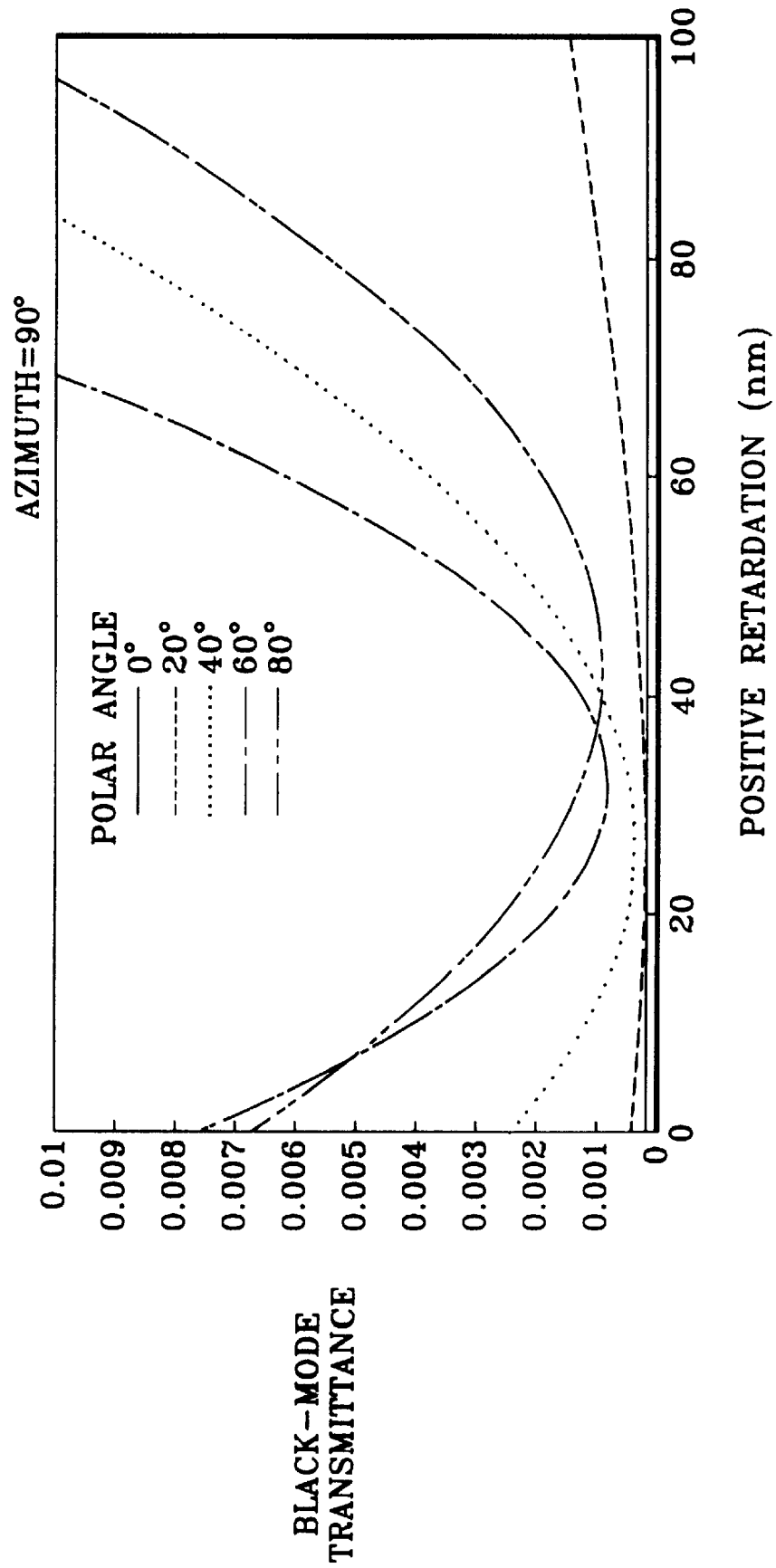
FIG. 53 is another diagram showing a black-state transmittance of the liquid crystal display device of FIG. 51.

FIG. 53 is a diagram showing the black-state transmittance of the liquid crystal display device 40 of FIG. 51 for various polar angles as a function of the positive retardation R of the retardation film $(33B)_1$. In FIG. 53, as well, the azimuth angle is set to 90°.

Referring to FIG. 53, it should be noted that the black-state transmittance is minimized for all of the polar angles by setting the retardation R of the retardation film $(33B)_1$ to fall in a range between 20 nm and 60 nm. By optimizing the retardation R of the retardation film $(33B)_1$ as such, the black-state transmittance can be reduced to 0.002 or less.

Figure 54:
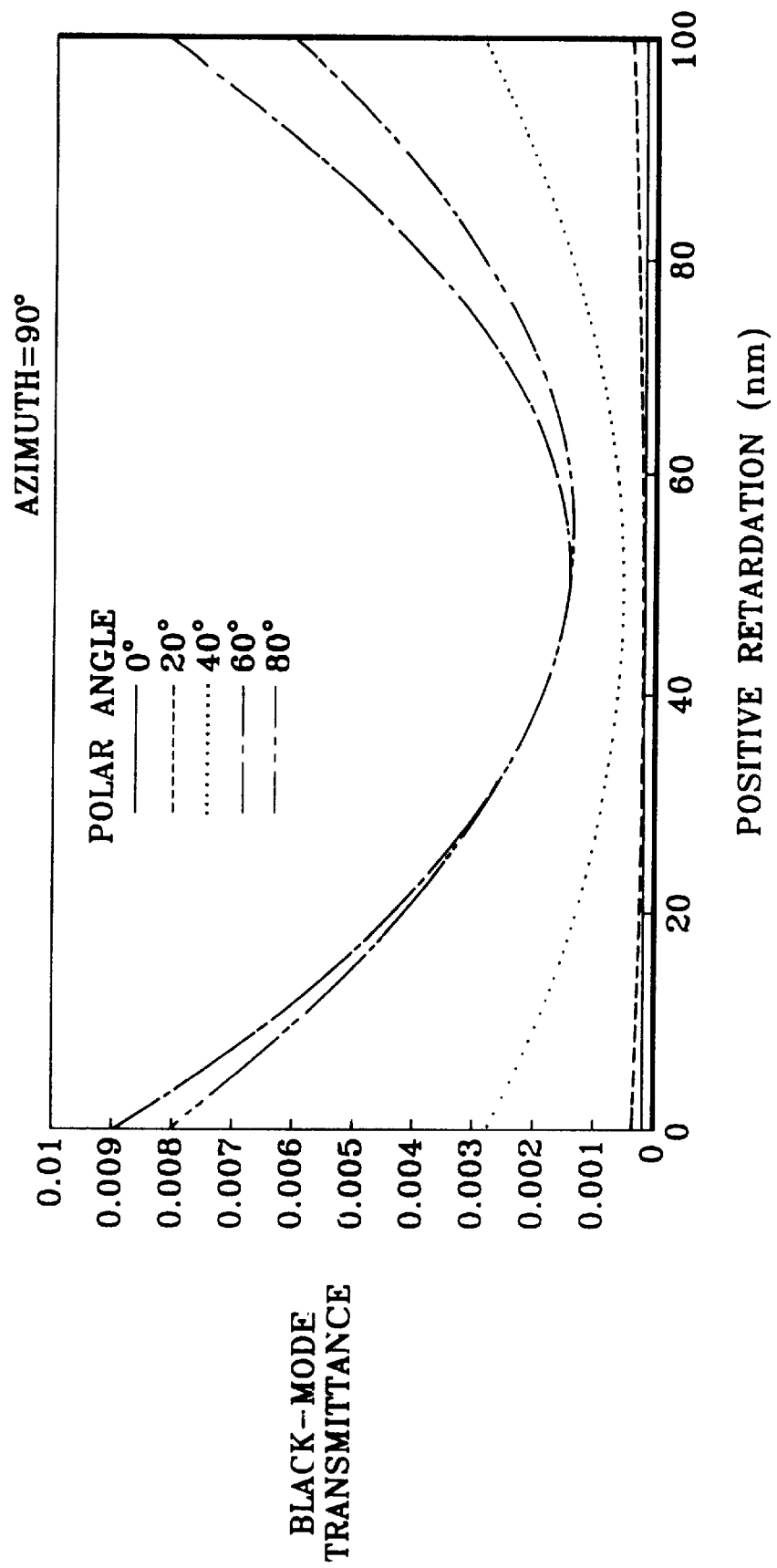
FIG. 54 is another diagram showing a black-state transmittance of the liquid crystal display device of FIG. 51.

FIG. 54 shows the black-state transmittance of the liquid crystal display device 40 of FIG. 51 as a function of the positive retardation R of the retardation film $(33B)_1$, in which the liquid display device 40 includes another retardation film having a negative retardation between the lower polarizer 34A and the liquid crystal panel 31. It should be noted that FIG. 54 shows the black-state transmittance for the case in which total retardation of the foregoing additional retardation film and the retardation film $(33B)_2$ is set generally equal to the retardation of the liquid crystal panel 31.

As will be seen in FIG. 54, the polar-angle-dependence of the black-state transmittance disappears substantially in this construction, and a minimum of the transmittance is obtained for the case in which the retardation film $(33B)_1$ has a retardation in the range between 50–60 nm. In order that such a construction be effective, it is necessary to set the positive retardation R of the retardation film $(33B)_1$ to be smaller than about 100 nm.

Figure 55:
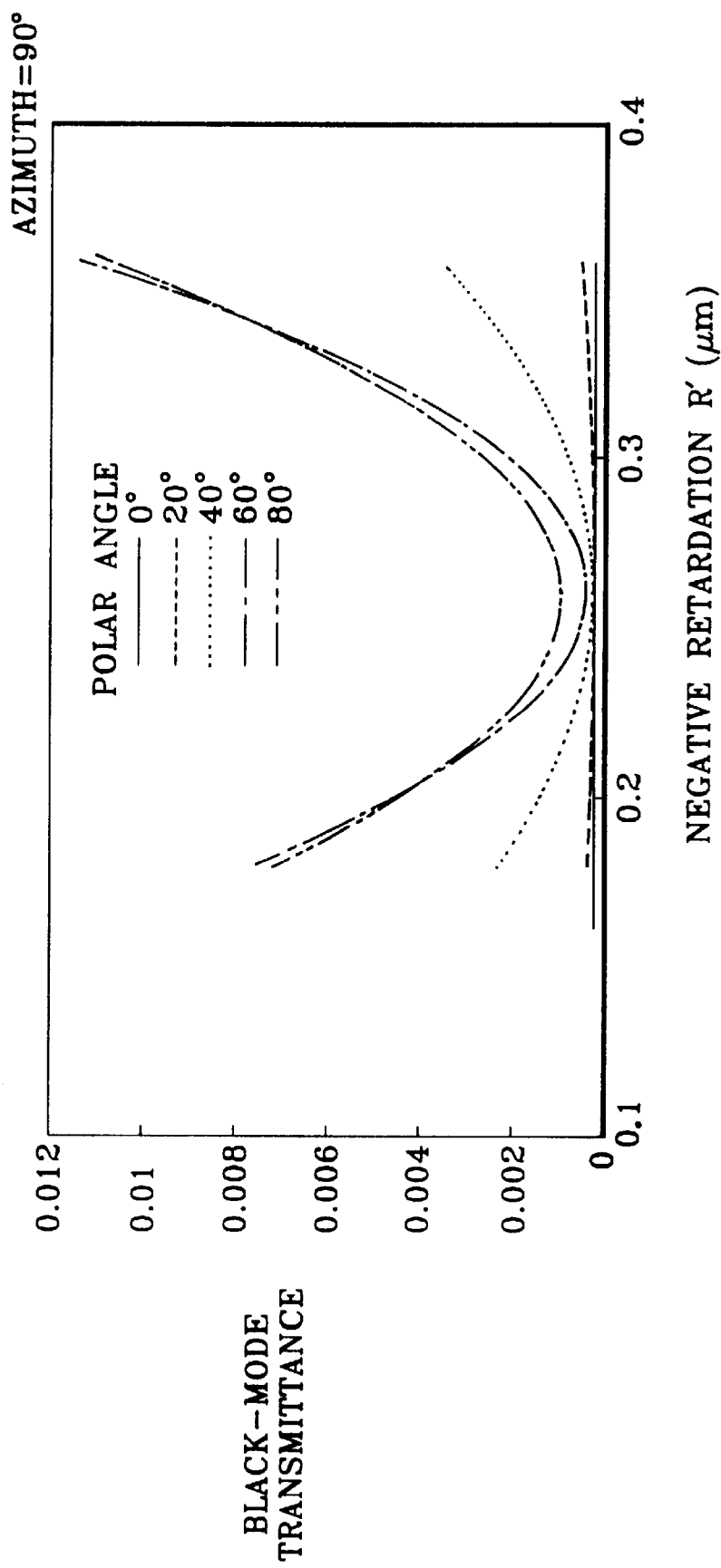
FIG. 55 is a further diagram showing a black-state transmittance of the liquid crystal display device of FIG. 51.

FIG. 55 shows the black-state transmittance of the liquid crystal display device 40 of FIG. 55 for various values of the negative retardation R' of the retardation film $(33B)_2$ while fixing the positive retardation R of the retardation film $(33B)_1$ at 30 nm. Similarly as before, the transmittance is measured in the direction where the azimuth angle is 90°.

As will be seen in FIG. 55, the transmittance becomes minimum when the value of the negative retardation R' of the retardation film $(33B)_2$ takes a value of about 250 nm. This optimum value is slightly smaller than the retardation $_An·d$ of the liquid crystal layer 32. As explained already, the optimum retardation of the retardation film $(33B)_2$ is equal to the retardation $_An·d$ of the liquid crystal layer 32 when no retardation film $(33B)_1$ of the positive retardation is provided. This means that, when the retardation film $(33B)_1$ of positive retardation is to be used in addition to the retardation film $(33B)_2$ of negative retardation, it is necessary to set the optimum value of the retardation film $(33B)_2$ to be slightly smaller than the retardation $_An·d$ of the liquid crystal layer 32. In any case, the total of the negative retardation R' should be set smaller than the retardation $_An·d$ of the liquid crystal layer 32 in the case in which the retardation film $(33B)_2$ is used alone or in the case in which the retardation film $(33B)_2$ is used together with another negative retardation film.

FIG. 56 shows the viewing angle characteristics of the liquid crystal display device 40 of FIG. 51. As should be noted, the area of the viewing angle in which the contrast ratio CR of 10 or more is achieved is expanded as compared with the result of FIG. 17.

Fourth Embodiment

FIG. 57 shows a construction of a liquid crystal display device 50 of the fourth embodiment, wherein those parts described previously are designated by the corresponding reference numerals and the description thereof will be omitted.

Figure 58:
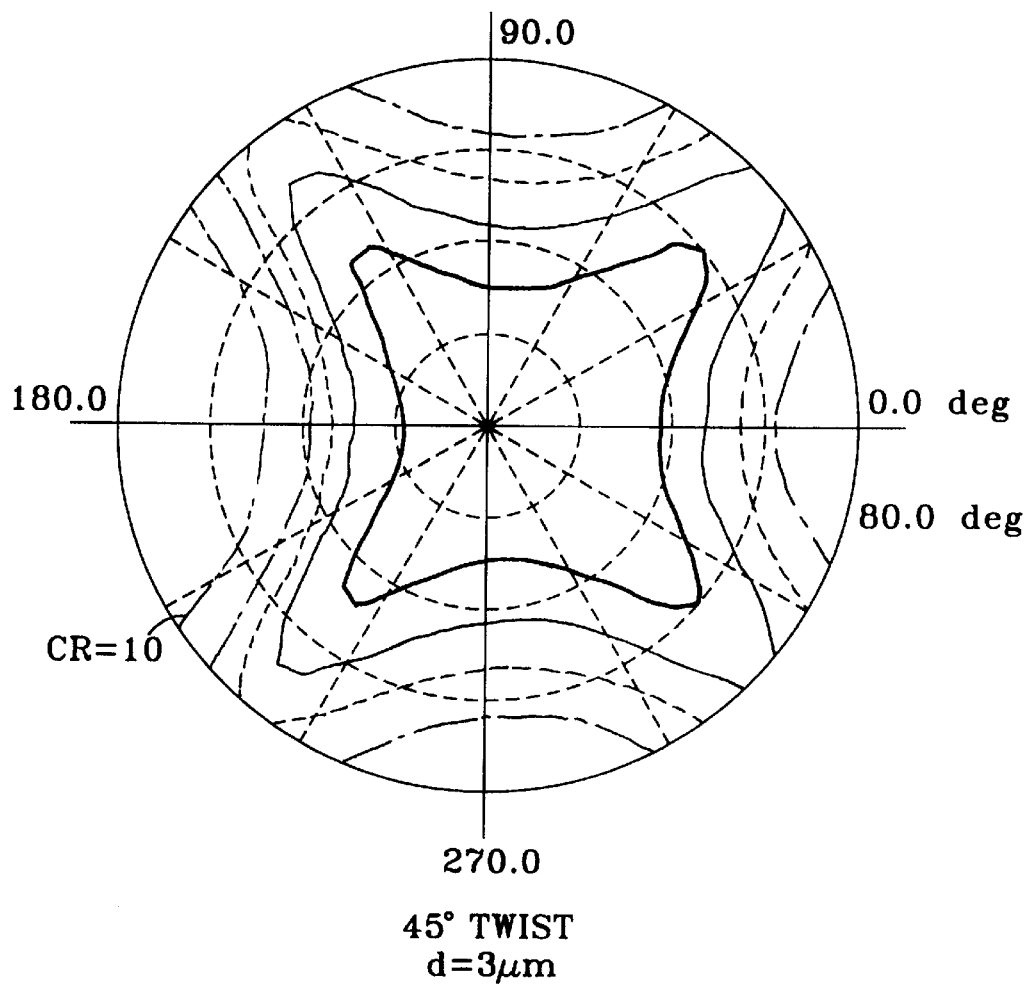
FIG. 58 is a diagram showing viewing angle characteristics of the liquid crystal display device of FIG. 58.

Referring to FIG. 57, it should be noted that the liquid crystal display device 50 has a construction similar to that of the liquid crystal display device 40 of FIG. 51, except that a retardation film $(33A)_1$ similar to the retardation film $(33B)_1$ and a retardation film $(33A)_2$ similar to the retardation film $(33B)_2$ are provided in the gap formed between the polarizer 34A and the liquid crystal panel 31. Thereby, it should be noted that the retardation film $(33A)_1$ showing a positive retardation is disposed closer to the liquid crystal panel 31 with respect to the retardation film $(33A)_2$ having a negative retardation. By providing the retardation films $(33A)_1$ and $(33A)_2$ as such, the upper part of the liquid crystal display device located above the liquid crystal panel 31 becomes symmetric with respect to the lower part thereof located below the liquid crystal panel 31, and the viewing angle characteristics are improved further as indicated in FIG. 58.

Fifth Embodiment

Figure 59:
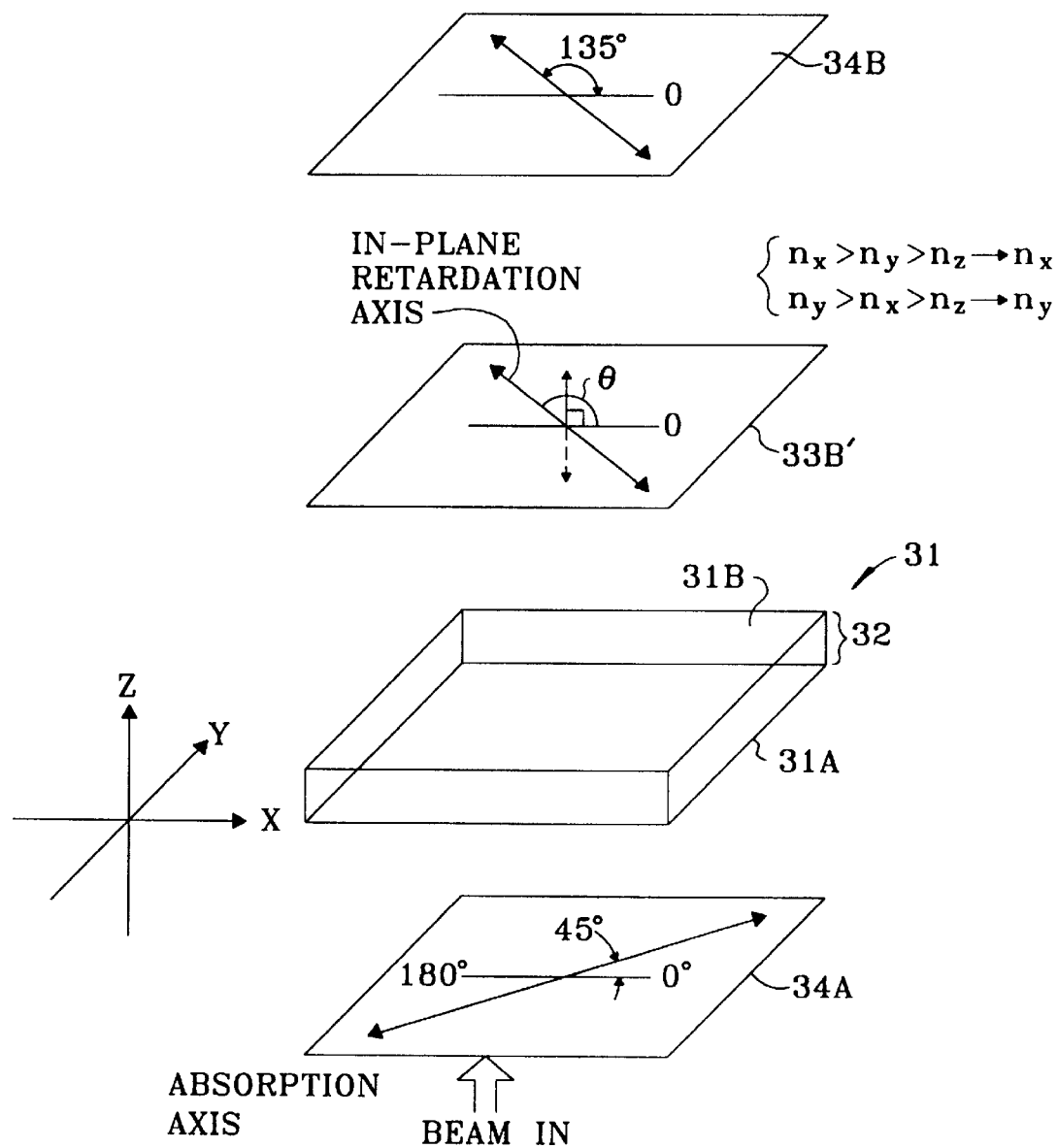
FIG. 59 is a diagram showing a construction of the liquid crystal display device according to a fifth embodiment of the present invention.

FIG. 59 shows a construction a liquid crystal display device 60 according to a fifth embodiment of the present invention, wherein those parts described previously are designated by the same reference numerals and the description thereof will be omitted.

Referring to FIG. 59, the liquid crystal display device 60 has a construction similar to that of the liquid crystal display device 40 explained previously, except that the positive retardation film $(33B)_1$ and the negative retardation film $(33B)_2$ of the liquid crystal display device 40, located between the liquid crystal panel 31 and the polarizer 34B, are replaced by a single biaxial retardation film 33B' in the liquid crystal display device 60 of the present embodiment.

The biaxial retardation film 33B' has refractive indices $n_x$, $n_y$ and $n_z$ respectively in the x–, y– and z–directions, wherein there holds a relationship $n_x>n_y>n_z$ or $n_y>n_x>n_z$. Such a biaxial retardation film itself is known for example from the Japanese Laid-open Patent Publication 59-189325.

It should be noted that the biaxial retardation film 33B' forms a retardation in the plane of the film 33B' with a magnitude represented by $|n_x-n_y| \cdot d$ and further a retardation in the normal direction or thickness direction of the film 33B' with a magnitude represented by $\{(n_x+n_y)/2+n_z\} \cdot d$. In the present embodiment, an optimum result is obtained by setting the foregoing in-plane retardation to be 120 nm or less and the retardation in the thickness direction to be generally equal to the retardation $_A n \cdot d$ of the liquid crystal layer 32. In the example of FIG. 59, it should be noted that the retardation film 33B' is disposed such that an in-plane retardation axis is generally parallel to the absorption axis of the adjacent polarizer 34B, wherein the in-plane retardation axis represents the direction in which the retardation becomes maximum. In the case where the relationship $n_x>n_y>n_z$ holds, the in-plane retardation axis coincides with the x-axis, while in the case where the relationship $n_y>n_x>n_z$ holds, the in-plane retardation axis coincides with the y-axis.

Sixth Embodiment

Figure 60:
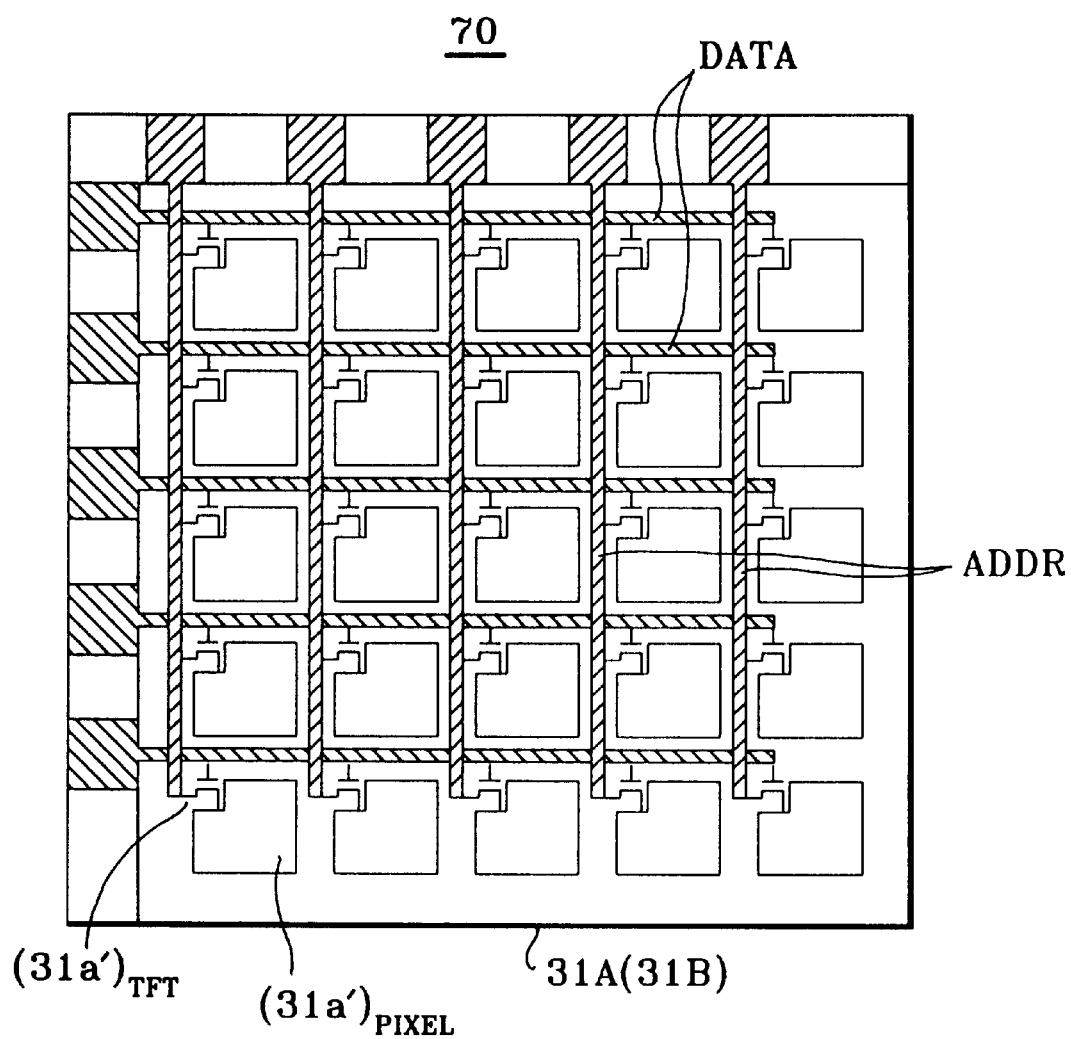
FIG. 60 is a diagram showing a construction of the liquid crystal display device according to a sixth embodiment of the present invention.

FIG. 60 shows a construction of a liquid crystal display device 70 of an active-matrix type.

Referring to FIG. 60, the liquid crystal display device 70 has a construction similar to that of FIG. 45, except that a plurality of transparent pixel electrodes (31a')PIXEL and corresponding thin-film transistors (31a')TFT that drive the pixel electrodes, are provided on the glass substrate 31A or 31B, in correspondence to pixels that are defined in the liquid crystal panel 31. Thus, the transparent pixel electrode (31a')PIXEL and the thin-film transistor (31a')TFT correspond to the electrode 31a' or electrode 31b' of FIG. 45. Further, a data bus DATA and an address bus ADDR extend on the substrate 31A or 31B respectively for supplying a drive signal to the thin-film transistors forming the matrix array and for selectively activating the thin-film transistors in the array.

FIG. 61 shows the viewing angle characteristics of the liquid crystal display device 70 of FIG. 61 for the case in which the MJ95785 liquid crystal of Merck Japan, LTD. is used for the liquid crystal layer and in which the liquid crystal layer is formed to have a thickness of 3 μm. In FIG. 61, it should further be noted that the twist angle of the liquid crystal molecules is set to 45° and the liquid crystal layer shows a retardation $_A n \cdot d$ of 241 nm. Further, the RN 783 film of Nissan Chemicals, KK. is used for the molecular alignment films 31a and 31b. As will be understood clearly from FIG. 61, the active-matrix liquid crystal display device exhibits a very wide viewing angle characteristics.

Seventh Embodiment

Figure 62A:
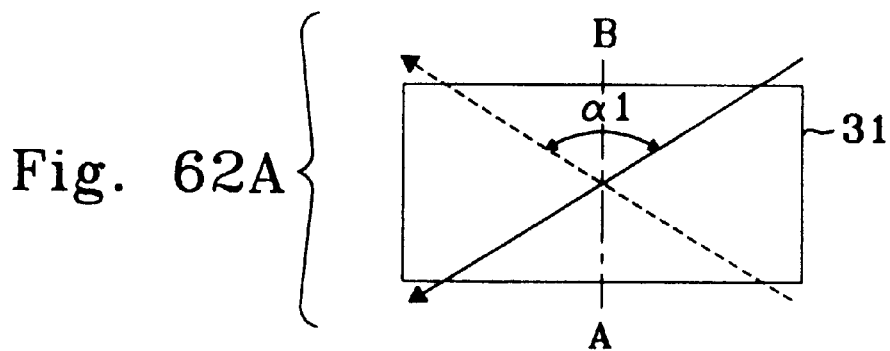
FIGS. 62A–62C are diagrams showing a domain structure of the liquid crystal display device of any of the preceding embodiments.
Figure 62B:
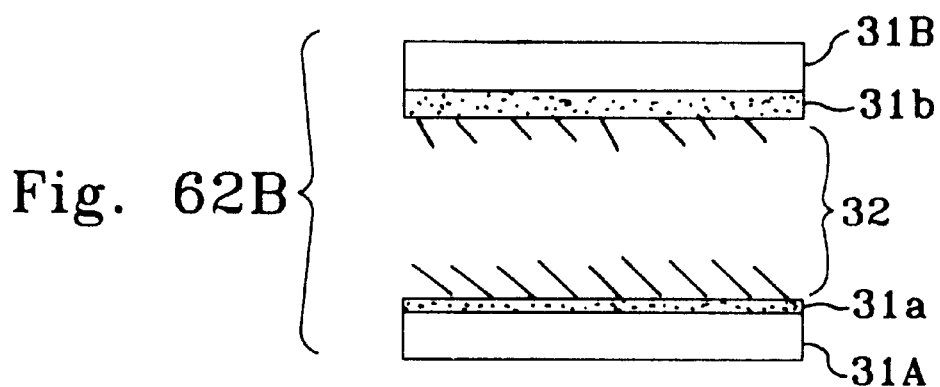
Figure 62C:
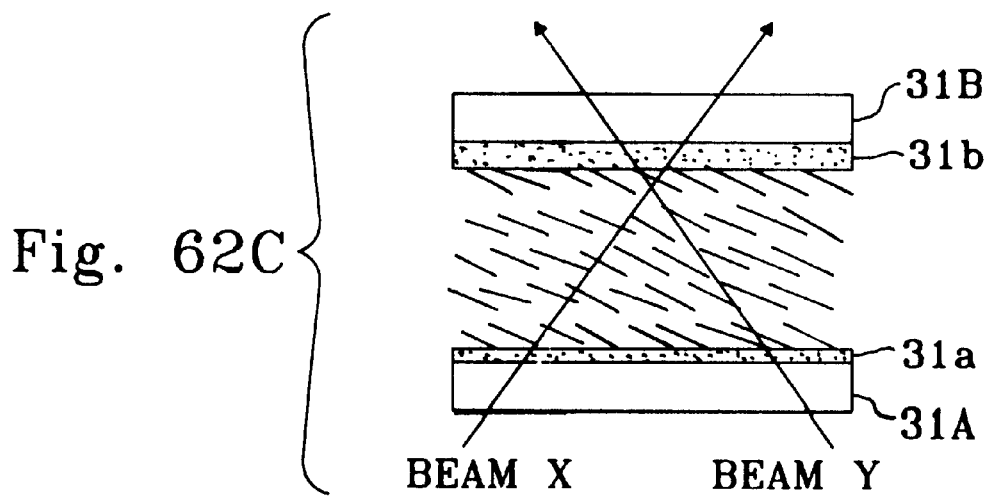

In the embodiments described heretofore, each of the pixels in the liquid crystal display device has a so-called single-domain structure shown in FIGS. 62A–62C, in which the molecular alignment of the liquid crystal molecules is uniform in each of the pixels. In FIGS. 62A–62C, those parts corresponding to the parts described previously are designated by the same reference numerals and the description thereof will be omitted.

Referring to FIGS. 62A–62C, it should be noted that FIG. 62A shows one pixel in the liquid crystal display device in a plan view, while FIG. 62B shows the cross sectional view of the pixel taken along a line A-B in FIG. 62A in an activated state of the liquid crystal display device. Further, FIG. 62C shows the state in which the liquid crystal display device is irradiated by optical beams X and Y from two directions. It should be noted that FIG. 62A shows the rubbing direction of the molecular alignment film 31b provided on the upper substrate 31B by ea continuous line. Further, the rubbing direction of the molecular alignment film 31a on the lower substrate 31A is represented in FIG. 62A by a dotted line. The continuous line and the dotted line intersect each other with an angle $\alpha_1$, wherein the angle $\alpha_1$ is set to 45° when the twist angle of the liquid crystal molecules is to be set to 45°.

As can be seen in FIG. 62C, the molecular alignment of the liquid crystal molecules as viewed in the traveling direction of the optical beam changes, in the activated state of the liquid crystal display device, depending on whether the optical beam travels along the path X or along the path Y. When there exists such an asymmetricity in the optical structure of the liquid crystal display device, the problem of deterioration of the viewing angle characteristics is inevitable.

Figure 63A:
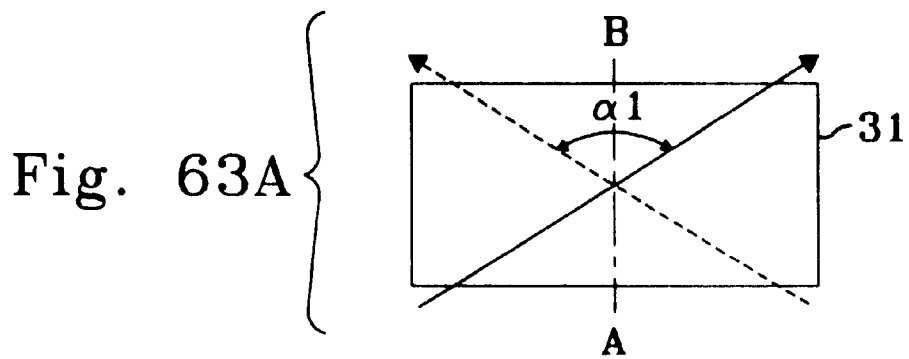
FIGS. 63A–63C are diagrams showing a domain structure of the liquid crystal display device according to a seventh embodiment of the present invention.
Figure 63B:
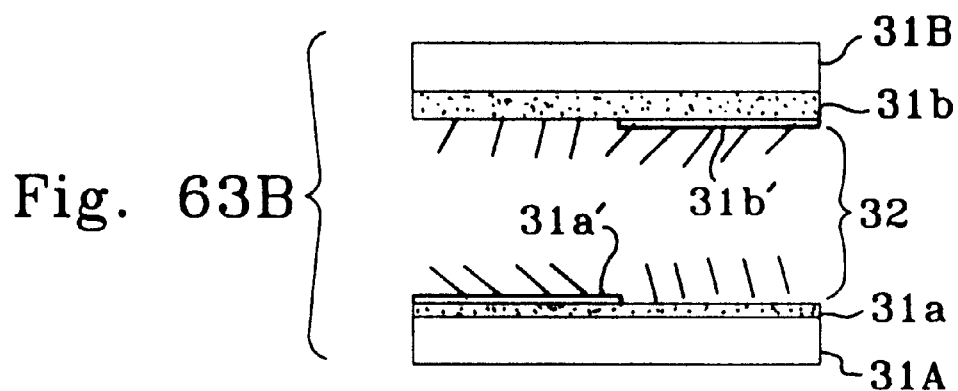
Figure 63C:
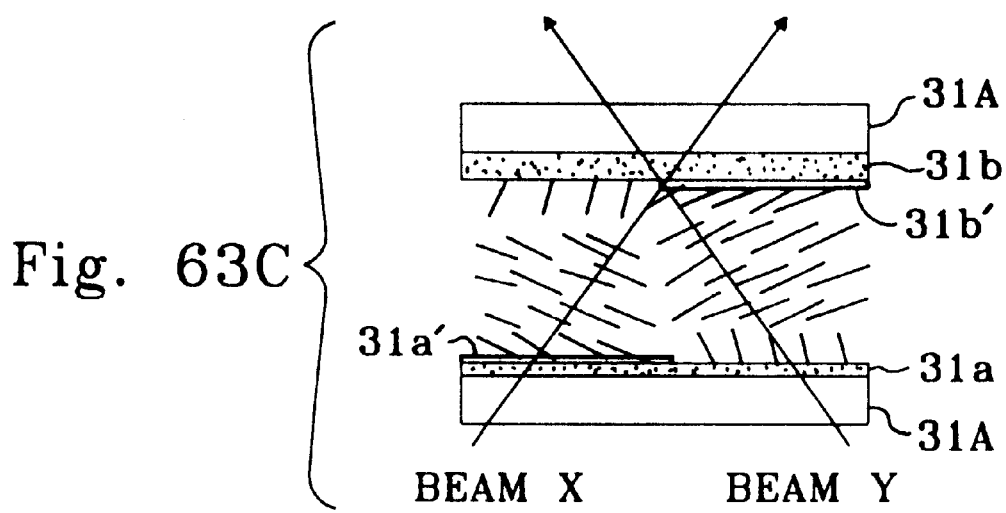

FIGS. 63A–63C show a construction of the liquid crystal display device according to a seventh embodiment of the present invention, wherein those parts described previously are designated by the same reference numerals and the description thereof will be omitted. It should be noted that FIG. 63A shows a plan view similar to the plan view of FIG. 62A, while FIGS. 63B and 63C show cross-sectional views corresponding to FIGS. 62B and 62C.

Referring to FIGS. 63A–63C, it should be noted that the present embodiment uses ultraviolet-reformed molecular alignment films 31a' and 31b' such that the molecular alignment films 31a' and 31b' cover a part of the molecular alignment film 31a and a part of the molecular alignment film 31b, respectively. Such ultraviolet-reformed molecular alignment films may be formed by depositing a molecular alignment film forming the films 31a' and 31b' on the molecular alignment film 31a or 31b, after a rubbing process of the film 31a or 31b is completed. Further, the molecular alignment film thus deposited is exposed to an ultraviolet radiation such that the molecules in the molecular alignment film thus deposited cause a desired alignment. After such an alignment of the molecules, the deposited molecular-alignment film is patterned such that only a part thereof remains on the underlying molecular alignment film 31a or 31b.

By forming the molecular alignment film 31a' in the lower part of the pixel and by forming the molecular alignment film 31b' in the upper part of the pixel in the illustration of FIG. 63C, the optical beam traveling in the direction X and the optical beam traveling in the direction Y experience substantially the same effect of molecular orientation of the liquid crystal molecules. In other words, the liquid crystal display device shows an optical property that is substantially identical in the X-directiion and in the Y-direction.

Figure 64A:
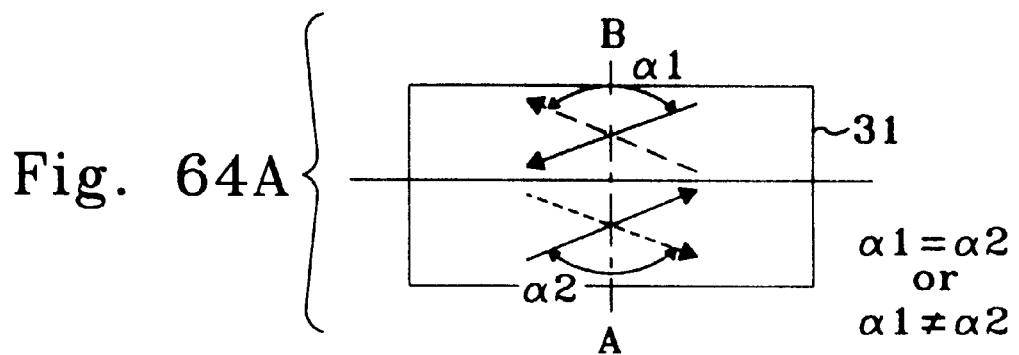
FIGS. 64A–64C are diagrams showing a domain structure of the liquid crystal display device according to a modification of the seventh embodiment.
Figure 64B:
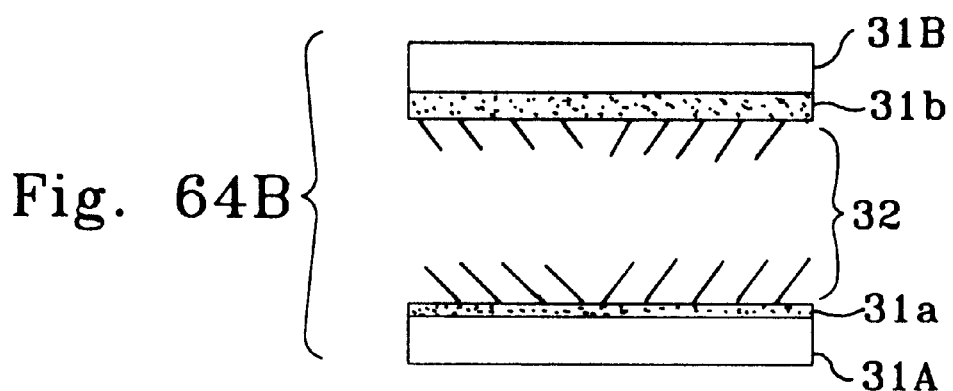
Figure 64C:
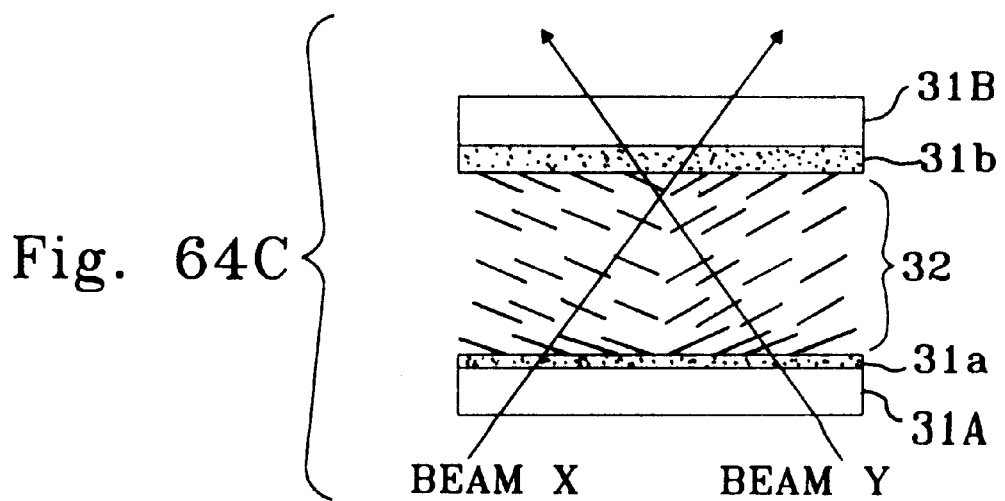

FIGS. 64A–64C show a modification of the present embodiment.

Referring to FIG. 64A, the direction of rubbing is changed in the pixel in the upper part and lower part in the illustration of FIG. 64A, and thus, the molecular orientation is different in the right region and left region of the pixel as can be seen in the cross-sectional view of FIG. 64B. As noted in FIG. 64A, the rubbing directions of the upper and lower molecular alignment layers 31a and 31b cross with each other with an angle $\alpha_1$ in the upper part of the pixel while the rubbing directions cross with each other with an angle $\alpha_2$ in the lower part of the pixel. As a result, the optical beam traveling in the X-direction and the optical beam traveling in the Y-direction experience substantially the same effect of molecular orientation of the liquid crystal molecules. Thereby, the viewing angle characteristics of the liquid crystal display device are improved substantially.

Figure 65:
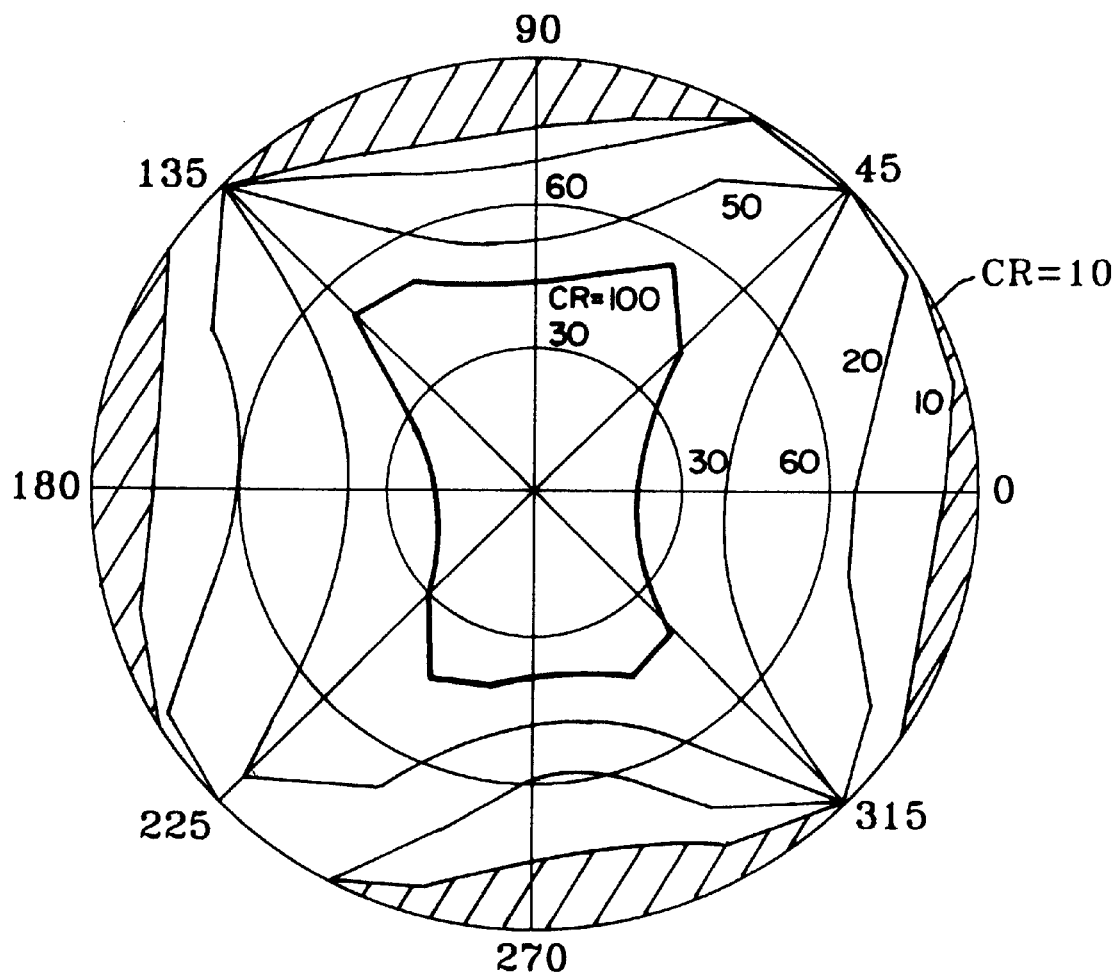
FIG. 65 is a diagram showing viewing angle characteristics of the liquid crystal display device of the seventh embodiment.

FIG. 65 shows the viewing angle characteristics of the liquid crystal display device of FIG. 64 for the case in which the angles $\alpha_1$ and $\alpha_2$ are both set to 45°, in which the MJ95785 liquid crystal is used for the liquid crystal layer 32. The thickness d of the liquid crystal layer 32 is set to 3 μm. No chiral substance is added to the liquid crystal layer 32. Thus, the liquid crystal layer 32 has a retardation $_\Delta$n·d of 287 nm and the twist angle is set to 45°. Further, it should be noted that the result of FIG. 65 is for the case in which the positive and negative retardation films are provided as indicated in FIG. 57 such that the total retardation R of the retardation films $(33A)_1$ and $(33B)_1$ is set to 25 nm and the retardation R' of the retardation film $(33A)_2$ and $(33B)_2$ is set to 160 nm.

Referring to FIG. 65, it should be noted that the area of the viewing angle in which the contrast ratio decreases below 10 is substantially limited, and the liquid crystal display device shows excellent viewing angle characteristics.

FIG. 66 shows the viewing angle characteristics of the same liquid display device obtained by a simulation. The result of FIG. 66 indicates that there is a further possibility that the viewing angle characteristics of the liquid display device be improved by a further optimization.

Figure 67:
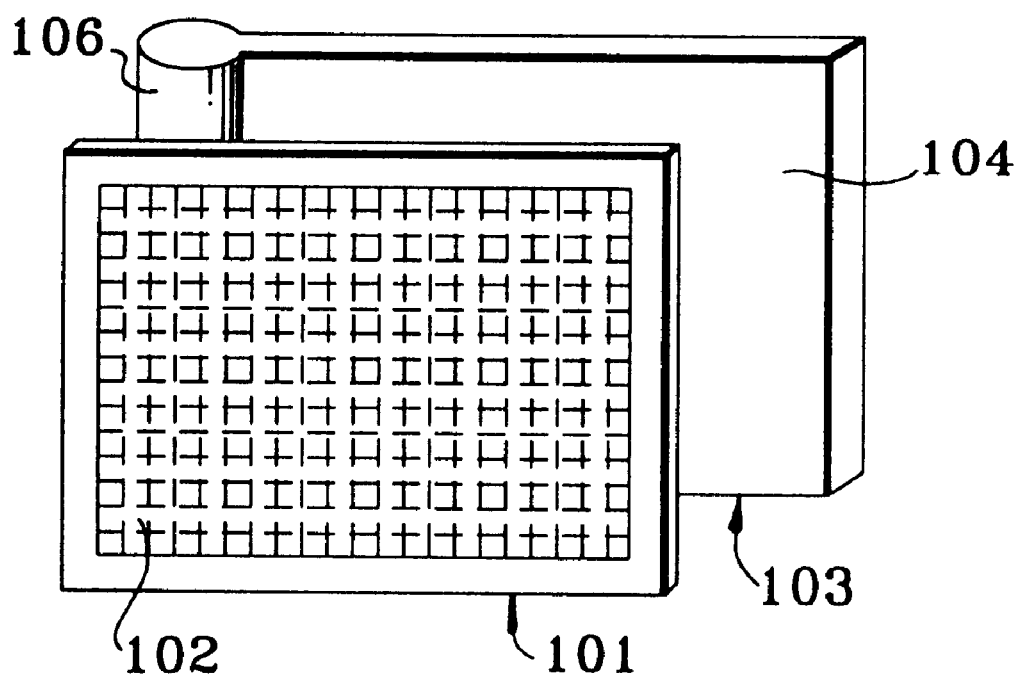
FIG. 67 is a diagram showing a construction of a direct-view type liquid crystal display device that uses the vertically aligned liquid crystal display device of the present invention.

FIG. 67 shows a construction of a direct-view type liquid crystal display apparatus 100 constructed by using the VA-mode liquid crystal display device of any of the foregoing embodiments.

Referring to FIG. 67, the liquid crystal display apparatus 100 includes a VA-model liquid crystal display device 101, which may be any of the liquid crystal display devices 10–70 explained heretofore, and a planar light source unit 103 disposed behind the liquid crystal display device 101. The liquid crystal display device 101 includes a plurality of pixel regions 102, wherein each of the pixel regions modulates the optical beam emitted by the planar light source unit 103. As usual, the planar light source unit 103 includes a light source part 106 that accommodates therein a linear light source such as a fluorescent tube and an optical diffusion part 104 that causes a diffusion of the light produced by the linear light source. As a result of such a diffusion, a two-dimensional illumination of the liquid crystal display device 101 becomes possible.

By using the liquid crystal display device explained heretofore for the liquid crystal display device 101, excellent viewing angle characteristics are obtained, in addition to the high contrast and high response representation.

Eighth Embodiment

In relation to FIGS. 35 and 36, a description was made previously that addition of chiral substance to the liquid crystal layer is not preferable in the VA-mode liquid crystal display device of the present invention. This, however, does not mean that the addition of chiral substance to the liquid crystal layer is harmful and should not be made at all in the present invention. In fact, the control of the chiral pitch of the liquid crystal molecules in the liquid crystal layer by means of a chiral substance in a suitable, limited range, provides an advantageous effect of suppression of coloring of the representation as will be noted below, while simultaneously optimizing the brightness, contrast ratio and the response of the representation.

Hereinafter, an eighth embodiment of the present invention will be made that makes use of such chiral substance.

Figure 68:
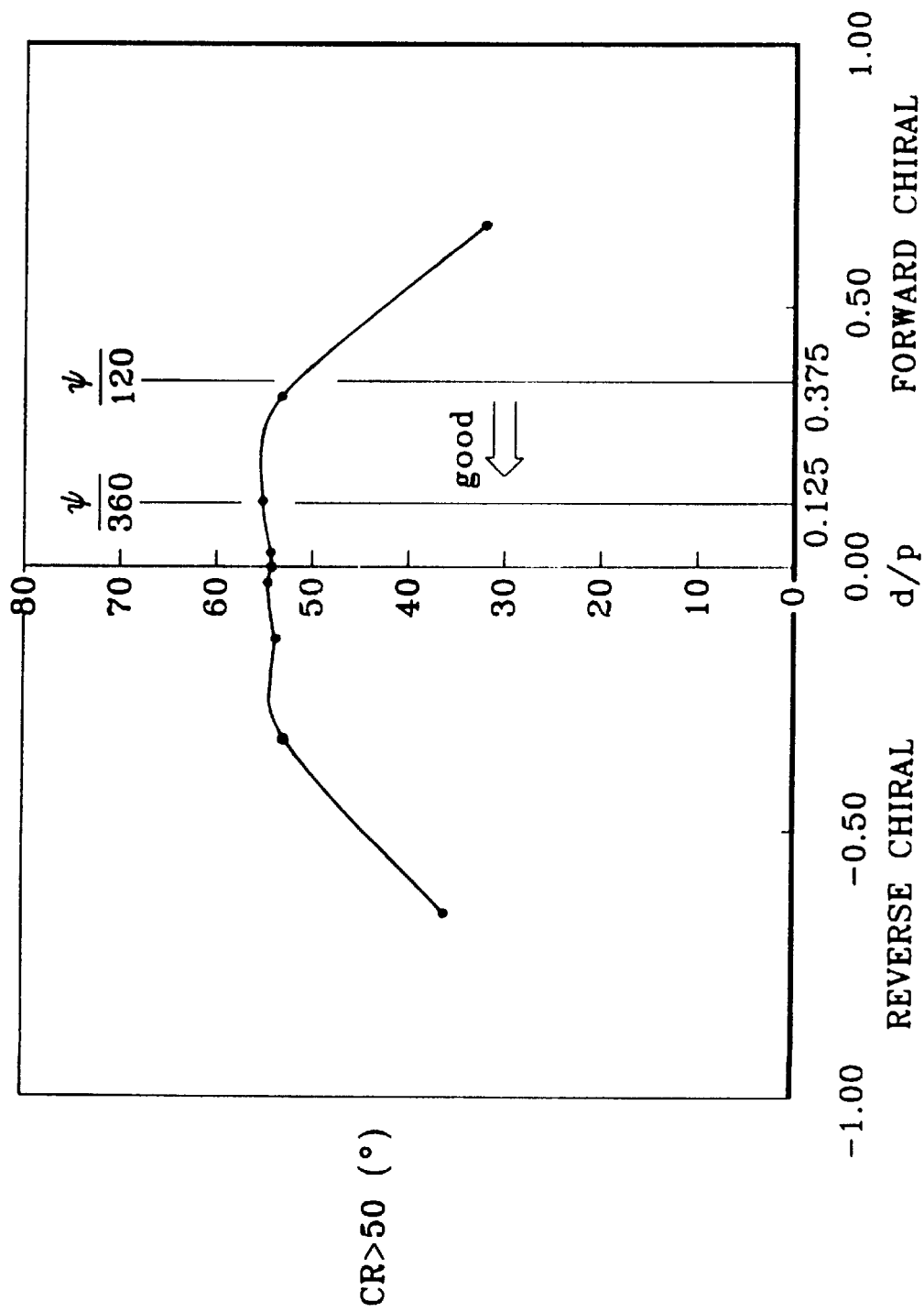
FIG. 68 is a diagram showing the viewing angle characteristics of a liquid crystal display device according to an eighth embodiment of the present invention that contains a chiral substance.

FIG. 68 shows the change of the viewing angle characteristics of the liquid crystal display device 40 of FIG. 51 for the case in which a chiral substance is added to the liquid crystal layer 32 while varying the chiral pitch p variously, wherein the result of FIG. 68 is for the case in which the foregoing MX941296 of Merck Japan ($_\Delta$n=0.082, $_\Delta\in$=-4.6) is used for the liquid crystal layer 32, together with the foregoing G1220DU of Nitto Denko for the polarizers 34A and 34B. Further, a birefringence film having the refractive indices $n_x$, $n_y$ and $n_z$ with the relationship of $n_x$=1.501, $n_y n_z$=1.5 is used for the positive phase compensation film $(33B)_1$, and a birefringence film having the refractive indices $n_x$, $n_y$ and $n_z$ with the relationship of $n_x$=$n_y$=1.501 and $n_z$=1.5 is used for the negative phase compensation film $(33B)_2$. In FIG. 68, the thickness d of the liquid crystal layer 32 is set to 3.25 μm, and the twist angle of the liquid crystal molecules is set to 45°. Further, the designation "forward chiral direction" of FIG. 68 indicates that the direction of the twisting of the chiral substance agrees with the direction of the twisting of the liquid crystal molecules in the liquid crystal layer 32, while the designation "reverse chiral direction" indicates that the direction of the twisting of the chiral substance is against the direction of the twisting of the liquid crystal molecules.

Referring to FIG. 68, it should be noted that a viewing angle exceeding 50° is secured as long as the absolute value of the d/p ratio or |d/p| is set to fall within the range of 0.375 (=ψ/120°;ψ is the twist angle represented in terms of degrees), wherein the positive value of the d/p ratio in the foregoing representation means the forward chiral direction while the negative value of the d/p ratio means the reverse chiral direction.

Figure 69:
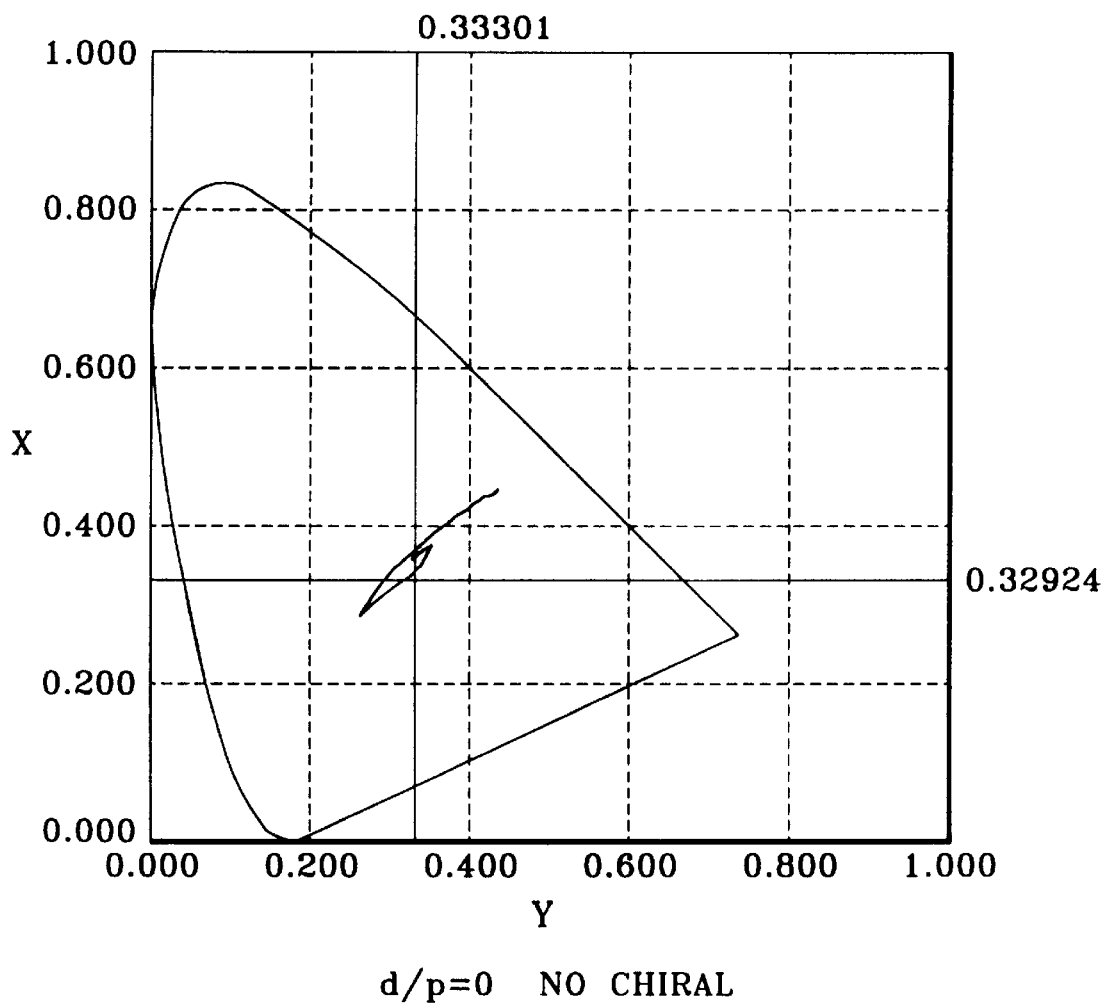
FIGS. 69–76 are chromaticity diagrams showing a coloring of the liquid crystal display device of the eight embodiment for various setting of the chiral pitch in the liquid crystal layer.

FIGS. 69–76 are diagrams similar to the chromaticity diagram of FIG. 27–31, showing the coloring of the representation of the liquid crystal display device 40 of FIG. 51 for the case in which the d/p ratio is changed variously as a result of admixing of the chiral substance. Throughout FIGS. 69–76, the thickness d of the liquid crystal layer is set to 3.25 μm, wherein FIG. 69 shows the case in which no chiral substance is added. Thus, FIG. 69 generally corresponds to FIG. 28 explained previously.

Figure 70:
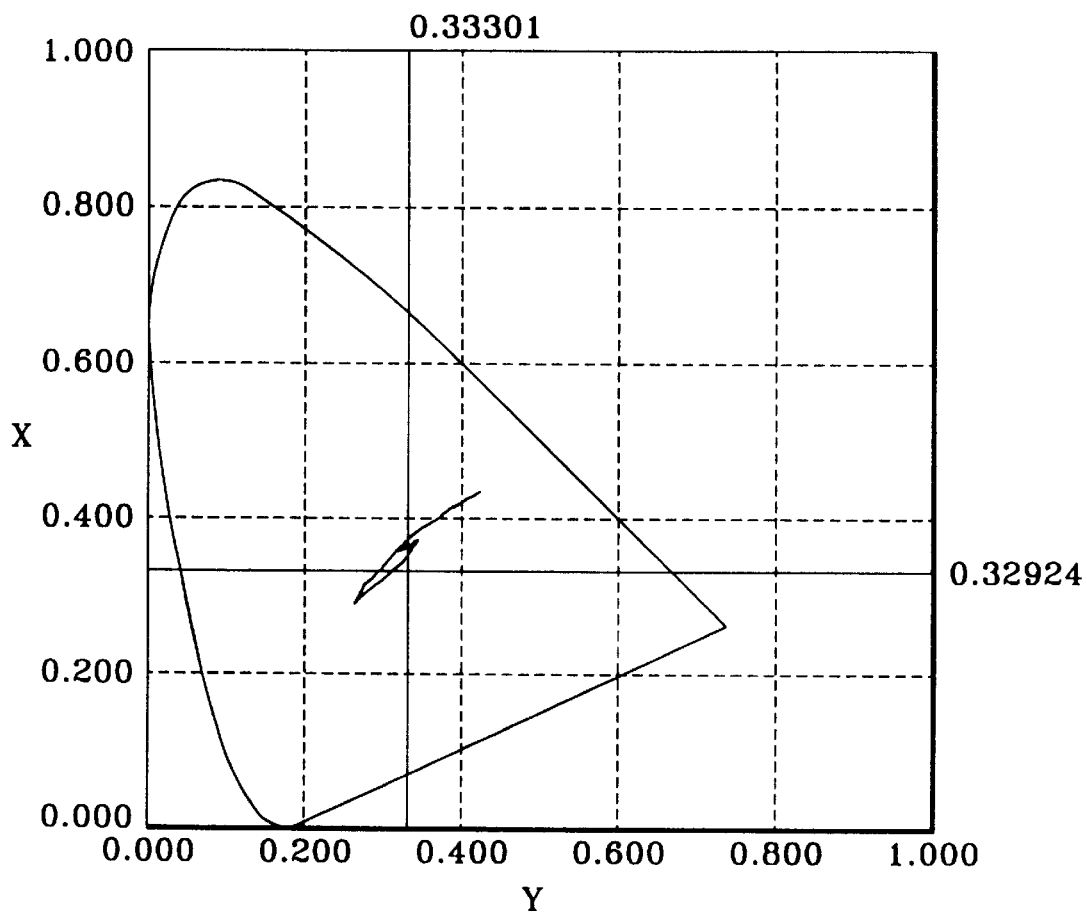
Figure 71:
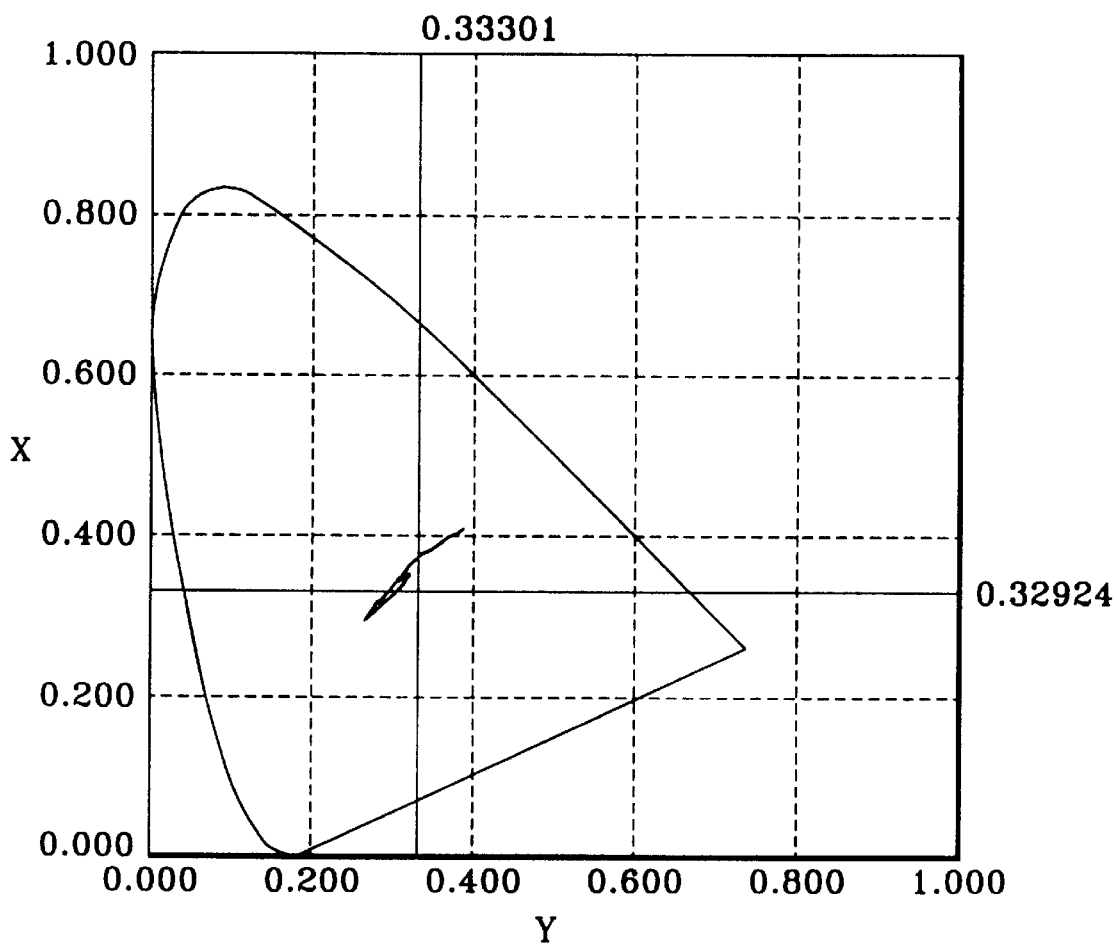
Figure 72:
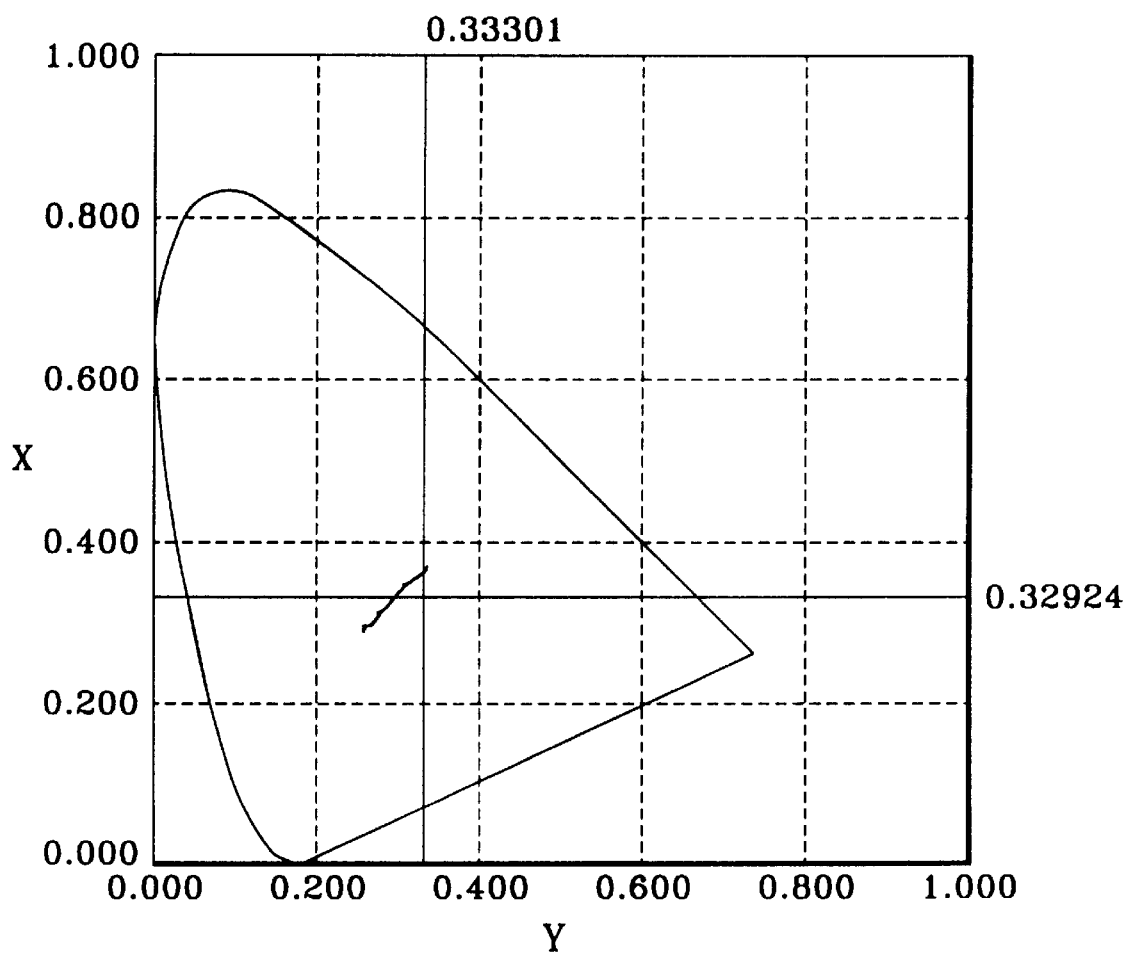
Figure 73:
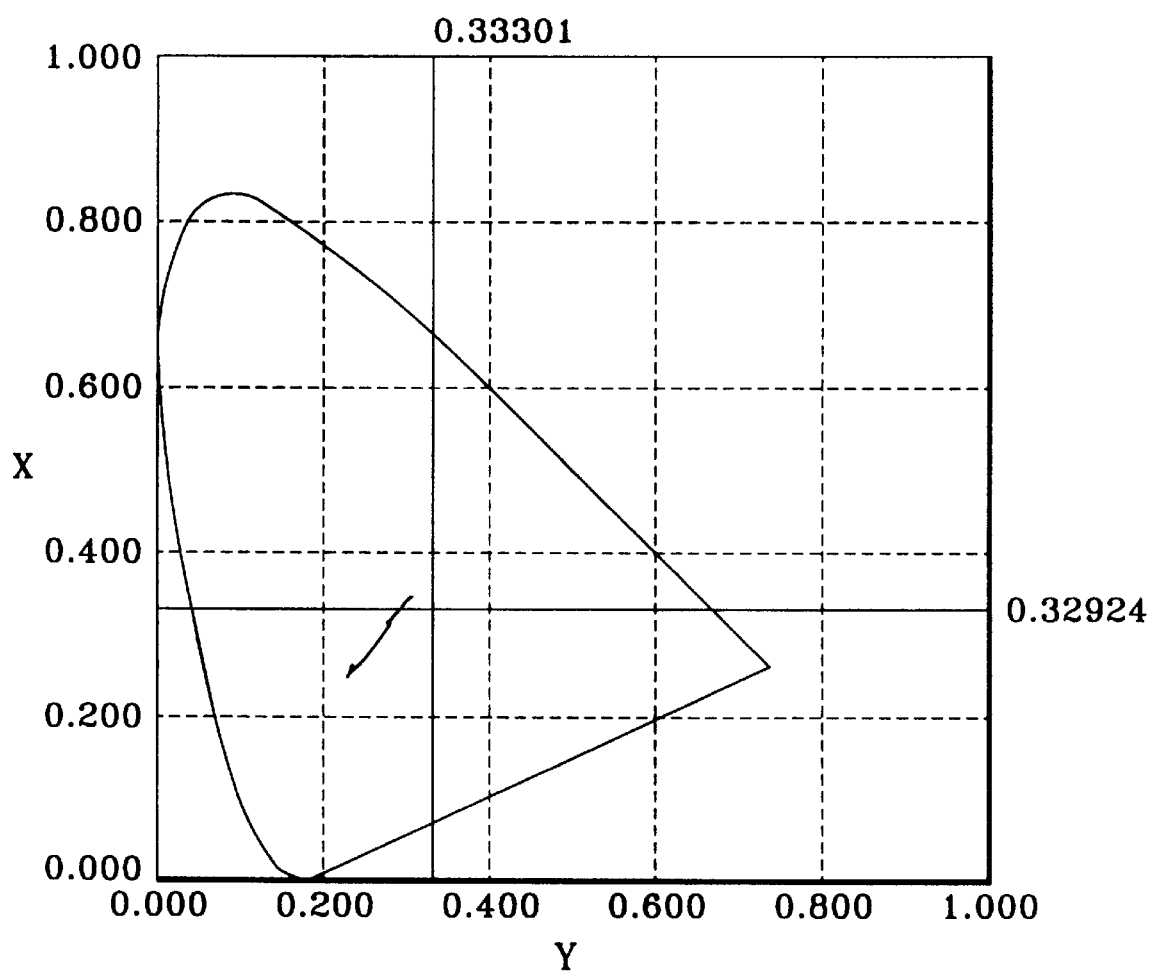

FIG. 70, on the other hand, shows the case in which the d/p ratio is set to 0.0325 in the forward chiral direction. Further, FIG. 71 shows the case in which the d/p ratio is set to 0.13 in the forward chiral direction, and FIG. 72 shows the case in which the d/p ratio is set to 0.325 in the forward chiral direction. Further, FIG. 73 shows the case in which the d/p ratio is set to 0.65 in the forward chiral direction.

Figure 74:
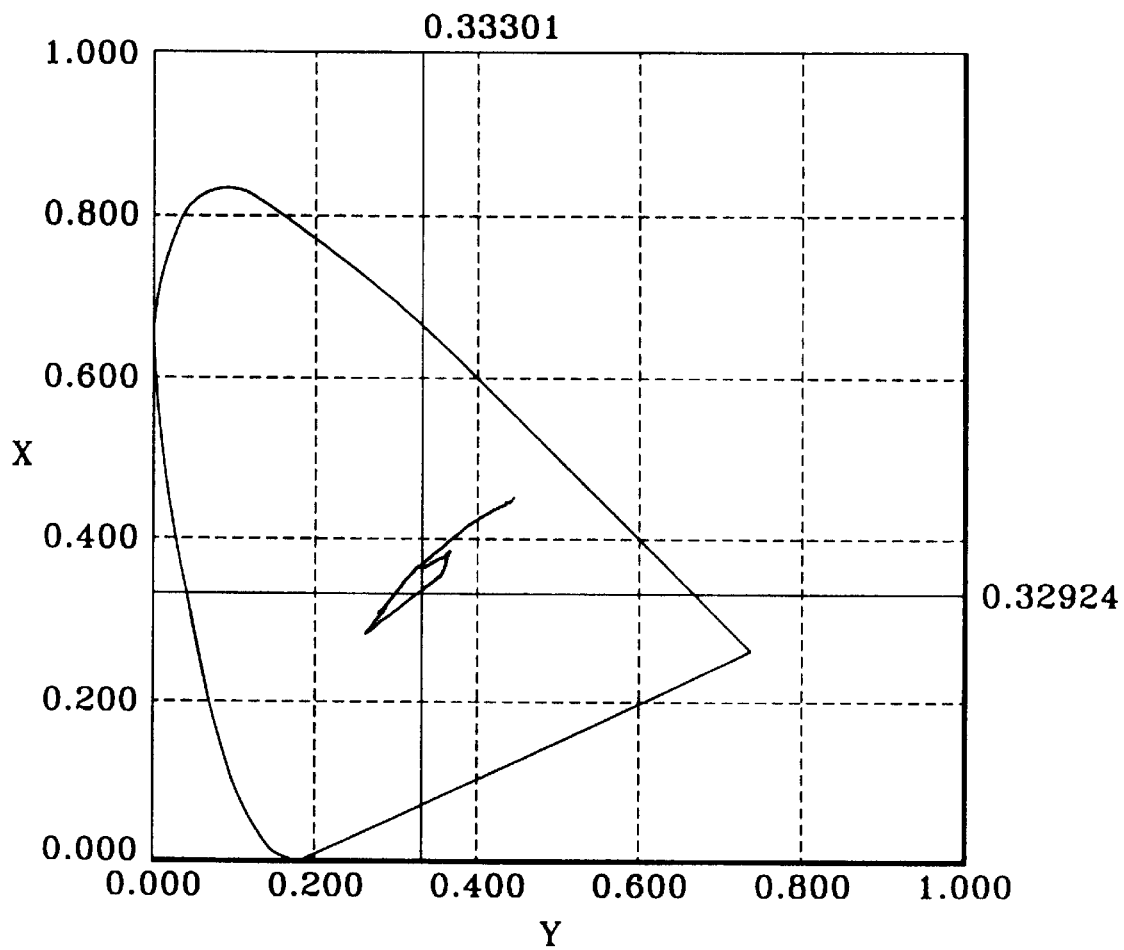
Figure 75:
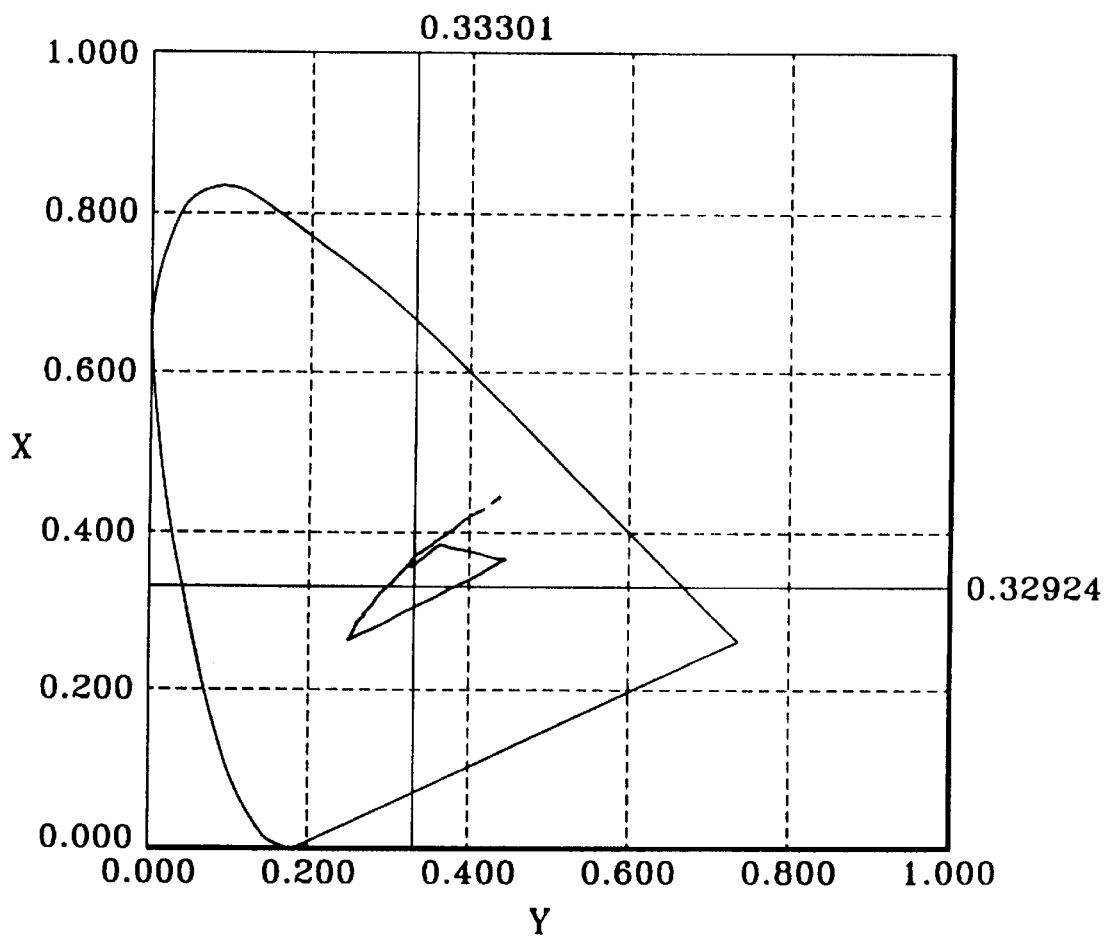
Figure 76:
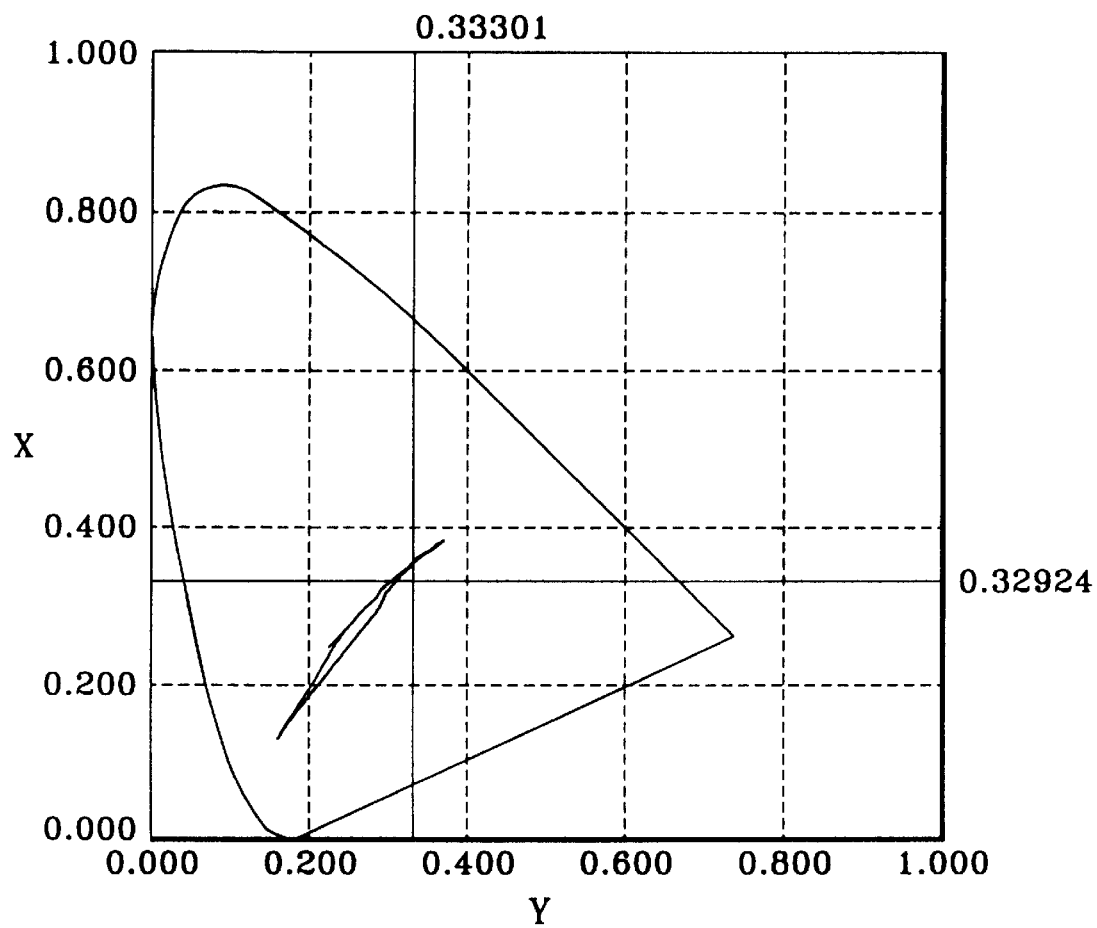

Further, FIG. 74 shows the case in which the d/p ratio is set to 0.0325 in the reverse chiral direction, and FIG. 75 shows the case in which the d/p ratio is set to 0.13 in the reverse chiral direction. Further, FIG. 76 shows the case in which the d/p ratio is set to 0.325 in the reverse chiral direction.

Referring to FIGS. 69–76, it should be noted that the coloring of the liquid crystal display device is reduced substantially by restricting the chiral pitch of the liquid crystal molecules in the forward chiral direction by adding the chiral substance. On the other hand, the addition of the chiral substance having a reverse chiral direction increases the coloring. In view of the viewing angle characteristics of FIG. 68, it is concluded that the absolute value |d/p| of the d/p ratio is set within the range of $\psi/120°$.

Figure 77:
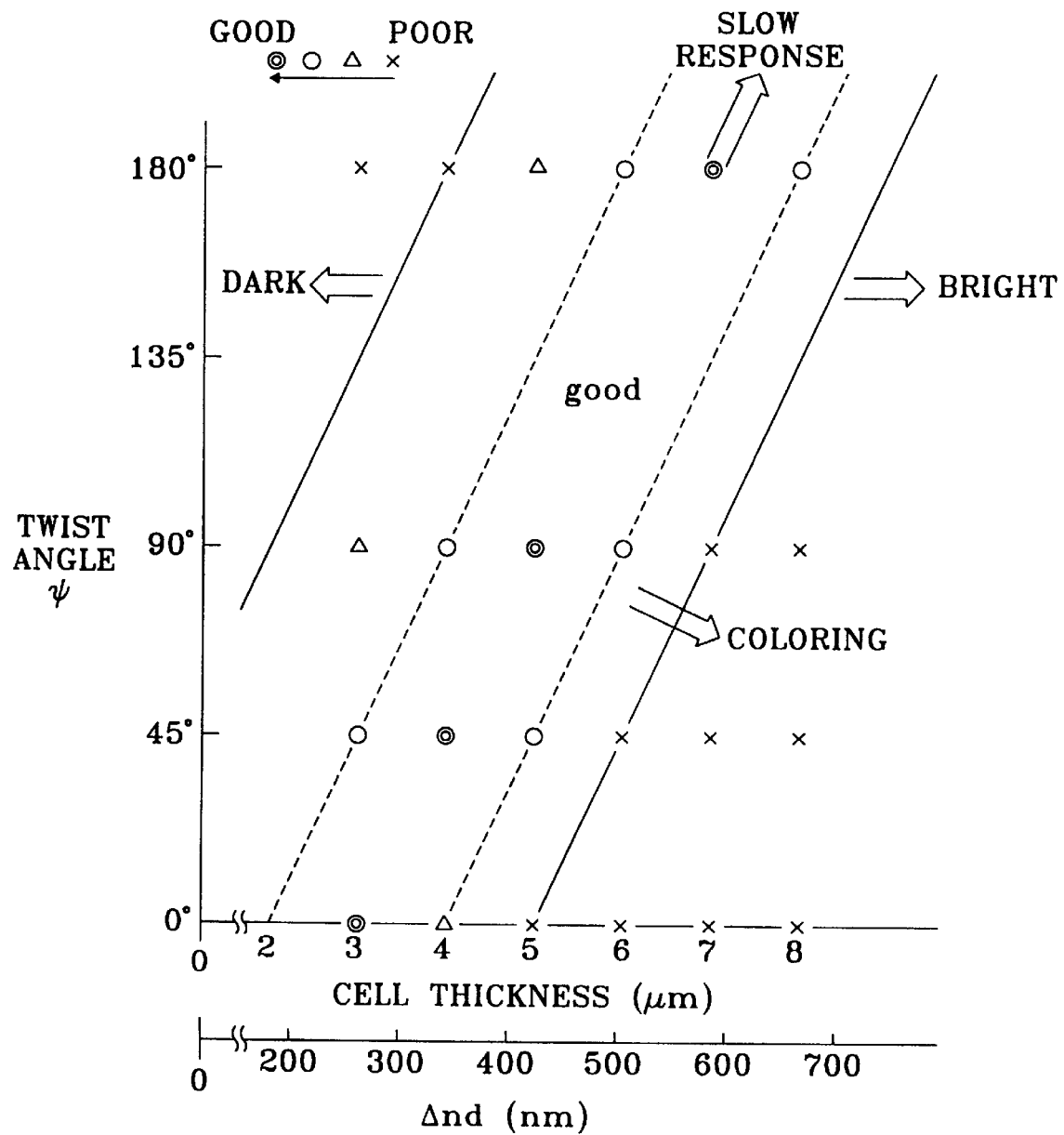
FIG. 77 is a diagram showing a preferable combination twist angle and cell thickness in the liquid crystal display device of the eighth embodiment.

FIG. 77 shows the evaluation of the representation for the liquid crystal display device in which the |d/p| value is set to $\psi/360°$ and the thickness d and the twist angle $\psi$ are changed variously, wherein it will be noted that the evaluation is made in four grades.

Referring to FIG. 77, it should be noted that the response speed of the representation is improved when the thickness d, and hence the retardation $_{\Delta}n \cdot d$, is reduced, while excessively small value of the retardation And reduces the brightness of the representation, in conformity to the results obtained in the previous embodiments. When the thickness d of the liquid crystal layer is excessively large, on the other hand, the problem of coloring of the representation becomes conspicuous. Further, when the twist angle $\psi$ is set excessively large, the response speed of representation is reduced. In conclusion, it can be said that the liquid crystal display device provides an excellent representation performance when the retardation $_{\Delta}n \cdot d$ of the liquid crystal layer is in the region shown in FIG. 77 by solid lines, which is represented more specifically by $$\psi/549 \leq _{\Delta}n \cdot d \leq (225+\psi)/549,$$

wherein the twist angle $\psi$ in the above inequality is represented by degree (°).

Figure 79:
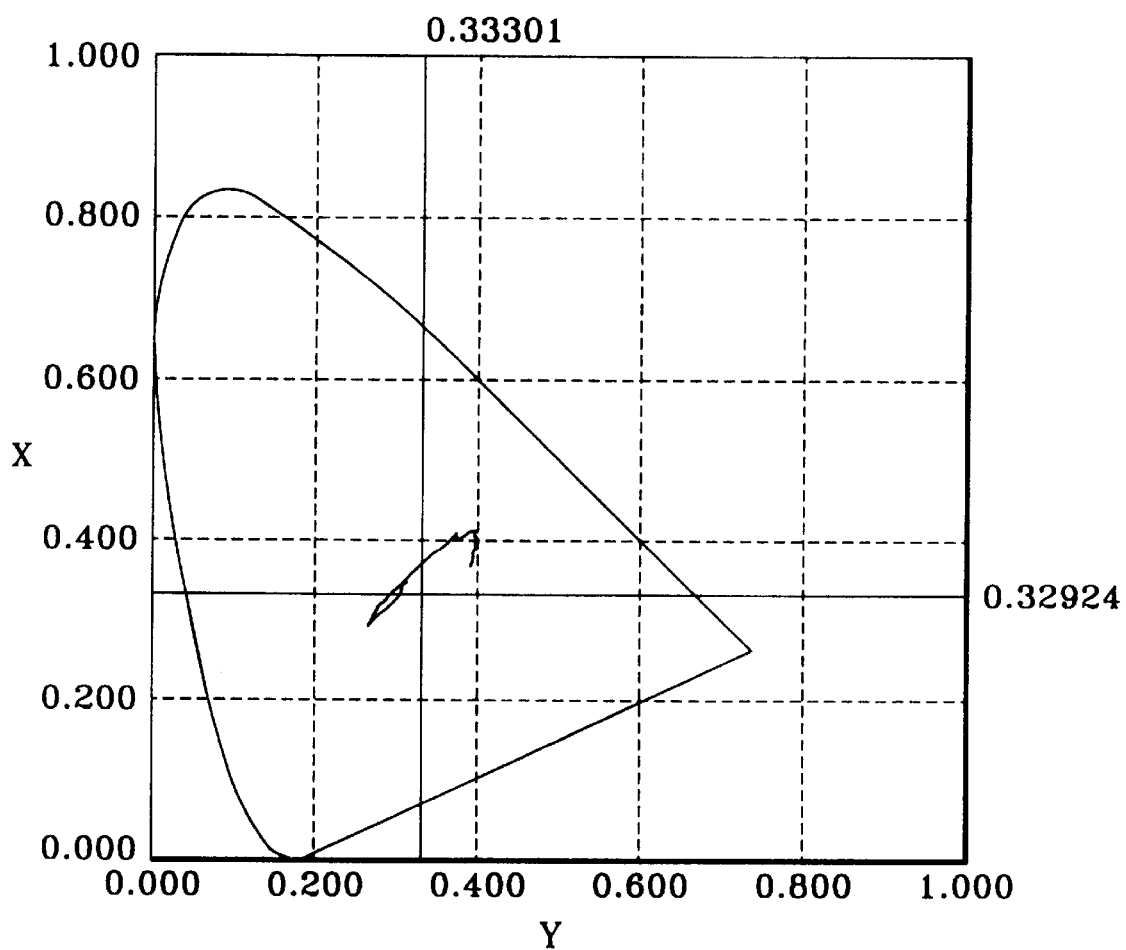

FIGS. 78 and 79 show respectively the viewing angle characteristics and coloring of the liquid crystal display device 50 of FIGS. 57 in which a chiral substance is added to the liquid crystal layer 32 such that the d/p ratio has a value of 0.125, wherein it should be noted that the results of FIGS. 78 and 79, are for the case in which the phase compensation film $(33A)_1$ is removed, the twist angle V is set to 45°, the thickness d of the liquid crystal layer 32 is set to 4 μm, the total negative retardation R' caused by the phase compensation films $(33A)_2$ and $(33B)_2$ is set to 300 nm, and the positive retardation R caused by the phase compensation film $(33B)_1$ is set to 25 nm.

Figure 80:
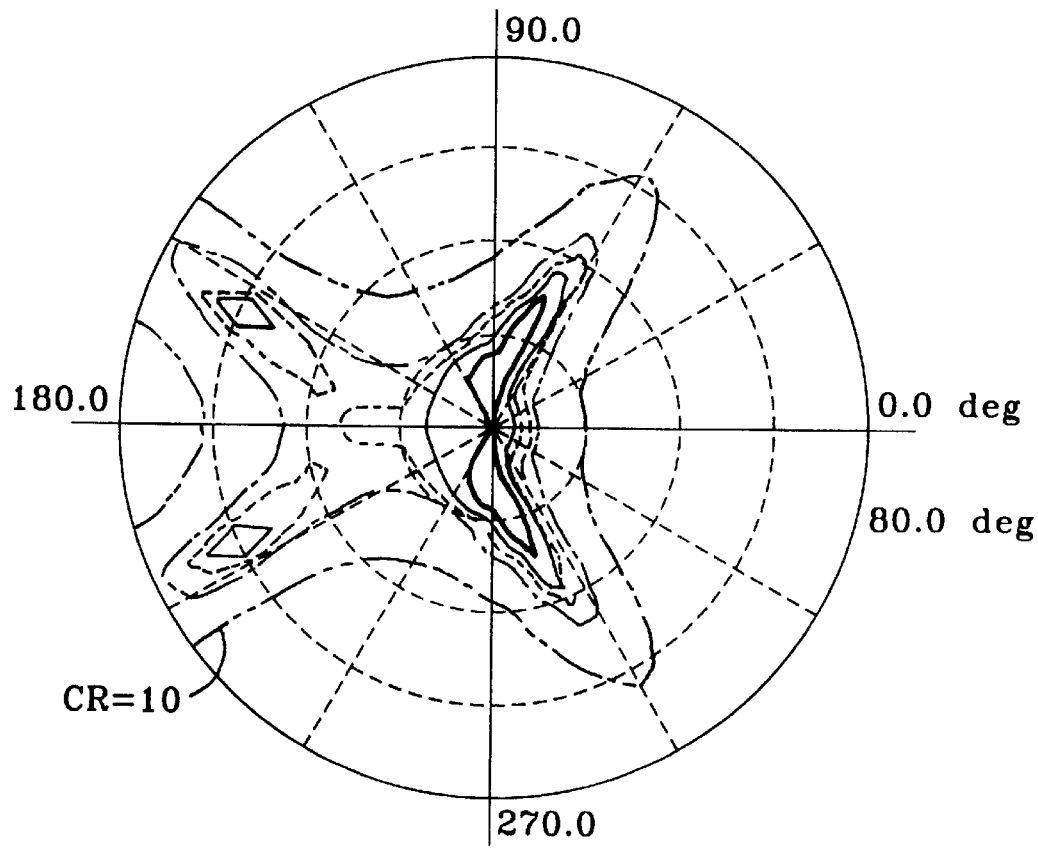
FIGS. 80 and 81 are diagrams respectively showing viewing angle characteristics and chromaticity characteristics of a conventional TN-mode or STN-mode liquid crystal display device for the purpose of comparison.
Figure 81:
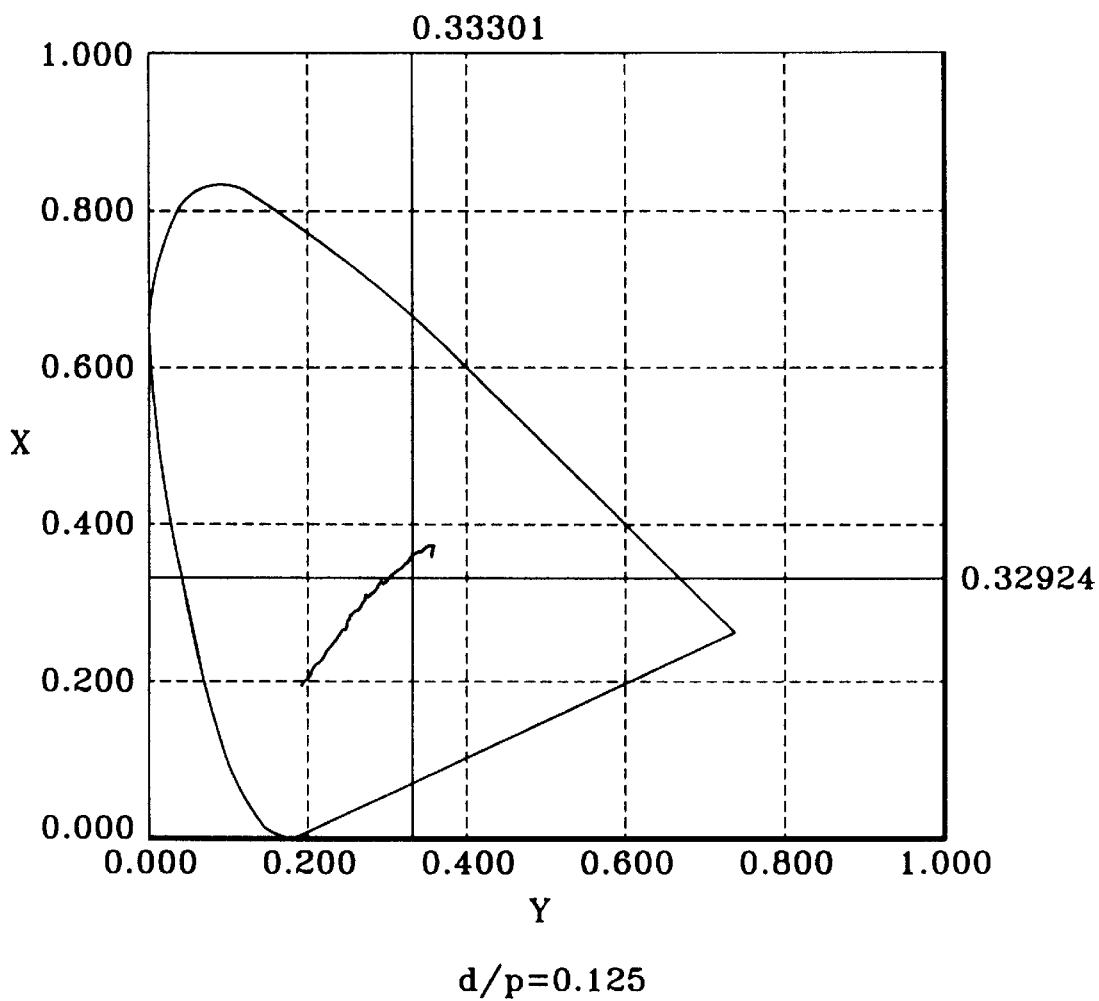

The results of FIGS. 78 and 79 are clearly superior to the corresponding results shown in FIGS. 80 and 81 for a conventional TN-mode or STN-mode liquid crystal display device in terms of both the viewing angle characteristics and the coloring.

Further, the present invention is not limited to the embodiments described heretofore, but various variations and modifications may be made without departing from the scope of the invention.

What is claimed is:

1. A liquid crystal display device, comprising:
   first and second substrates opposing each other in a substantially parallel realationship;
   a first electrode provided on a first principal surface of said first substrate, said first principal surface facing said second substrate;
   a second electrode provided on a second principal surface of said second substrate, said second principal surface facing said first substrate;
   a first molecular alignment film provided on said first principal surface of said first substrate so as to cover said first electrode;
   a second molecular alignment film provided on said second principal surface of said second substrate so as to cover said second electrode; and
   a liquid crystal layer confined between said first and second substrates, said liquid crystal layer containing therein n-type liquid crystal molecules having a negative dielectric anisotropy;
   said first and second substrates forming a liquid crystal panel together with said liquid crystal layer intervening therebetween, and
   said liquid crystal display device further including a first polarizer having a first optical absorption axis and a second polarizer having a second optical absorption axis, respectively, at a first side and a second side of said liquid crystal panel,
   wherein said liquid crystal display device further includes, in at least one of a first gap formed between said first substrate and said first polarizer and a second gap formed between said second substrate and said second polarizer, a first retardation layer having a positive birefringence and a second retardation layer having a negative birefringence.

2. The liquid crystal display device as claimed in claim 1, wherein said retardation is equal to or smaller than 300 nm.

3. The liquid crystal display device as claimed in claim 1, wherein said retardation is about 280 nm.

4. A liquid crystal display device as claimed in claim 1, wherein said liquid crystal molecules are aligned in said liquid crystal layer such that a director of said liquid crystal molecules points to a direction inclined, with respect to at least one of said first and second substrates, by a pre-tilt angle of 75° or more but smaller than 90° in a non-activated state of said liquid crystal display device in which no drive voltage is applied across said first and second electrodes.

5. The liquid crystal display device as claimed in claim 4, wherein said pre-tilt angle is 87° or more.

6. The liquid crystal display device as claimed in claim 4, wherein said pre-tilt angle is about 89°.

7. The liquid crystal display device as claimed in claim 4, wherein said liquid crystal molecules form said pre-tilt angle with respect to both of said first and second substrates.

8. The liquid crystal display device as claimed in claim 1, wherein said liquid crystal molecules form a twist angle of larger than 0° but smaller than 180° in said liquid crystal layer.

9. The liquid crystal display device as claimed in claim 8, wherein said liquid crystal molecules cause a twisting in said liquid crystal layer with a substantially uniform twisting angle from said first substrate to said second substrate in a non-activated state of said liquid crystal display device in which no drive voltage is applied across said first and second electrodes.

10. The liquid crystal display device as claimed in claim 8, wherein said liquid crystal molecules cause a twisting in said liquid crystal layer with a non-uniform twisting angle from said first substrate to said second substrate in an activated state of said liquid crystal display device in which a drive voltage is applied across said first and second electrodes.

11. The liquid crystal display device as claimed in claim 1, wherein said first and second polarizers are disposed such that said first and second optical absorption axes cross perpendicularly with each other, said first and second polarizers being disposed such that said first optical absorption axis forms an angle of about 45° with respect to a center line that bisects a twist angle of said liquid crystal molecules in said liquid crystal layer.

12. The liquid crystal display device as claimed in claim 1, wherein said first retardation layer is disposed closer to said liquid crystal panel as compared to said second retardation layer.

13. The liquid crystal display device as claimed in claim 1, wherein said first retardation layer is disposed with such an orientation that an optical axis of said first retardation layer forms an angle of about 90° with respect to said optical absorption axis of said first polarizer when said first retardation layer is provided in said first gap, and such that said optical axis forms an angle of about 90° with respect to said optical absorption axis of said second polarizer when said first retardation layer is provided in said second gap.

14. The liquid crystal display device as claimed in claim 1, wherein said first retardation layer has a retardation equal to or smaller than 100 nm.

15. The liquid crystal display device as claimed in claim 1, wherein said second retardation layer has an optical axis extending substantially perpendicularly to said first and second substrates.

16. The liquid crystal display device as claimed in claim 1, wherein said second retardation layer has a retardation smaller than twice a retardation of said liquid crystal layer.

17. The liquid crystal display device as claimed in claim 1, wherein one of said first and second substrates carries thereon a plurality of pixel electrodes and corresponding thin film transistors for driving said pixel electrodes, said pixel electrodes defining corresponding pixels in said liquid crystal layer.

18. The liquid crystal display device as claimed in claim 17, wherein each of said pixels includes a plurality of sub-regions, in which each sub-region has a molecular orientation of the liquid crystal molecules that is different from a molecular orientation of the liquid crystal molecules in another sub-region.

19. The liquid crystal display device as claimed in claim 18, wherein each of said sub-regions has a pre-tilt angle of the liquid crystal molecules that is different from a pre-tilt angle of the liquid crystal molecules in another sub-region.

20. The liquid crystal display device as claimed in claim 18, wherein each of said sub-regions has a rubbing direction different from a rubbing direction of another sub-region.

21. The liquid crystal display device as claimed in claim 1, wherein said liquid crystal layer has a retardation of 80 nm or more but not exceeding 400 nm.

22. A liquid crystal display device, comprising:

first and second substrates opposing each other in a substantially parallel relationship;

a first electrode provided on a first principal surface of said first substrate, said first principal surface facing said second substrate;

a second electrode provided on a second principal surface of said second substrate, said second principal surface facing said first substrate;

a first molecular alignment film provided on said first principal surface of said first substrate so as to cover said first electrode;

a second molecular alignment film provided on said second principal surface of said second substrate so as to cover said second electrode; and a liquid crystal layer confined between said first and second substrates, said liquid containing therein n-type liquid crystal molecules having a negative dielectric anisotropy, said liquid crystal layer having a retardation of 80 nm or more but not exceeding 400 nm;

said first and second substrates forming a liquid crystal panel together with said liquid crystal layer intervening therebetween, said liquid crystal display device further including a first polarizer having a first optical absorption axis and a second polarizer having a second optical absorption axis, respectively at a first side and a second side of said liquid crystal panel, said liquid crystal display device further including, in at least one of a first gap formed between said first substrate and said first polarizer and a second gap formed between said second substrate and said second polarizer, an optically biaxial retardation layer, said optically biaxial retardation layer having a refractive index in a direction perpendicular to said first and second substrates such that said refractive index is smaller than refractive indices of said optically biaxial retardation layer in any other direction.

23. The liquid crystal display device as claimed in claim 22, wherein said optically biaxial retardation layer has a retardation of 100 nm or less in a plane of said optically biaxial retardation layer, said optically biaxial retardation layer further having a retardation equal to or smaller than a retardation of said liquid crystal layer in a direction perpendicularly to said optically biaxial retardation layer.

24. The liquid crystal display device as claimed in claim 23, wherein said retardation of said optically biaxial retardation layer is substantially equal to said retardation of said liquid crystal layer in said direction perpendicularly to said optically biaxial retardation layer.

25. The liquid crystal display device as claimed in claim 22, wherein said liquid crystal layer has a retardation of 80 nm or more but not exceeding 400 nm.

26. The liquid crystal display device as claimed in claim 22. wherein said retardation is equal to or smaller than 300 nm.

27. The liquid crystal display device as claimed in claim 22, wherein said retardation is about 280 nm.

28. The liquid crystal display device as claimed in claim 22, wherein said liquid crystal molecules are aligned in said liquid crystal layer such that a director of said liquid crystal molecules points to a direction inclined, with respect to at least one of said first and second substrates, by a pre-tilt angle of 75° or more but smaller than 90° in a non-activated state of said liquid crystal display device in which no drive voltage is applied across said first and second electrodes.

29. The liquid crystal display device as, claimed in claim 28, wherein said pre-tilt angle is 87° or more.

30. The liquid crystal display device as claimed in claim 28, wherein said pre-tilt angle is about 89°.

31. The liquid crystal display device as claimed in claim 28, wherein said liquid crystal molecules form said pre-tilt angle with respect to both of said first and second substrates.

32. The liquid crystal display device as claimed in claim 22, wherein said liquid crystal molecules form a twist angle of larger than 0° but smaller than 1800 in said liquid crystal layer.

33. The liquid crystal display device as claimed in claim 32, wherein said liquid crystal molecules cause a twisting in said liquid crystal layer with a substantially uniform twisting angle from said first substrate to said second substrate in a non-activated state of said liquid crystal display device in which no drive voltage is applied across said first and second electrodes.

34. The liquid crystal display device as claimed in claim 32, wherein said liquid crystal molecules cause a twisting in said liquid crystal layer with a non-uniform twisting angle from said first substrate to said second substrate in an activated state of said liquid crystal display device in which a drive voltage is applied across said first and second electrodes.

35. The liquid crystal display device as claimed in claim 22, wherein said first and second polarizers are disposed such that said first and second optical absorption axes cross perpendicularly with each other, said first and second polarizers being disposed such that said first optical absorption axis forms an angle of about 45° with respect to a center line that bisects a twist angle of said liquid crystal molecules in said liquid crystal layer.

36. The liquid crystal display device as claimed in claim 22, wherein one of said first and second substrates carries thereon a plurality of pixel electrodes and corresponding thin film transistors for driving said pixel electrodes, said pixel electrodes defining corresponding pixels in said liquid crystal layer.

37. The liquid crystal display device as claimed in claim 36, wherein each of said pixels includes a plurality of sub-regions, in which each sub-region has a molecular orientation of the liquid crystal molecules that is different from a molecular orientation of the liquid crystal molecules in another sub-region.

38. The liquid crystal display device as, claimed in claim 37, wherein each of said sub-regions has a pre-tilt angle of the liquid crystal molecules that is different from a pre-tilt angle of the liquid crystal molecules in another sub-region.

39. The liquid crystal display device as claimed in claim 37, wherein each of said sub-regions has a rubbing direction different from a rubbing direction of another sub-region.

40. A liquid crystal display device, comprising:
a liquid crystal panel, said liquid crystal panel comprising: first and second substrates opposing each other in a substantially parallel relationship; a first electrode provided on a first principal surface of said first substrate, said first principal surface facing said second substrate; a second electrode provided on a second principal surface of said second substrate, said second principal surface facing said first substrate; a first molecular alignment film provided on said first principal surface of said first substrate so as to cover said first electrode; a second molecular alignment film provided on said second principal surface of said second substrate so as to cover said second electrode; and a liquid crystal layer confined between said first and second substrates, said liquid crystal layer containing therein liquid crystal molecules having a negative dielectric anisotropy;

a first polarizer disposed at a first side of said liquid crystal panel; and a second polarizer disposed at a second, opposite side of said liquid crystal panel;

wherein said liquid crystal display device further comprises first and second retardation layers disposed in one of a first gap formed between said liquid crystal panel and said first polarizer and a second gap formed between said liquid crystal panel and said second polarizer, said first and second retardation layers having a positive optical anisotropy and a negative optical anisotropy respectively, and wherein said first retardation layer is disposed closer to said liquid crystal panel than said second retardation layer.

41. A liquid crystal display device, comprising:
a liquid crystal panel, said liquid crystal display panel comprising: first and second substrates opposing each other in a substantially parallel relationship; a first electrode provided on a first principal surface of said first substrate, said first principal surface facing said second substrate; a second electrode provided on a second principal surface of said second substrate, said second principal surface facing said first substrate; a first molecular alignment film provided on said first principal surface of said first substrate so as to cover said first electrode; a second molecular alignment film provided on said second principal surface of said second substrate so as to cover said second electrode; and a liquid crystal layer confined between said first and second substrates, said liquid crystal layer containing therein liquid crystal molecules having a negative dielectric anisotropy;

a first polarizer disposed at a first side of said liquid crystal panel; and a second polarizer disposed at a second, opposite side of said liquid crystal panel;

wherein said liquid crystal layer has a retardation $\Delta n \cdot d$ of 80 nm or more but not exceeding 300 nm and satisfying a relationship $$\psi/549 \leq \Delta n \cdot d \leq (225+\psi)/549$$

where $\psi$ is a twist angle of the liquid crystal molecules.

42. The liquid crystal display device as claimed in claim 41, wherein said liquid crystal layer contains a chiral substance.

43. The liquid crystal display device as claimed in claim 42, wherein said chiral substance forms a chiral pitch p such that said chiral pitch p satisfies a relationship $$|d/p| \leq \psi/120°$$

where d represents a thickness of the liquid crystal layer.

44. The liquid crystal display device as claimed in claim 41, wherein said retardation is about 280 nm.

45. A liquid crystal display device as claimed in claim 41, wherein said liquid crystal molecules are aligned in said liquid crystal layer such that a director of said liquid crystal molecules points to a direction inclined, with respect to at least one of said first and second substrates, by a pre-tilt angle of 75° or more but smaller than 90° in a non-activated state of said liquid crystal display device in which no drive voltage is applied across said first and second electrodes.

46. The liquid crystal display device as claimed in claim 45, wherein said pre-tilt angle is 87° or more.

47. The liquid crystal display device as claimed in claim 45, wherein said pre-tilt angle is about 89°.

48. The liquid crystal display device as claimed in claim 45, wherein said liquid crystal molecules form said pre-tilt angle with respect to both of said first and second substrates.

49. The liquid crystal display device as claimed in claim 41, wherein said liquid crystal molecules cause a twisting in said liquid crystal layer with a substantially uniform twisting angle from said first substrate to said second substrate in a non-activated state of said liquid crystal display device in which no drive voltage is applied across said first and second electrodes.

50. The liquid crystal display device as claimed in claim 41, wherein said liquid crystal molecules cause a twisting in said liquid crystal layer with a non-uniform twisting angle from said first substrate to said second substrate in an activated state of said liquid crystal display device in which a drive voltage is applied across said first and second electrodes.

51. The liquid crystal display device as claimed in claim 41, wherein said first and second polarizers are disposed such that said first and second optical absorption axes cross perpendicularly with each other, said first and second polarizers being disposed further that said first optical absorption axis forms an angle of about 45° with respect to a center line that bisects a twist angle of said liquid crystal molecules in said liquid crystal layer.

52. The liquid crystal display device as claimed in claim 41, wherein said liquid crystal display device further includes, in at least one of a first gap formed between said liquid crystal panel and said first polarizer and a second gap formed between said liquid crystal panel and said second polarizer, a first retardation layer having a positive birefringence and a second retardation layer having a negative retardation birefringence.

53. The liquid crystal display device as claimed in claim 41, wherein said liquid crystal display device further includes, in at least one of a first gap formed between said liquid crystal panel and said first polarizer and a second gap formed between said liquid crystal panel and said second polarizer, an optically biaxial retardation layer, said optically biaxial retardation layer having a refractive index in a direction perpendicular to said first and second substrates such that said refractive index is smaller than refractive indices of said optically biaxial retardation layer in any other direction.

54. The liquid crystal display device as claimed in claim 41, wherein one of said first and second substrates carries thereon a plurality of pixel electrodes and corresponding thin film transistors for driving said pixel electrodes, said pixel electrodes defining corresponding pixels in said liquid crystal layer.

55. The liquid crystal display device as claimed in claim 54, wherein each of said pixels includes a plurality of sub-regions, in which each sub-region has a molecular orientation of the liquid crystal molecules that is different from a molecular orientation of the liquid crystal molecules in another sub-region.

* * * * *

UNITED STATES PATENT AND TRADEMARK OFFICE
CERTIFICATE OF CORRECTION

PATENT NO.   : 6,141,075
DATED        : October 31, 2000
INVENTOR(S)  : Ohmuro et al.

It is certified that error appears in the above-identified patent and that said Letters Patent is hereby corrected as shown below:

<u>Claim 22,</u>
Line 21, delete "liquid" and insert -- crystal layer -- therefor.

<u>Claim 32,</u>
Line 3, delete "1800" and insert -- 180° -- therefor.

<u>Claim 38,</u>
Line 1, delete "as," and insert -- as -- therefor.

Signed and Sealed this

Sixteenth Day of April, 2002

Attest:

JAMES E. ROGAN
*Attesting Officer*   *Director of the United States Patent and Trademark Office*